US012652312B1

(12) United States Patent
Kemmerling et al.

(10) Patent No.: US 12,652,312 B1
(45) Date of Patent: *Jun. 9, 2026

(54) DETECTING SOCIAL ENGINEERING THREATS

(71) Applicant: ExtraHop Networks, Inc., Seattle, WA (US)

(72) Inventors: Todd Ryland Kemmerling, Henderson, NV (US); Patrick Louis Kreuch, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/364,763

(22) Filed: Oct. 21, 2025

(51) Int. Cl.
H04L 9/40 (2022.01)
(52) U.S. Cl.
CPC .............................. H04L 63/1483 (2013.01)
(58) Field of Classification Search
CPC .................................................. H04L 63/1483
See application file for complete search history.

(56) References Cited

U.S. PATENT DOCUMENTS

| | | |
|---|---|---|
| 5,027,269 A | 6/1991 | Grant et al. |
| 5,430,727 A | 7/1995 | Callon et al. |
| 5,541,995 A | 7/1996 | Normile et al. |

(Continued)

FOREIGN PATENT DOCUMENTS

| | | |
|---|---|---|
| AU | 2003287262 A1 | 5/2004 |
| AU | 2003287262 A8 | 5/2004 |

(Continued)

OTHER PUBLICATIONS

Berners-Lee et al. "Uniform Resource Identifiers (URI): Generic Syntax" Network Working Group, Request for Comments: 2396, Aug. 1998, 40 pages.

(Continued)

*Primary Examiner* — Oleg Korsak
(74) *Attorney, Agent, or Firm* — John W. Branch; Branch Partners PLLC

(57) ABSTRACT

Embodiments detect social engineering threats by analyzing telephony and messaging communications to identify deceptive manipulation tactics. The system employs non-agentic threat evaluation using natural language processing, pattern matching, and statistical analysis to collect social engineering indicators and generate preliminary threat confidence scores. Candidate threats undergo agentic threat evaluation using generative artificial intelligence agents that analyze prompts containing telephony and messaging activity information. The system establishes baseline communication patterns from historical data, then identifies deviations and anomalies exceeding threshold values. Multi-vector threat assessments correlate suspicious activities across communication channels using timestamps to detect coordinated campaigns. The system identifies communications demonstrating personal knowledge references, false authority claims, trust-building attempts, and coordinated manipulation strategies. Validation checks cross-reference telephone numbers against databases of known fraudulent sources and disposable communication services.

20 Claims, 15 Drawing Sheets

(56)                    References Cited

U.S. PATENT DOCUMENTS

| | | | |
|---|---|---|---|
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,867,661 A | 2/1999 | Bittinger et al. |
| 5,928,363 A | 7/1999 | Ruvolo |
| 6,040,834 A | 3/2000 | Jain et al. |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | Digiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,597,777 B1 | 7/2003 | Ho |
| 6,636,838 B1 | 10/2003 | Perlman et al. |
| 6,704,311 B1 | 3/2004 | Chuah et al. |
| 6,704,874 B1 | 3/2004 | Porras et al. |
| 6,760,775 B1 | 7/2004 | Anerousis et al. |
| 6,765,909 B1 | 7/2004 | Sen et al. |
| 6,789,203 B1 | 9/2004 | Belissent |
| 6,789,206 B1 | 9/2004 | Wierzbicki et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen et al. |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | Lopresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,342,897 B1 | 3/2008 | Nader et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,917,647 B2 | 3/2011 | Cooper et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,145,633 B1 | 3/2012 | Manolis et al. |
| 8,185,953 B2 | 5/2012 | Rothstein et al. |
| 8,194,542 B2 | 6/2012 | Vaeaenaenen et al. |
| 8,332,765 B2 | 12/2012 | Ergan et al. |
| 8,352,725 B1 | 1/2013 | O'toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,504,456 B2 | 8/2013 | Griffin et al. |
| 8,533,254 B1 | 9/2013 | Whitson, Jr. et al. |
| 8,555,383 B1 | 10/2013 | Marshall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 | 12/2013 | Zolfonoon et al. |
| 8,613,089 B1 | 12/2013 | Holloway et al. |
| 8,619,579 B1 | 12/2013 | Rothstein et al. |
| 8,621,615 B2 | 12/2013 | Zhao |
| 8,626,912 B1 | 1/2014 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,867,343 B2 | 10/2014 | Rothstein et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,003,065 B2 | 4/2015 | Rothstein et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | Mccanne et al. |
| 9,054,952 B2 | 6/2015 | Rothstein et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,152,808 B1 | 10/2015 | Ramalingam et al. |
| 9,158,604 B1 | 10/2015 | Christodorescu et al. |
| 9,166,994 B2 | 10/2015 | Ward et al. |
| 9,176,838 B2 | 11/2015 | Li et al. |
| 9,183,573 B2 | 11/2015 | Tseng |
| 9,189,318 B2 | 11/2015 | Li et al. |
| 9,191,288 B2 | 11/2015 | Rothstein et al. |
| 9,191,400 B1 | 11/2015 | Ptasinski et al. |
| 9,203,865 B2 | 12/2015 | Linden et al. |
| 9,210,135 B2 | 12/2015 | Rothstein et al. |
| 9,264,288 B1 | 2/2016 | Arora et al. |
| 9,300,554 B1 | 3/2016 | Kosai et al. |
| 9,323,426 B2 | 4/2016 | Yang |
| 9,338,147 B1 | 5/2016 | Rothstein et al. |
| 9,357,410 B2 | 5/2016 | Nedeltchev et al. |
| 9,367,687 B1 | 6/2016 | Warshenbrot |
| 9,369,479 B2 | 6/2016 | Lin |
| 9,378,361 B1 | 6/2016 | Yen et al. |

(56)                References Cited

U.S. PATENT DOCUMENTS

| | | | |
|---|---|---|---|
| 9,380,489 B2 | 6/2016 | Kotecha et al. | |
| 9,391,866 B1 | 7/2016 | Martin et al. | |
| 9,400,871 B1 | 7/2016 | Hewinson | |
| 9,401,925 B1 | 7/2016 | Guo et al. | |
| 9,426,036 B1 | 8/2016 | Roy | |
| 9,430,646 B1 | 8/2016 | Mushtaq et al. | |
| 9,432,430 B1 | 8/2016 | Klenz | |
| 9,460,299 B2 | 10/2016 | Weiss et al. | |
| 9,461,875 B2 | 10/2016 | Groat et al. | |
| 9,479,405 B1 | 10/2016 | Tongaonkar et al. | |
| 9,483,742 B1 | 11/2016 | Ahmed | |
| 9,516,053 B1 | 12/2016 | Muddu et al. | |
| 9,531,736 B1 | 12/2016 | Torres et al. | |
| 9,565,202 B1 | 2/2017 | Kindlund et al. | |
| 9,565,203 B2 | 2/2017 | Bernstein et al. | |
| 9,584,381 B1 | 2/2017 | Leone | |
| 9,591,015 B1 | 3/2017 | Amin et al. | |
| 9,621,443 B2 | 4/2017 | Kosai et al. | |
| 9,621,523 B2 | 4/2017 | Rothstein et al. | |
| 9,654,485 B1 | 5/2017 | Neumann | |
| 9,654,503 B1 | 5/2017 | Kowalyshyn | |
| 9,660,879 B1 | 5/2017 | Rothstein et al. | |
| 9,692,658 B2 | 6/2017 | Guo et al. | |
| 9,705,895 B1 | 7/2017 | Gutzmann | |
| 9,715,820 B1 | 7/2017 | Boss et al. | |
| 9,729,416 B1 | 8/2017 | Khanal et al. | |
| 9,756,061 B1 | 9/2017 | Roeh et al. | |
| 9,813,311 B1 | 11/2017 | Leone | |
| 9,860,209 B2 | 1/2018 | Buchanan et al. | |
| 9,876,810 B2 | 1/2018 | Mcdougal et al. | |
| 9,888,021 B2 | 2/2018 | Horesh et al. | |
| 9,893,897 B2 | 2/2018 | Li et al. | |
| 9,967,292 B1 | 5/2018 | Higgins et al. | |
| 10,009,364 B2 | 6/2018 | Dasgupta et al. | |
| 10,009,793 B2 | 6/2018 | Wetterwald et al. | |
| 10,027,689 B1 | 7/2018 | Rathor et al. | |
| 10,028,167 B2 | 7/2018 | Calin et al. | |
| 10,033,766 B2 | 7/2018 | Gupta et al. | |
| 10,037,546 B1 | 7/2018 | Benisch et al. | |
| 10,038,611 B1 | 7/2018 | Wu et al. | |
| 10,050,982 B1 | 8/2018 | Guerra et al. | |
| 10,063,434 B1 | 8/2018 | Khanal et al. | |
| 10,116,679 B1 | 10/2018 | Wu et al. | |
| 10,122,748 B1 | 11/2018 | Currie | |
| 10,176,323 B2 | 1/2019 | Zhang et al. | |
| 10,198,667 B2 | 2/2019 | Ryan, Jr. et al. | |
| 10,204,211 B2 | 2/2019 | Hammerle et al. | |
| 10,237,294 B1 | 3/2019 | Zadeh et al. | |
| 10,243,978 B2 | 3/2019 | Roeh et al. | |
| 10,263,863 B2 | 4/2019 | Mukerji et al. | |
| 10,263,883 B2 | 4/2019 | Kamble | |
| 10,264,003 B1 | 4/2019 | Wu et al. | |
| 10,270,794 B1 | 4/2019 | Mukerji et al. | |
| 10,277,618 B1 | 4/2019 | Wu et al. | |
| 10,291,637 B1 | 5/2019 | Bardenstein | |
| 10,305,928 B2 | 5/2019 | Mcgrew et al. | |
| 10,320,749 B2 | 6/2019 | Sengupta et al. | |
| 10,321,344 B2 | 6/2019 | Barton et al. | |
| 10,326,676 B1 | 6/2019 | Driggs et al. | |
| 10,326,741 B2 | 6/2019 | Rothstein et al. | |
| 10,332,005 B1 | 6/2019 | Liao et al. | |
| 10,341,206 B1 | 7/2019 | Hammerle et al. | |
| 10,348,767 B1 | 7/2019 | Lee et al. | |
| 10,375,155 B1 | 8/2019 | Cai et al. | |
| 10,380,498 B1 | 8/2019 | Chaoji et al. | |
| 10,382,296 B2 | 8/2019 | Khanal et al. | |
| 10,382,303 B2 | 8/2019 | Khanal et al. | |
| 10,382,401 B1 | 8/2019 | Lee et al. | |
| 10,389,574 B1 | 8/2019 | Wu et al. | |
| 10,389,611 B2 | 8/2019 | Szabo et al. | |
| 10,411,978 B1 | 9/2019 | Ball et al. | |
| 10,411,982 B1 | 9/2019 | Driggs et al. | |
| 10,412,080 B1 | 9/2019 | Edwards et al. | |
| 10,419,454 B2 | 9/2019 | El-Moussa et al. | |
| 10,476,673 B2 | 11/2019 | Higgins et al. | |
| 10,484,334 B1 | 11/2019 | Lee et al. | |
| 10,511,499 B2 | 12/2019 | Mukerji et al. | |
| 10,536,268 B2 | 1/2020 | Anderson et al. | |
| 10,536,475 B1 | 1/2020 | Mccorkle, Jr. et al. | |
| 10,554,665 B1 | 2/2020 | Badawy et al. | |
| 10,581,915 B2 | 3/2020 | Scherman et al. | |
| 10,587,638 B2 | 3/2020 | Mukerji et al. | |
| 10,594,664 B2 | 3/2020 | Zaifman et al. | |
| 10,594,709 B2 | 3/2020 | Wu et al. | |
| 10,594,718 B1 | 3/2020 | Deaguero et al. | |
| 10,616,084 B2 | 4/2020 | Hammerle et al. | |
| 10,673,870 B2 | 6/2020 | Pierce | |
| 10,728,126 B2 | 7/2020 | Wu et al. | |
| 10,742,530 B1 | 8/2020 | Wu et al. | |
| 10,742,677 B1 | 8/2020 | Wu et al. | |
| 10,778,700 B2 | 9/2020 | Azvine et al. | |
| 10,783,262 B2 | 9/2020 | Goyal et al. | |
| 10,805,338 B2 | 10/2020 | Kohout et al. | |
| 10,841,194 B2 | 11/2020 | Kim et al. | |
| 10,944,769 B2 | 3/2021 | Singh | |
| 10,965,546 B2 | 3/2021 | Pignataro et al. | |
| 10,965,702 B2 | 3/2021 | Higgins et al. | |
| 10,979,282 B2 | 4/2021 | Wu et al. | |
| 10,979,446 B1 | 4/2021 | Stevens et al. | |
| 10,984,122 B2 | 4/2021 | Thomas | |
| 10,992,693 B2 | 4/2021 | Luo et al. | |
| 11,012,329 B2 | 5/2021 | Ball et al. | |
| 11,055,300 B2 | 7/2021 | Zhang et al. | |
| 11,057,420 B2 | 7/2021 | Mcgrew et al. | |
| 11,093,518 B1 | 8/2021 | Lu et al. | |
| 11,106,442 B1 | 8/2021 | Hsiao et al. | |
| 11,157,446 B1 | 10/2021 | Kuruvada et al. | |
| 11,159,549 B2 | 10/2021 | El-Moussa et al. | |
| 11,165,814 B2 * | 11/2021 | Lee | H04L 63/1416 |
| 11,165,823 B2 | 11/2021 | Wu et al. | |
| 11,165,831 B2 | 11/2021 | Higgins et al. | |
| 11,188,550 B2 | 11/2021 | Haggie et al. | |
| 11,194,901 B2 | 12/2021 | El-Moussa et al. | |
| 11,200,246 B2 | 12/2021 | Kharisma et al. | |
| 11,201,876 B2 | 12/2021 | Kallos et al. | |
| 11,232,298 B1 | 1/2022 | Abraham et al. | |
| 11,296,967 B1 | 4/2022 | Rothstein et al. | |
| 11,310,256 B2 | 4/2022 | Higgins et al. | |
| 11,323,467 B2 | 5/2022 | Deaguero et al. | |
| 11,349,861 B1 | 5/2022 | Costlow et al. | |
| 11,388,072 B2 | 7/2022 | Wu et al. | |
| 11,431,744 B2 | 8/2022 | Mukerji et al. | |
| 11,438,247 B2 | 9/2022 | Wu et al. | |
| 11,463,299 B2 | 10/2022 | Wu et al. | |
| 11,463,465 B2 | 10/2022 | Wu et al. | |
| 11,463,466 B2 | 10/2022 | Higgins et al. | |
| 11,496,378 B2 | 11/2022 | Ball et al. | |
| 11,546,153 B2 | 1/2023 | Higgins et al. | |
| 11,558,413 B2 | 1/2023 | Higgins et al. | |
| 11,652,714 B2 | 5/2023 | Wu et al. | |
| 11,665,207 B2 | 5/2023 | Higgins et al. | |
| 11,706,233 B2 | 7/2023 | Higgins et al. | |
| 11,843,606 B2 | 12/2023 | Wu et al. | |
| 11,916,771 B2 | 2/2024 | Rothstein et al. | |
| 12,088,599 B1 * | 9/2024 | McCarson | G06F 18/2133 |
| 12,107,888 B2 | 10/2024 | Wu et al. | |
| 12,225,030 B2 | 2/2025 | Costlow et al. | |
| 12,309,192 B2 | 5/2025 | Lee et al. | |
| 12,355,816 B2 | 7/2025 | Wu et al. | |
| 2001/0054157 A1 | 12/2001 | Fukumoto | |
| 2002/0023080 A1 | 2/2002 | Uga et al. | |
| 2002/0024964 A1 | 2/2002 | Baum et al. | |
| 2002/0035604 A1 | 3/2002 | Cohen et al. | |
| 2002/0055998 A1 | 5/2002 | Riddle et al. | |
| 2002/0059517 A1 | 5/2002 | Haviv et al. | |
| 2002/0065912 A1 | 5/2002 | Catchpole et al. | |
| 2002/0078382 A1 | 6/2002 | Sheikh et al. | |
| 2002/0080720 A1 | 6/2002 | Pegrum et al. | |
| 2002/0091844 A1 | 7/2002 | Craft et al. | |
| 2002/0097724 A1 | 7/2002 | Halme et al. | |
| 2002/0107953 A1 | 8/2002 | Ontiveros et al. | |
| 2002/0133586 A1 | 9/2002 | Shanklin et al. | |
| 2002/0133622 A1 | 9/2002 | Pinto | |
| 2002/0152209 A1 | 10/2002 | Merugu et al. | |

(56)     References Cited

U.S. PATENT DOCUMENTS

| | | |
|---|---|---|
| 2002/0156880 A1 | 10/2002 | Mokuya |
| 2002/0175934 A1 | 11/2002 | Hand et al. |
| 2002/0178360 A1 | 11/2002 | Wenocur et al. |
| 2002/0184362 A1 | 12/2002 | Banerjee et al. |
| 2002/0194483 A1 | 12/2002 | Wenocur et al. |
| 2002/0194501 A1 | 12/2002 | Wenocur et al. |
| 2002/0199096 A1 | 12/2002 | Wenocur et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds et al. |
| 2003/0188189 A1 | 10/2003 | Desai et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0010714 A1 | 1/2004 | Stewart |
| 2004/0010718 A1 | 1/2004 | Porras et al. |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0044406 A1 | 2/2005 | Stute |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0207413 A1 | 9/2005 | Lerner |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2005/0271072 A1 | 12/2005 | Anderson et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085379 A1 | 4/2006 | Heidloff et al. |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0114832 A1 | 6/2006 | Hamilton et al. |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2006/0248407 A1 | 11/2006 | Adams, Jr. et al. |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2007/0271592 A1 | 11/2007 | Noda et al. |
| 2008/0019275 A1 | 1/2008 | Mudireddy et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0174343 A1 | 7/2008 | Cha et al. |
| 2008/0209045 A1 | 8/2008 | Rothstein et al. |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0141634 A1 | 6/2009 | Rothstein et al. |
| 2009/0168657 A1 | 7/2009 | Puri et al. |
| 2009/0187653 A1 | 7/2009 | Fu et al. |
| 2009/0204723 A1 | 8/2009 | Tonsing et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0271511 A1 | 10/2009 | Peracha |
| 2009/0292954 A1 | 11/2009 | Jiang et al. |
| 2009/0296593 A1 | 12/2009 | Prescott |

(56)          References Cited

U.S. PATENT DOCUMENTS

| | | |
|---|---|---|
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0088670 A1 | 4/2010 | Paster |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0235481 A1 | 9/2010 | Deutsch et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0073490 A1 | 3/2011 | Hayamizu et al. |
| 2011/0098973 A1 | 4/2011 | Seidman |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0141913 A1 | 6/2011 | Clemens et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0231935 A1 | 9/2011 | Gula et al. |
| 2011/0280149 A1 | 11/2011 | Okada et al. |
| 2011/0296002 A1 | 12/2011 | Caram |
| 2011/0320394 A1 | 12/2011 | Mckeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Toensing et al. |
| 2012/0159267 A1 | 6/2012 | Gyorffy |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233311 A1 | 9/2012 | Parker et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Maeaettae et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0041896 A1 | 2/2013 | Ghani et al. |
| 2013/0042323 A1 | 2/2013 | Narayanaswamy et al. |
| 2013/0054758 A1 | 2/2013 | Imes et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0136011 A1 | 5/2013 | Tardo et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0227689 A1 | 8/2013 | Pietrowicz et al. |
| 2013/0232104 A1 | 9/2013 | Goyal et al. |
| 2013/0262655 A1 | 10/2013 | Deschenes et al. |
| 2013/0283373 A1 | 10/2013 | Zisapel et al. |
| 2013/0291107 A1 | 10/2013 | Marck et al. |
| 2013/0305357 A1 | 11/2013 | Ayyagari et al. |
| 2013/0305392 A1 | 11/2013 | Bar-el et al. |
| 2013/0315260 A1 | 11/2013 | Adiraju et al. |
| 2013/0339514 A1 | 12/2013 | Crank et al. |
| 2013/0347018 A1 | 12/2013 | Limp et al. |
| 2014/0007222 A1 | 1/2014 | Qureshi et al. |
| 2014/0013434 A1 | 1/2014 | Ranum et al. |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0177497 A1 | 6/2014 | Backholm et al. |
| 2014/0181248 A1 | 6/2014 | Deutsch et al. |
| 2014/0189093 A1 | 7/2014 | Du Toit et al. |
| 2014/0195666 A1 | 7/2014 | Dumitriu et al. |
| 2014/0195797 A1 | 7/2014 | Du Toit |
| 2014/0201838 A1 | 7/2014 | Varsanyi et al. |
| 2014/0214800 A1 | 7/2014 | Liang et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0244851 A1 | 8/2014 | Lee |
| 2014/0245423 A1 | 8/2014 | Lee |
| 2014/0258511 A1 | 9/2014 | Sima et al. |
| 2014/0269276 A1 | 9/2014 | Rothstein et al. |
| 2014/0269777 A1 | 9/2014 | Rothstein et al. |
| 2014/0280907 A1 | 9/2014 | Rothstein et al. |
| 2014/0280908 A1 | 9/2014 | Rothstein et al. |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0337500 A1 | 11/2014 | Lee |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-shalom et al. |
| 2015/0019867 A1 | 1/2015 | Rothstein et al. |
| 2015/0019991 A1 | 1/2015 | Kristjánsson |
| 2015/0023168 A1 | 1/2015 | Kotecha et al. |
| 2015/0026027 A1 | 1/2015 | Priess et al. |
| 2015/0036501 A1 | 2/2015 | Rothstein et al. |
| 2015/0039749 A1 | 2/2015 | Kwan et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0097683 A1 | 4/2015 | Sloo et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |

(56) References Cited

U.S. PATENT DOCUMENTS

| | | | |
|---|---|---|---|
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199229 A1 | 7/2015 | Amendjian et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0254439 A1 | 9/2015 | Ao et al. |
| 2015/0254555 A1 | 9/2015 | Williams et al. |
| 2015/0269358 A1 | 9/2015 | Hesketh et al. |
| 2015/0277802 A1 | 10/2015 | Oikarinen et al. |
| 2015/0304350 A1 | 10/2015 | Lin et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0007314 A1 | 1/2016 | Rezvani et al. |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0105471 A1 | 4/2016 | Nunes et al. |
| 2016/0112475 A1 | 4/2016 | Lawson et al. |
| 2016/0112521 A1 | 4/2016 | Lawson et al. |
| 2016/0119215 A1 | 4/2016 | Deschenes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0147583 A1 | 5/2016 | Ben et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0255115 A1 | 9/2016 | Mital et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0315916 A1 | 10/2016 | Rothstein et al. |
| 2016/0337312 A1 | 11/2016 | Buchanan et al. |
| 2016/0352761 A1 | 12/2016 | Mcgrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | Maccarthaigh |
| 2016/0380851 A1 | 12/2016 | Kosai et al. |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085445 A1 | 3/2017 | Layman et al. |
| 2017/0085459 A1 | 3/2017 | Xia et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0201810 A1 | 7/2017 | Anderson et al. |
| 2017/0220739 A1 | 8/2017 | Hammerle et al. |
| 2017/0228253 A1 | 8/2017 | Layman et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0004972 A1 | 1/2018 | Ruggiero et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0034783 A1 | 2/2018 | Rothstein et al. |
| 2018/0075240 A1 | 3/2018 | Chen |
| 2018/0077189 A1 | 3/2018 | Doppke et al. |
| 2018/0084011 A1 | 3/2018 | Joseph et al. |
| 2018/0089286 A1 | 3/2018 | Marquardt et al. |
| 2018/0091391 A1 | 3/2018 | Turow et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0115566 A1 | 4/2018 | Azvine et al. |
| 2018/0124078 A1 | 5/2018 | Hajmasan et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0145995 A1 | 5/2018 | Roeh et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0278419 A1 | 9/2018 | Higgins et al. |
| 2018/0324061 A1 | 11/2018 | Khanal et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0020669 A1 | 1/2019 | Glatfelter et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |

(56) References Cited

U.S. PATENT DOCUMENTS

| | | |
|---|---|---|
| 2019/0102469 A1 | 4/2019 | Makovsky et al. |
| 2019/0121979 A1 | 4/2019 | Chari et al. |
| 2019/0124123 A1 | 4/2019 | Higgins et al. |
| 2019/0132358 A1 | 5/2019 | Divalentin et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0199609 A1 | 6/2019 | Hammerle et al. |
| 2019/0230095 A1 | 7/2019 | Mcgrew et al. |
| 2019/0230124 A1 | 7/2019 | Hodgman et al. |
| 2019/0236149 A1 | 8/2019 | Kuruvada et al. |
| 2019/0245734 A1 | 8/2019 | Wu et al. |
| 2019/0245759 A1 | 8/2019 | Mukerji et al. |
| 2019/0245763 A1 | 8/2019 | Wu et al. |
| 2019/0245873 A1 | 8/2019 | Wu et al. |
| 2019/0253445 A1 | 8/2019 | Mukerji et al. |
| 2019/0260764 A1 | 8/2019 | Humphrey et al. |
| 2019/0266999 A1 | 8/2019 | Chandrasekaran et al. |
| 2019/0303198 A1 | 10/2019 | Kim et al. |
| 2019/0318109 A1 | 10/2019 | Thomas |
| 2019/0327156 A1 | 10/2019 | Hammerle et al. |
| 2019/0340554 A1 | 11/2019 | Dotan-cohen et al. |
| 2019/0372827 A1 | 12/2019 | Vasseur et al. |
| 2019/0372828 A1 | 12/2019 | Wu et al. |
| 2019/0372864 A1 | 12/2019 | Pignataro et al. |
| 2019/0387005 A1 | 12/2019 | Zawoad et al. |
| 2020/0034528 A1 | 1/2020 | Yang et al. |
| 2020/0052985 A1 | 2/2020 | Ball et al. |
| 2020/0067952 A1 | 2/2020 | Deaguero et al. |
| 2020/0076597 A1 | 3/2020 | Higgins et al. |
| 2020/0082081 A1 | 3/2020 | Sarin et al. |
| 2020/0099703 A1 | 3/2020 | Singh |
| 2020/0167349 A1 | 5/2020 | Marquardt et al. |
| 2020/0201850 A1 | 6/2020 | Haggie et al. |
| 2020/0202256 A1 | 6/2020 | Chaudhari et al. |
| 2020/0220849 A1 | 7/2020 | Zaifman et al. |
| 2020/0236131 A1 | 7/2020 | Vejman et al. |
| 2020/0287879 A1 | 9/2020 | Chandoor |
| 2020/0287885 A1 | 9/2020 | Rodniansky |
| 2020/0287927 A1 | 9/2020 | Zadeh et al. |
| 2020/0321087 A1 | 10/2020 | Willis et al. |
| 2020/0366691 A1 | 11/2020 | Pierce |
| 2020/0382529 A1 | 12/2020 | Higgins et al. |
| 2020/0389469 A1 | 12/2020 | Litichever et al. |
| 2021/0006589 A1 | 1/2021 | Kohout et al. |
| 2021/0012020 A1 | 1/2021 | Malton et al. |
| 2021/0037033 A1 | 2/2021 | Mukerji et al. |
| 2021/0037043 A1 | 2/2021 | Lee et al. |
| 2021/0044608 A1 | 2/2021 | Deaguero et al. |
| 2021/0160283 A1 | 5/2021 | St. Pierre |
| 2021/0185087 A1 | 6/2021 | Wu et al. |
| 2021/0194781 A1 | 6/2021 | Wu et al. |
| 2021/0194908 A1 | 6/2021 | Wu et al. |
| 2021/0211466 A1 | 7/2021 | Sellers |
| 2021/0218714 A1 | 7/2021 | Wang et al. |
| 2021/0250368 A1 | 8/2021 | Hearty et al. |
| 2021/0288895 A1 | 9/2021 | Wu et al. |
| 2021/0288993 A1 | 9/2021 | Kraning et al. |
| 2021/0342337 A1 | 11/2021 | Lu et al. |
| 2021/0350276 A1 | 11/2021 | Ashlock et al. |
| 2021/0360004 A1 | 11/2021 | Mcgrew et al. |
| 2021/0360011 A1 | 11/2021 | O'hara et al. |
| 2022/0019688 A1 | 1/2022 | Nelluri et al. |
| 2022/0021694 A1 | 1/2022 | Higgins et al. |
| 2022/0029875 A1 | 1/2022 | Wu et al. |
| 2022/0053022 A1 | 2/2022 | Wu et al. |
| 2022/0060503 A1 | 2/2022 | Lee et al. |
| 2022/0060518 A1 | 2/2022 | Higgins et al. |
| 2022/0067177 A1 | 3/2022 | Chugunov |
| 2022/0070073 A1 | 3/2022 | Ball et al. |
| 2022/0070188 A1 | 3/2022 | Sheedy et al. |
| 2022/0094706 A1 | 3/2022 | Higgins et al. |
| 2022/0224716 A1 | 7/2022 | Salji |
| 2022/0239685 A1 | 7/2022 | Higgins et al. |
| 2022/0247771 A1 | 8/2022 | Higgins et al. |
| 2022/0345384 A1 | 10/2022 | Wu et al. |
| 2022/0407881 A1 | 12/2022 | Costlow et al. |
| 2023/0087451 A1 | 3/2023 | Rothstein et al. |
| 2023/0319047 A1 | 10/2023 | Wu et al. |
| 2024/0265114 A1* | 8/2024 | Lambotte .............. G06F 21/566 |
| 2024/0356926 A1 | 10/2024 | Wu et al. |
| 2024/0414190 A1* | 12/2024 | Lal ........................... G06F 40/58 |
| 2025/0007950 A1* | 1/2025 | Wuest .................. H04L 63/1483 |
| 2025/0016192 A1* | 1/2025 | Montgomery ...... H04L 63/1441 |
| 2025/0023914 A1 | 1/2025 | Wu et al. |
| 2025/0039235 A1* | 1/2025 | Hanes ................. H04L 63/1416 |
| 2025/0061195 A1* | 2/2025 | Salman ................. G06F 21/552 |
| 2025/0080579 A1* | 3/2025 | Mushtaq ............. H04L 63/1483 |
| 2025/0097236 A1* | 3/2025 | Tiwari ...................... G06N 3/08 |
| 2025/0133102 A1* | 4/2025 | Mitev ................. H04L 63/1483 |
| 2025/0168186 A1* | 5/2025 | Mcdonald ........... H04L 63/1433 |
| 2025/0173423 A1* | 5/2025 | Strogov ............... G06F 21/552 |
| 2025/0175456 A1* | 5/2025 | Crabtree .............. G06F 16/909 |
| 2025/0175498 A1* | 5/2025 | Strogov .............. H04L 63/1491 |
| 2025/0240322 A1* | 7/2025 | Rodriguez ......... H04L 63/1483 |
| 2025/0307222 A1* | 10/2025 | D'Agostino ........ G06F 16/2237 |
| 2025/0307290 A1* | 10/2025 | D'Agostino .......... G06F 16/338 |
| 2025/0307561 A1* | 10/2025 | D'Agostino ............ G06F 40/35 |
| 2025/0307834 A1* | 10/2025 | D'Agostino ......... G06N 3/0895 |
| 2025/0310280 A1* | 10/2025 | D'Agostino ........... G06Q 40/06 |
| 2025/0310376 A1* | 10/2025 | Strogov .............. H04L 63/1416 |
| 2025/0328560 A1* | 10/2025 | Madisetti ............ G06F 16/3329 |

FOREIGN PATENT DOCUMENTS

| | | |
|---|---|---|
| AU | 2008328833 A1 | 6/2009 |
| CN | 105071987 A | 11/2015 |
| CN | 105323247 A | 2/2016 |
| CN | 106170008 A | 11/2016 |
| CN | 106341375 A | 1/2017 |
| CN | 107646190 A | 1/2018 |
| CN | 107667510 A | 2/2018 |
| CN | 106553665 B | 8/2018 |
| CN | 109104441 A | 12/2018 |
| CN | 109542772 A | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 | 3/2005 |
| DE | 69533953 T2 | 4/2006 |
| EP | 0702477 A2 | 3/1996 |
| EP | 0702477 A3 | 7/1999 |
| EP | 1026867 A2 | 8/2000 |
| EP | 1579629 A2 | 5/2004 |
| EP | 0702477 B1 | 1/2005 |
| EP | 2057576 A2 | 3/2008 |
| EP | 1579629 A4 | 11/2009 |
| EP | 2215801 B1 | 4/2011 |
| EP | 2057576 A4 | 4/2012 |
| EP | 3089424 A1 | 11/2016 |
| EP | 3094061 A1 | 11/2016 |
| EP | 3113443 A1 | 1/2017 |
| EP | 3306890 A1 | 4/2018 |
| EP | 3442164 A1 | 2/2019 |
| EP | 3477904 A1 | 5/2019 |
| EP | 3794800 A1 | 11/2019 |
| EP | 3834376 A1 | 2/2020 |
| EP | 3394784 B1 | 10/2020 |
| EP | 3272095 B1 | 3/2021 |
| EP | 3477904 B1 | 11/2021 |
| EP | 4218212 A1 | 3/2022 |
| EP | 3794800 B1 | 11/2022 |
| EP | 3089424 B1 | 6/2023 |
| EP | 3442164 B1 | 8/2023 |
| EP | 3834376 B1 | 9/2023 |
| FR | 2924552 A1 | 6/2009 |
| GB | 2545910 A | 7/2017 |
| GB | 2545910 B | 2/2018 |
| KR | 96-12819 A | 4/1996 |
| KR | 10-0388606 B1 | 11/2003 |
| KR | 10-2014-0093060 A | 7/2014 |

(56) References Cited

FOREIGN PATENT DOCUMENTS

| KR | 10-1662614 | B1 | 10/2016 |
| NZ | 586270 | A | 12/2011 |
| WO | 2004/040423 | A2 | 5/2004 |
| WO | 2004/040423 | A3 | 7/2004 |
| WO | 2008/026212 | A2 | 3/2008 |
| WO | 2009/015461 | A1 | 2/2009 |
| WO | 2008/026212 | A3 | 5/2009 |
| WO | 2009/068603 | A2 | 6/2009 |
| WO | 2015/128613 | A1 | 9/2015 |
| WO | 2016/118131 | A1 | 7/2016 |
| WO | 2016/144932 | A1 | 9/2016 |
| WO | 2016/146610 | A1 | 9/2016 |
| WO | 2016/191486 | A1 | 12/2016 |
| WO | 2017/108575 | A1 | 6/2017 |
| WO | 2017/108576 | A1 | 6/2017 |
| WO | 2018/204237 | A1 | 11/2018 |
| WO | 2019/032137 | A1 | 2/2019 |
| WO | 2019/083555 | A1 | 5/2019 |
| WO | 2019/221911 | A1 | 11/2019 |
| WO | 2020/033005 | A1 | 2/2020 |
| WO | 2020/131740 | A1 | 6/2020 |
| WO | 2022/066910 | A1 | 3/2022 |

OTHER PUBLICATIONS

Hamid et al., "A Methodology to Develop Dynamic Cost-Centric Risk Impact Metrics", Dec. 2015, International Conference on Developments of E-Systems Engineering, pp. 53-59 (Year: 2015).

Kristol et al. "HTTP State Management Mechanism", Network Working Group, Request for Comments: 2109, Feb. 1997, 21 Pages.

Kristol et al. "HTTP State Management Mechanism", Network Working Group, Request for Comments: 2965, Oct. 2000, 26 Pages.

Intention to Grant for European Application No. 16166907.2 mailed on Jan. 20, 2023, 8 Pages.

Intention to Grant for European Application No. 17210995.1 mailed on Jun. 2, 2021, 8 Pages.

Intention to Grant for European Patent Application No. 19804040.4 mailed Jun. 23, 2022, 8 Pages.

Intention to Grant for European Patent Application No. 17210996.9 mailed Mar. 29, 2023, 10 Pages.

Intention to Grant for European Patent Application No. 19846527.0 mailed Apr. 5, 2023, 9 Pages.

International Preliminary Report on Patentability Chapter I for International Patent Application No. PCT/US2017/068585 mailed May 7, 2020, 8 Pages.

International Preliminary Report on Patentability Chapter I for International Patent Application No. PCT/US2017/068586 mailed Feb. 20, 2020, 11 Pages.

International Preliminary Report on Patentability Chapter I for International Patent Application No. PCT/US2018/030145 mailed Nov. 14, 2019, 8 Pages.

International Preliminary Report on Patentability Chapter I for International Patent Application No. PCT/US2019/018097 mailed Feb. 18, 2021, 8 Pages.

International Preliminary Report on Patentability Chapter I for International Patent Application No. PCT/US2019/030015 mailed Dec. 3, 2020, 5 Pages.

International Preliminary Report on Patentability Chapter I for International Patent Application No. PCT/US2021/051757 mailed Apr. 6, 2023, 7 Pages.

Office Communication for U.S. Appl. No. 16/525,290 mailed Jul. 28, 2021, 2 Pages.

Office Communication for U.S. Appl. No. 16/048,939 mailed on Apr. 12, 2019, 5 Pages.

Office Communication for U.S. Appl. No. 17/708,311 mailed on Dec. 21, 2022, 4 pages.

Office Communication for U.S. Appl. No. 17/708,311 mailed on Jun. 2, 2023, 16 pages.

Office Communication for U.S. Appl. No. 17/708,311 mailed on Jun. 20, 2022, 15 pages.

Office Communication for U.S. Appl. No. 17/708,311 mailed on Oct. 5, 2022, 15 pages.

Office Communication for U.S. Appl. No. 17/708,311 mailed on Sep. 13, 2023, 11 pages.

Office Communication for U.S. Appl. No. 11/679,356 mailed Dec. 11, 2009, 23 Pages.

Office Communication for U.S. Appl. No. 11/679,356 mailed Feb. 22, 2010, 3 Pages.

Office Communication for U.S. Appl. No. 11/679,356 mailed Jun. 22, 2009, 21 Pages.

Office Communication for U.S. Appl. No. 11/679,356 mailed Mar. 4, 2011, 15 Pages.

Office Communication for U.S. Appl. No. 11/679,356 mailed Sep. 9, 2010, 27 Pages.

Office Communication for U.S. Appl. No. 14/500,893 mailed Apr. 28, 2015, 6 Pages.

Office Communication for U.S. Appl. No. 14/500,893 mailed Aug. 31, 2015, 7 Pages.

Office Communication for U.S. Appl. No. 15/014,932 mailed Dec. 19, 2018, 2 Pages.

Office Communication for U.S. Appl. No. 15/457,886 mailed Oct. 12, 2018, 3 Pages.

Office Communication for U.S. Appl. No. 15/466,248 mailed Sep. 27, 2018, 3 Pages.

Office Communication for U.S. Appl. No. 15/585,887 mailed Apr. 27, 2018, 25 Pages.

Office Communication for U.S. Appl. No. 15/585,887 mailed Jan. 15, 2019, 6 Pages.

Office Communication for U.S. Appl. No. 15/585,887 mailed Mar. 8, 2018, 6 Pages.

Office Communication for U.S. Appl. No. 15/585,887 mailed Nov. 18, 2019, 9 Pages.

Office Communication for U.S. Appl. No. 15/585,887 mailed Oct. 23, 2018, 27 Pages.

Office Communication for U.S. Appl. No. 15/585,887 mailed Sep. 3, 2019, 29 Pages.

Office Communication for U.S. Appl. No. 15/675,216 mailed Mar. 22, 2018, 9 Pages.

Office Communication for U.S. Appl. No. 15/694,229 mailed Jan. 9, 2019, 11 Pages.

Office Communication for U.S. Appl. No. 15/694,229 mailed Jul. 26, 2018, 16 Pages.

Office Communication for U.S. Appl. No. 15/793,880 mailed Mar. 1, 2018, 9 Pages.

Office Communication for U.S. Appl. No. 15/891,273 mailed Mar. 13, 2019, 6 Pages.

Office Communication for U.S. Appl. No. 15/891,311 mailed Dec. 11, 2018, 4 Pages.

Office Communication for U.S. Appl. No. 15/891,311 mailed Mar. 13, 2019, 2 Pages.

Office Communication for U.S. Appl. No. 15/893,519 mailed Dec. 12, 2018, 4 Pages.

Office Communication for U.S. Appl. No. 15/893,519 mailed Feb. 1, 2019, 21 Pages.

Office Communication for U.S. Appl. No. 15/893,519 mailed May 4, 2018, 10 Pages.

Office Communication for U.S. Appl. No. 15/893,519 mailed Sep. 27, 2018, 17 Pages.

Office Communication for U.S. Appl. No. 16/100,116 mailed Jul. 10, 2019, 4 Pages.

Office Communication for U.S. Appl. No. 15/585,887 mailed May 3, 2024, 45 Pages.

Office Communication for U.S. Appl. No. 17/516,063 mailed Apr. 19, 2024, 4 Pages.

Office Communication for U.S. Appl. No. 15/585,887 mailed Jun. 7, 2024, 4 Pages.

Office Communication for U.S. Appl. No. 17/516,063 mailed Jun. 4, 2024, 13 Pages.

Office Communication for U.S. Appl. No. 17/516,529 mailed Jul. 2, 2024, 12 Pages.

Office Communication for U.S. Appl. No. 17/826,011 mailed Jul. 8, 2024, 12 Pages.

(56) References Cited

OTHER PUBLICATIONS

Office Communication for U.S. Appl. No. 15/585,887 mailed Aug. 15, 2024, 45 Pages.

Extended European Search Report for European Patent Application No. 21873430.9 mailed Sep. 16, 2024, 14 Pages.

Pérez Eloy, "Kerberos (I): How does Kerberos work?—Theory", Mar. 20, 2019, BlackArrow, Tarlogic, Available online at <https://www.tarlogic.com/blog/how-kerberos-works/>, 23 pages.

Office Communication for U.S. Appl. No. 17/516,063 mailed Oct. 17, 2024, 13 Pages.

Office Communication for U.S. Appl. No. 17/826,011 mailed Oct. 24, 2024, 7 Pages.

Office Communication for U.S. Appl. No. 18/901,801 mailed Nov. 21, 2024, 21 Pages.

Office Communication for U.S. Appl. No. 15/585,887 mailed Jan. 15, 2025, 46 Pages.

Office Communication for U.S. Appl. No. 17/516,063 mailed Feb. 4, 2025, 7 Pages.

Office Communication for U.S. Appl. No. 17/516,063 mailed Jan. 6, 2025, 4 Pages.

Office Communication for U.S. Appl. No. 18/901,801 mailed Mar. 5, 2025, 12 Pages.

Office Communication for U.S. Appl. No. 15/585,887 mailed Apr. 10, 2025, 3 Pages.

Office Communication for U.S. Appl. No. 19/181,210 mailed Jun. 24, 2025, 21 Pages.

Office Communication for U.S. Appl. No. 15/585,887 mailed Aug. 1, 2025, 45 Pages.

Office Communication for U.S. Appl. No. 18/530,616 mailed Aug. 21, 2025, 12 Pages.

Office Communication for U.S. Appl. No. 19/181,210 mailed Oct. 22, 2025, 10 Pages.

Office Communication for U.S. Appl. No. 15/971,843 mailed Oct. 27, 2020, 11 Pages.

Office Communication for U.S. Appl. No. 15/984,197 mailed Aug. 31, 2018, 25 Pages.

Office Communication for U.S. Appl. No. 16/048,939 mailed Dec. 5, 2019, 9 Pages.

Office Communication for U.S. Appl. No. 16/048,939 mailed Feb. 18, 2020, 6 Pages.

Office Communication for U.S. Appl. No. 16/048,939 mailed Jun. 20, 2019, 8 Pages.

Office Communication for U.S. Appl. No. 16/048,939 mailed Mar. 26, 2020, 6 Pages.

Office Communication for U.S. Appl. No. 16/048,939 mailed Sep. 19, 2018, 9 Pages.

Office Communication for U.S. Appl. No. 16/100,116 mailed May 30, 2019, 5 Pages.

Office Communication for U.S. Appl. No. 16/100,116 mailed Nov. 15, 2018, 7 Pages.

Office Communication for U.S. Appl. No. 16/107,509 mailed Apr. 1, 2019, 21 Pages.

Office Communication for U.S. Appl. No. 16/107,509 mailed Aug. 21, 2019, 25 Pages.

Office Communication for U.S. Appl. No. 16/107,509 mailed Jan. 23, 2020, 12 Pages.

Office Communication for U.S. Appl. No. 16/107,509 mailed Jun. 14, 2019, 5 Pages.

Office Communication for U.S. Appl. No. 16/107,509 mailed Oct. 26, 2018, 26 Pages.

Office Communication for U.S. Appl. No. 16/113,442 mailed Jun. 5, 2019, 7 Pages.

Office Communication for U.S. Appl. No. 16/113,442 mailed Nov. 6, 2018, 10 Pages.

Office Communication for U.S. Appl. No. 16/174,051 mailed Jan. 29, 2019, 21 Pages.

Office Communication for U.S. Appl. No. 16/384,697 mailed May 30, 2019, 12 Pages.

Office Communication for U.S. Appl. No. 16/384,697 mailed Oct. 17, 2019, 8 Pages.

Office Communication for U.S. Appl. No. 16/424,387 mailed Feb. 24, 2020, 15 Pages.

Office Communication for U.S. Appl. No. 16/424,387 mailed Nov. 24, 2020, 23 Pages.

Office Communication for U.S. Appl. No. 16/459,472 mailed Aug. 14, 2019, 15 Pages.

Office Communication for U.S. Appl. No. 16/459,472 mailed Feb. 3, 2020, 7 Pages.

Office Communication for U.S. Appl. No. 16/525,290 mailed Jun. 15, 2021, 4 Pages.

Office Communication for U.S. Appl. No. 16/525,290 mailed Mar. 12, 2020, 10 Pages.

Office Communication for U.S. Appl. No. 16/525,290 mailed Mar. 31, 2021, 11 Pages.

Office Communication for U.S. Appl. No. 16/525,290 mailed Oct. 31, 2019, 9 Pages.

Office Communication for U.S. Appl. No. 16/525,290 mailed Sep. 23, 2020, 10 Pages.

Office Communication for U.S. Appl. No. 16/532,275 mailed Oct. 24, 2019, 29 Pages.

Office Communication for U.S. Appl. No. 16/543,243 mailed Apr. 7, 2020, 22 Pages.

Office Communication for U.S. Appl. No. 16/543,243 mailed Dec. 16, 2020, 13 Pages.

Office Communication for U.S. Appl. No. 16/543,243 mailed Sep. 27, 2019, 24 Pages.

Office Communication for U.S. Appl. No. 16/560,886 mailed Apr. 22, 2020, 10 Pages.

Office Communication for U.S. Appl. No. 16/560,886 mailed Dec. 6, 2019, 17 Pages.

Office Communication for U.S. Appl. No. 16/565,109 mailed Jan. 19, 2021, 9 Pages.

Office Communication for U.S. Appl. No. 16/565,109 mailed May 8, 2020, 19 Pages.

Office Communication for U.S. Appl. No. 16/565,109 mailed Nov. 27, 2019, 18 Pages.

Office Communication for U.S. Appl. No. 16/679,055 mailed Feb. 14, 2020, 32 Pages.

Office Communication for U.S. Appl. No. 16/679,055 mailed Jul. 26, 2021, 34 Pages.

Office Communication for U.S. Appl. No. 16/679,055 mailed Jun. 3, 2022, 34 Pages.

Office Communication for U.S. Appl. No. 16/679,055 mailed Mar. 16, 2021, 33 Pages.

Office Communication for U.S. Appl. No. 16/679,055 mailed Mar. 2, 2022, 35 Pages.

Office Communication for U.S. Appl. No. 16/679,055 mailed May 11, 2022, 3 Pages.

Office Communication for U.S. Appl. No. 16/679,055 mailed Nov. 12, 2021, 34 Pages.

Office Communication for U.S. Appl. No. 16/679,055 mailed Oct. 12, 2021, 3 Pages.

Office Communication for U.S. Appl. No. 16/679,055 mailed Sep. 21, 2022, 25 Pages.

Office Communication for U.S. Appl. No. 16/679,055 mailed Sep. 28, 2022, 2 Pages.

Office Communication for U.S. Appl. No. 16/679,055 mailed Sep. 4, 2020, 5 Pages.

Office Communication for U.S. Appl. No. 16/718,050 mailed Feb. 27, 2020, 21 Pages.

Office Communication for U.S. Appl. No. 16/718,050 mailed Jul. 27, 2021, 23 Pages.

Office Communication for U.S. Appl. No. 16/718,050 mailed Sep. 4, 2020, 23 Pages.

Office Communication for U.S. Appl. No. 16/813,649 mailed Apr. 1, 2022, 4 Pages.

Office Communication for U.S. Appl. No. 16/813,649 mailed Dec. 20, 2021, 44 Pages.

Office Communication for U.S. Appl. No. 16/813,649 mailed Feb. 24, 2021, 7 Pages.

Office Communication for U.S. Appl. No. 16/813,649 mailed May 11, 2022, 16 Pages.

(56) References Cited

OTHER PUBLICATIONS

Office Communication for U.S. Appl. No. 16/820,582 mailed Jan. 14, 2022, 13 Pages.

Office Communication for U.S. Appl. No. 16/820,582 mailed May 10, 2021, 24 Pages.

Office Communication for U.S. Appl. No. 16/820,582 mailed Sep. 27, 2021, 25 Pages.

Office Communication for U.S. Appl. No. 16/989,025 mailed Jan. 19, 2022, 12 Pages.

Office Communication for U.S. Appl. No. 16/989,025 mailed May 23, 2022, 14 Pages.

Office Communication for U.S. Appl. No. 16/989,343 mailed Mar. 29, 2022, 5 Pages.

Office Communication for U.S. Appl. No. 17/214,555 mailed Mar. 21, 2023, 25 Pages.

Office Communication for U.S. Appl. No. 17/214,555 mailed Nov. 10, 2022, 21 Pages.

Office Communication for U.S. Appl. No. 17/226,947 mailed Dec. 30, 2021, 6 Pages.

Office Communication for U.S. Appl. No. 17/226,947 mailed Jul. 11, 2022, 13 Pages.

Office Communication for U.S. Appl. No. 17/318,423 mailed Mar. 29, 2022, 21 Pages.

Office Communication for U.S. Appl. No. 17/318,423 mailed Sep. 13, 2022, 15 Pages.

Office Communication for U.S. Appl. No. 17/318,423 mailed Sep. 22, 2022, 2 Pages.

Office Communication for U.S. Appl. No. 17/337,299 mailed Feb. 17, 2022, 14 Pages.

Office Communication for U.S. Appl. No. 17/337,299 mailed Oct. 21, 2021, 34 Pages.

Office Communication for U.S. Appl. No. 17/351,866 mailed Feb. 9, 2022, 9 Pages.

Office Communication for U.S. Appl. No. 17/351,866 mailed Oct. 18, 2021, 12 Pages.

Office Communication for U.S. Appl. No. 17/483,148 mailed Dec. 13, 2021, 12 Pages.

Office Communication for U.S. Appl. No. 17/515,963 mailed Feb. 1, 2023, 2 Pages.

Office Communication for U.S. Appl. No. 17/515,963 mailed Jan. 24, 2023, 8 Pages.

Office Communication for U.S. Appl. No. 17/515,963 mailed Oct. 7, 2022, 27 Pages.

Office Communication for U.S. Appl. No. 17/516,063 mailed Aug. 11, 2023, 11 Pages.

Office Communication for U.S. Appl. No. 17/516,063 mailed Jul. 31, 2023, 3 Pages.

Office Communication for U.S. Appl. No. 17/516,063 mailed May 19, 2023, 10 pages.

Office Communication for U.S. Appl. No. 17/516,063 mailed Oct. 31, 2022, 10 Pages.

Office Communication for U.S. Appl. No. 17/712,521 mailed Aug. 2, 2023, 14 Pages.

Office Communication for U.S. Appl. No. 17/712,521 mailed Mar. 21, 2023, 13 Pages.

Office Communication for U.S. Appl. No. 17/721,514 mailed Oct. 11, 2022, 2 Pages.

Office Communication for U.S. Appl. No. 17/721,514 mailed Sep. 20, 2022, 8 pages.

Office Communication for U.S. Appl. No. 17/722,217 mailed Jul. 15, 2022, 7 Pages.

Office Communication for U.S. Appl. No. 17/722,217 mailed Jun. 29, 2022, 23 Pages.

Office Communication for U.S. Appl. No. 17/861,373 mailed Jan. 11, 2023, 10 Pages.

Office Communication for U.S. Appl. No. 17/861,373 mailed Jan. 19, 2023, 2 Pages.

Office Communication for U.S. Appl. No. 17/861,373 mailed Sep. 9, 2022, 18 Pages.

Parsons, "Moving Across the Internet: Code-Bodies, Code-Corpses, and Network Architecture," May 9, 2010, 20 pages.

Shaver, Jim, "Decrypting TLS Browser Traffic with Wreshark the easy way", https://jimshaver.net/2015/02/11/decrypting-tls-browser-traffic-with-wireshark-the-easy-way/, Feb. 11, 2015, pp. 1-30.

Supplementary European Search Report for European Patent Application No. 19804040.4 mailed Jan. 25, 2022, 4 Pages.

Svoboda, Jakub, "Network Traffic Analysis with Deep Packet inspection Method," Masaryk University, Faculty of Informatics, Master's Thesis, 2014, 74 Pages.

Wade, Susan Marie, "SCADA Honeynets: The attractiveness of honeypots as critical infrastructure security tools for the detection and analysis of advanced threats" (2011). Graduate Theses and Dissertations. 12138. https://lib.dr.iastate.edu/etd/12138, 67 Pages.

Zander et al., "Covert Channels and Countermeasures in Computer Network Protocols," Dec. 2007, 7 pages.

Examination Report for European Patent Application No. 16166907.2 mailed Dec. 19, 2019, 6 Pages.

Office Communication for U.S. Appl. No. 15/585,887 mailed Jan. 26, 2024, 44 Pages.

Office Communication for U.S. Appl. No. 17/516,063 mailed Feb. 7, 2024, 11 Pages.

Office Communication for U.S. Appl. No. 17/826,011 mailed Feb. 16, 2024, 6 Pages.

Office Communication for U.S. Appl. No. 17/516,529 mailed Feb. 29, 2024, 20 Pages.

Office Communication for U.S. Appl. No. 15/207,213 mailed Feb. 23, 2017, 24 Pages.

Office Communication for U.S. Appl. No. 15/207,213 mailed Jun. 1, 2017, 24 Pages.

Office Communication for U.S. Appl. No. 15/207,213 mailed May 8, 2017, 6 Pages.

Office Communication for U.S. Appl. No. 15/207,213 mailed Oct. 25, 2016, 18 Pages.

Office Communication for U.S. Appl. No. 15/219,016 mailed Mar. 16, 2017, 9 Pages.

Office Communication for U.S. Appl. No. 15/289,760 mailed Dec. 12, 2016, 12 Pages.

Office Communication for U.S. Appl. No. 15/356,381 mailed Jan. 6, 2017, 57 Pages.

Office Communication for U.S. Appl. No. 15/356,381 mailed Jul. 3, 2017, 21 Pages.

Office Communication for U.S. Appl. No. 15/443,868 mailed Apr. 27, 2017, 7 Pages.

Office Communication for U.S. Appl. No. 15/457,886 mailed Jul. 18, 2018, 11 Pages.

Office Communication for U.S. Appl. No. 15/457,886 mailed Mar. 20, 2019, 9 Pages.

Office Communication for U.S. Appl. No. 15/466,248 mailed Jan. 11, 2018, 2 Pages.

Office Communication for U.S. Appl. No. 15/466,248 mailed Jul. 11, 2018, 31 Pages.

Office Communication for U.S. Appl. No. 15/466,248 mailed Jun. 5, 2017, 30 Pages.

Office Communication for U.S. Appl. No. 15/466,248 mailed Mar. 8, 2018, 34 Pages.

Office Communication for U.S. Appl. No. 15/466,248 mailed May 16, 2019, 33 Pages.

Office Communication for U.S. Appl. No. 15/466,248 mailed Oct. 18, 2018, 31 Pages.

Office Communication for U.S. Appl. No. 15/466,248 mailed Oct. 3, 2017, 34 Pages.

Office Communication for U.S. Appl. No. 15/466,248 mailed Sep. 10, 2019, 27 Pages.

Office Communication for U.S. Appl. No. 15/585,887 mailed Aug. 17, 2021, 41 Pages.

Office Communication for U.S. Appl. No. 15/585,887 mailed Dec. 22, 2022, 38 Pages.

Office Communication for U.S. Appl. No. 15/585,887 mailed Jan. 22, 2020, 28 Pages.

Office Communication for U.S. Appl. No. 15/585,887 mailed Jun. 27, 2017, 24 Pages.

(56)             References Cited

OTHER PUBLICATIONS

Office Communication for U.S. Appl. No. 15/585,887 mailed Jun. 7, 2023, 43 pages.

Office Communication for U.S. Appl. No. 15/585,887 mailed Mar. 20, 2019, 26 Pages.

Office Communication for U.S. Appl. No. 15/585,887 mailed Mar. 24, 2022, 40 Pages.

Office Communication for U.S. Appl. No. 15/585,887 mailed Mar. 26, 2021, 31 Pages.

Office Communication for U.S. Appl. No. 15/585,887 mailed Nov. 2, 2021, 4 Pages.

Office Communication for U.S. Appl. No. 15/585,887 mailed Nov. 21, 2022, 6 Pages.

Office Communication for U.S. Appl. No. 15/585,887 mailed Nov. 28, 2017, 23 Pages.

Office Communication for U.S. Appl. No. 15/585,887 mailed Sep. 1, 2022, 39 Pages.

Office Communication for U.S. Appl. No. 15/671,060 mailed May 8, 2019, 19 Pages.

Office Communication for U.S. Appl. No. 15/675,216 mailed Aug. 28, 2018, 14 Pages.

Office Communication for U.S. Appl. No. 15/675,216 mailed Jan. 29, 2019, 8 Pages.

Office Communication for U.S. Appl. No. 15/675,216 mailed Jun. 7, 2018, 4 Pages.

Office Communication for U.S. Appl. No. 15/675,216 mailed Nov. 20, 2017, 7 Pages.

Office Communication for U.S. Appl. No. 15/690,135 mailed Jan. 18, 2018, 6 Pages.

Office Communication for U.S. Appl. No. 15/690,135 mailed May 22, 2018, 7 Pages.

Office Communication for U.S. Appl. No. 15/855,769 mailed Feb. 5, 2019, 10 Pages.

Office Communication for U.S. Appl. No. 15/891,273 mailed Jan. 15, 2019, 23 Pages.

Office Communication for U.S. Appl. No. 15/891,273 mailed Jun. 19, 2018, 20 Pages.

Office Communication for U.S. Appl. No. 15/891,273 mailed May 28, 2019, 14 Pages.

Office Communication for U.S. Appl. No. 15/891,311 mailed Apr. 23, 2018, 18 Pages.

Office Communication for U.S. Appl. No. 15/891,311 mailed Jan. 29, 2019, 8 Pages.

Office Communication for U.S. Appl. No. 15/891,311 mailed Sep. 24, 2018, 14 Pages.

Office Communication for U.S. Appl. No. 15/892,327 mailed Apr. 23, 2018, 6 Pages.

Office Communication for U.S. Appl. No. 15/971,843 mailed Jul. 28, 2021, 9 Pages.

Office Communication for U.S. Appl. No. 15/971,843 mailed Mar. 26, 2020, 14 Pages.

Office Communication for U.S. Appl. No. 15/971,843 mailed May 5, 2021, 9 Pages.

Office Communication for U.S. Appl. No. 15/971,843 mailed Oct. 22, 2019, 15 Pages.

Office Communication for U.S. Appl. No. 13/831,908 mailed Jan. 13, 2014, 31 Pages.

Office Communication for U.S. Appl. No. 14/518,996 mailed Apr. 20, 2015, 37 Pages.

Office Communication for U.S. Appl. No. 14/695,690 mailed Sep. 9, 2015, 41 Pages.

Office Communication for U.S. Appl. No. 15/014,932 mailed Aug. 1, 2017, 27 Pages.

Office Communication for U.S. Appl. No. 15/014,932 mailed Mar. 3, 2017, 6 Pages.

Office Communication for U.S. Appl. No. 15/219,016 mailed Nov. 22, 2016, 12 Pages.

Office Communication for U.S. Appl. No. 15/443,868 mailed Aug. 11, 2017, 11 Pages.

Office Communication for U.S. Appl. No. 15/457,886 mailed Jan. 5, 2018, 11 Pages.

Office Communication for U.S. Appl. No. 15/585,887 mailed Aug. 28, 2020, 30 Pages.

Office Communication for U.S. Appl. No. 16/384,574 mailed Jan. 13, 2020, 8 Pages.

Office Communication for U.S. Appl. No. 16/384,574 mailed May 31, 2019, 12 Pages.

Office Communication for U.S. Appl. No. 16/384,574 mailed Oct. 8, 2019, 13 Pages.

Office Communication for U.S. Appl. No. 11/683,643 mailed Apr. 28, 2010, 35 Pages.

Office Communication for U.S. Appl. No. 11/683,643 mailed Jan. 23, 2012, 22 Pages.

Office Communication for U.S. Appl. No. 11/683,643 mailed Oct. 14, 2010, 43 Pages.

Office Communication for U.S. Appl. No. 12/326,672 mailed Dec. 23, 2010, 15 Pages.

Office Communication for U.S. Appl. No. 12/326,672 mailed Jun. 22, 2011, 16 Pages.

Office Communication for U.S. Appl. No. 12/326,672 mailed Jun. 9, 2010, 9 Pages.

Office Communication for U.S. Appl. No. 12/326,672 mailed Oct. 24, 2011, 9 Pages.

Office Communication for U.S. Appl. No. 13/831,626 mailed Sep. 3, 2013, 17 Pages.

Office Communication for U.S. Appl. No. 13/831,673 mailed Mar. 6, 2014, 12 Pages.

Office Communication for U.S. Appl. No. 13/831,673 mailed May 22, 2014, 5 Pages.

Office Communication for U.S. Appl. No. 13/831,673 mailed Sep. 30, 2013, 10 Pages.

Office Communication for U.S. Appl. No. 13/831,908 mailed Apr. 9, 2014, 3 Pages.

Office Communication for U.S. Appl. No. 13/831,908 mailed Aug. 9, 2013, 29 Pages.

Office Communication for U.S. Appl. No. 13/831,908 mailed Jun. 25, 2014, 15 Pages.

Office Communication for U.S. Appl. No. 13/831,959 mailed Aug. 22, 2013, 9 Pages.

Office Communication for U.S. Appl. No. 14/107,580 mailed Mar. 17, 2015, 5 Pages.

Office Communication for U.S. Appl. No. 14/107,580 mailed Mar. 6, 2014, 13 Pages.

Office Communication for U.S. Appl. No. 14/107,580 mailed Sep. 15, 2014, 15 Pages.

Office Communication for U.S. Appl. No. 14/107,631 mailed Dec. 30, 2014, 12 Pages.

Office Communication for U.S. Appl. No. 14/107,631 mailed Feb. 20, 2014, pp. 1-16,.

Office Communication for U.S. Appl. No. 14/107,631 mailed Sep. 26, 2014, pp. 1-14.

Office Communication for U.S. Appl. No. 14/500,893 mailed Feb. 18, 2015, 11 Pages.

Office Communication for U.S. Appl. No. 14/500,893 mailed Jun. 15, 2015, 12 Pages.

Office Communication for U.S. Appl. No. 14/500,893 mailed Nov. 20, 2014, 15 Pages.

Office Communication for U.S. Appl. No. 14/518,996 mailed Jul. 21, 2015, 17 Pages.

Office Communication for U.S. Appl. No. 14/518,996 mailed Nov. 20, 2014, 41 Pages.

Office Communication for U.S. Appl. No. 14/695,690 mailed Feb. 24, 2016, 11 Pages.

Office Communication for U.S. Appl. No. 14/750,905 mailed Jan. 19, 2016, 5 Pages.

Office Communication for U.S. Appl. No. 14/750,905 mailed Sep. 22, 2015, 12 Pages.

Office Communication for U.S. Appl. No. 15/014,932 mailed May 15, 2018, 23 Pages.

Office Communication for U.S. Appl. No. 15/014,932 mailed Dec. 14, 2016, 26 Pages.

(56) References Cited

OTHER PUBLICATIONS

Office Communication for U.S. Appl. No. 15/014,932 mailed Jul. 16, 2018, 4 Pages.

Office Communication for U.S. Appl. No. 15/014,932 mailed Jun. 10, 2016, 20 Pages.

Office Communication for U.S. Appl. No. 15/014,932 mailed Nov. 23, 2018, 10 Pages.

Office Communication for U.S. Appl. No. 15/082,925 mailed Feb. 1, 2017, 6 Pages.

Office Communication for U.S. Appl. No. 15/082,925 mailed Sep. 13, 2016, 7 Pages.

Office Communication for U.S. Appl. No. 15/150,354 mailed Feb. 8, 2017, 8 Pages.

Office Communication for U.S. Appl. No. 15/150,354 mailed Jul. 5, 2016, 18 Pages.

Postel Jon, "Transmission Control Protocol", DARPA Internet Program, RFC: 793, Sep. 1981, 91 pages.

Office Communication for U.S. Appl. No. 16/113,442 mailed Mar. 22, 2019, 9 Pages.

Office Communication for U.S. Appl. No. 16/243,001 mailed Apr. 3, 2019, 16 Pages.

Office Communication for U.S. Appl. No. 16/391,216 mailed Jul. 8, 2019, 15 Pages.

Office Communication for U.S. Appl. No. 16/391,216 mailed Oct. 24, 2019, 16 Pages.

Office Communication for U.S. Appl. No. 16/424,387 mailed Oct. 18, 2019, 5 Pages.

Office Communication for U.S. Appl. No. 16/442,257 mailed Jul. 16, 2019, 11 Pages.

Office Communication for U.S. Appl. No. 16/989,025 mailed Jun. 8, 2022, 2 Pages.

Office Communication for U.S. Appl. No. 17/337,299 mailed Jun. 15, 2022, 2 Pages.

Office Communication for U.S. Appl. No. 17/483,148 mailed Mar. 2, 2022, 2 Pages.

Office Communication for U.S. Appl. No. 17/712,521 mailed Nov. 13, 2023, 8 Pages.

Office Communication for U.S. Appl. No. 17/712,521 mailed Oct. 11, 2023, 4 Pages.

Office Communication for U.S. Appl. No. 17/826,011 mailed Sep. 14, 2023, 13 Pages.

Office Communication for U.S. Appl. No. 15/466,248 mailed Apr. 15, 2019, 4 Pages.

Office Communication for U.S. Appl. No. 15/466,248 mailed Feb. 7, 2019, 32 Pages.

Office Communication for U.S. Appl. No. 15/585,887 mailed Sep. 11, 2023, 5 Pages.

Office Communication for U.S. Appl. No. 17/826,011 mailed Dec. 26, 2023, 11 Pages.

Examination Report for European Patent Application No. 16166907.2 mailed Mar. 9, 2018, 4 Pages.

Examination Report for European Patent Application No. 17210996.9 mailed May 21, 2021, 6 Pages.

Examination Report for European Patent Application No. 17210996.9 mailed May 27, 2020, 3 Pages.

Extended European Search Report for European Patent Application No. 16166907.2 mailed Sep. 30, 2016, 7 Pages.

Extended European Search Report for European Patent Application No. 17210995.1 mailed Jul. 6, 2018, 11 Pages.

Extended European Search Report for European Patent Application No. 17210996.9 mailed Jun. 13, 2018, 7 Pages.

Extended European Search Report for European Patent Application No. 19846527.0 mailed Apr. 4, 2022, 9 Pages.

International Search Report and Written Opinion for International Patent Application No. PCT/US2017/068585 mailed Jul. 4, 2018, 9 Pages.

International Search Report and Written Opinion for International Patent Application No. PCT/US2017/068586 mailed Aug. 9, 2018, 12 Pages.

International Search Report and Written Opinion for International Patent Application No. PCT/US2018/030145 mailed Aug. 10, 2018, 10 Pages.

International Search Report and Written Opinion for International Patent Application No. PCT/US2019/018097 mailed May 28, 2019, 9 Pages.

International Search Report and Written Opinion for International Patent Application No. PCT/US2019/030015 mailed Aug. 7, 2019, 6 Pages.

International Search Report and Written Opinion for International Patent Application No. PCT/US2021/051757 mailed Jan. 11, 2022, 8 Pages.

Office Communication for U.S. Appl. No. 16/525,290 mailed Jul. 9, 2021, 7 Pages.

Office Communication for U.S. Appl. No. 16/532,275 mailed Apr. 20, 2020, 8 Pages.

Office Communication for U.S. Appl. No. 15/855,769 mailed on May 1, 2019, 7 Pages.

Office Communication for U.S. Appl. No. 16/048,939 mailed on Jan. 31, 2019, 7 Pages.

Office Communication for U.S. Appl. No. 16/989,343 mailed Aug. 11, 2022, 9 Pages.

Office Communication for U.S. Appl. No. 16/989,343 mailed Aug. 17, 2022, 5 Pages.

Office Communication for U.S. Appl. No. 17/483,435 mailed Nov. 30, 2021, 21 Pages.

Office Communication for U.S. Appl. No. 17/721,514 mailed Jul. 21, 2022, 7 Pages.

Office Communication for U.S. Appl. No. 11/683,643 mailed Aug. 25, 2011, 43 Pages.

"Kerberos Overview—An Authentication Service for Open Network Systems," CISCO Systems, Inc., Jan. 19, 2006, https://www.cisco.comlclen/US/support/docs/security-vpn/kerberos/16087-1.html, Accessed: Feb. 9, 2022, pp. 1-16.

Beckett et al., "New Sensing Technique for Detecting Application Layer DDoS Attacks Targeting Back-end Database Resources," IEEE International Conference on Communications (ICC 2017), May 2017, 7 Pages.

Conry-Murray, Andrew, "Security Event Management Gets Specialized," Network Magazine, CMP Media, vol. 20, Nov. 2005, 6 Pages.

Digital Imaging and Communications in Medicine (DICOM), Part 6: Data Dictionary, PS 3.6-2011. 2011, http://dicorn.nerna.org/Dicom12011 111_06pu.pdf, pp. 1-216.

Fuertes, "Evaluation of OSPF Extensions in MANET Routing," Paris, 2007, 192 pages.

Handel et al., "Hiding Data in the OSI Network Model", Los Alamos, New Mexico, 1996, vol. 1174, pp. 23-38.

Handley et al., "Network Intrusion Detection: Evasion, Traffic Normalization, and End-to-End Protocol Semantics," 2011, International Computer Science Institute, 17 pages.

Health Level Seven, Version 2.6, Appendix A, Nov. 2007, 255 Pages.

Information Sciences Institute, "Internet Protocol Darpa Internet Program Protocol Specification," Sep. 1981, 36 pages.

Lin, Mark, "An Overview of Session Hijacking at the Network and Application Levels," Jan. 18, 2005, 16 Pages.

Mozilla Developer Network, "NSS Key Log Format," https://developer.mozilla,orgien-USlclocs/Mozilla/ProjectsINSSIKey_Log_Format, Jan. 8, 2010, p. 1.

* cited by examiner

Figure 3:
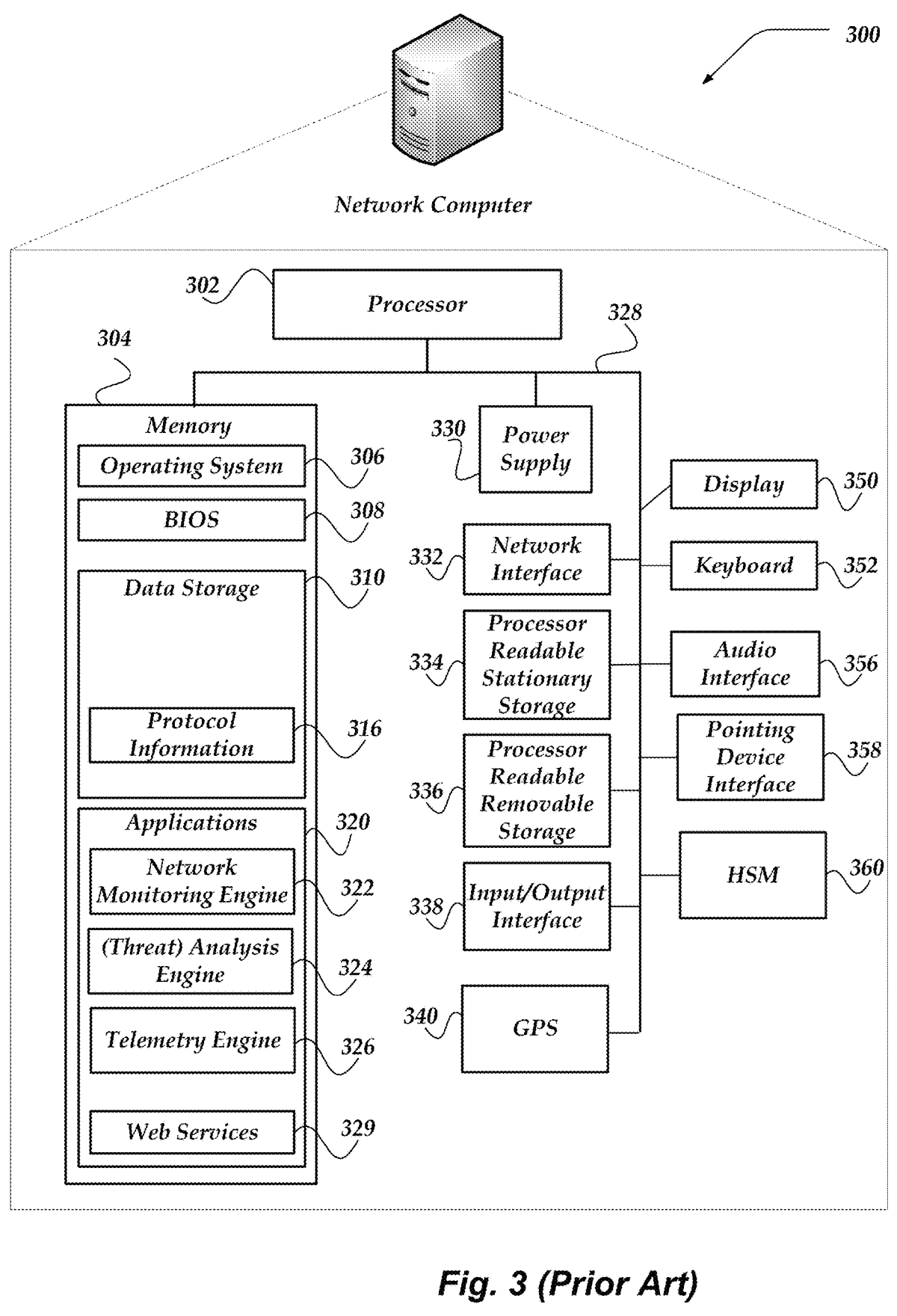

*300*

*Network Computer*

302 — *Processor*

328

304

330 — *Power Supply*

Memory

*Operating System* — 306

*BIOS* — 308

*Data Storage* — 310

332 — *Network Interface*

334 — *Processor Readable Stationary Storage*

336 — *Processor Readable Removable Storage*

338 — *Input/Output Interface*

340 — *GPS*

*Protocol Information* — 316

Applications — 320

*Network Monitoring Engine* — 322

*(Threat) Analysis Engine* — 324

*Telemetry Engine* — 326

*Web Services* — 329

*Display* — 350

*Keyboard* — 352

*Audio Interface* — 356

*Pointing Device Interface* — 358

*HSM* — 360

START

MONITOR USER TELEPHONY ACTIVITY ⌇ *1002*

MONITOR USER MESSAGING ACTIVITY ⌇ *1004*

MONITOR USER NETWORK ACTIVITY ⌇ *1006*

EVALUATE USER ACTIVITY FOR SOCIAL ENGINEERING THREATS ⌇ *1008*

NO

THREAT? ⌇ *1010*

YES

CONDUCT ADDITIONAL INVESTIGATION/MONITORING ⌇ *1012*

GENERATE THREAT REPORTS ⌇ *1014*

RETURN

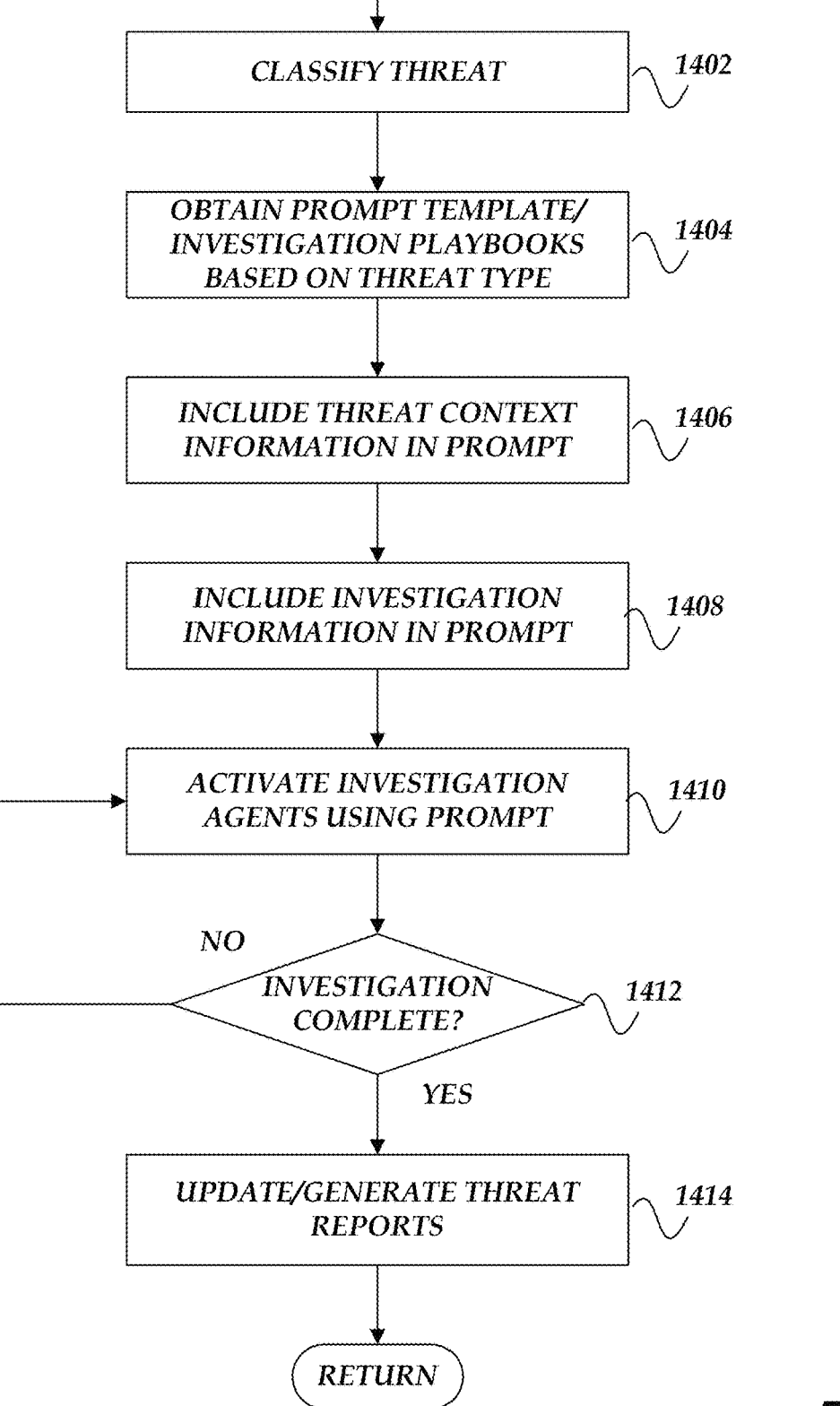
_1400_
START
CLASSIFY THREAT _1402_
OBTAIN PROMPT TEMPLATE/ INVESTIGATION PLAYBOOKS BASED ON THREAT TYPE _1404_
INCLUDE THREAT CONTEXT INFORMATION IN PROMPT _1406_
INCLUDE INVESTIGATION INFORMATION IN PROMPT _1408_
ACTIVATE INVESTIGATION AGENTS USING PROMPT _1410_
NO
INVESTIGATION COMPLETE? _1412_
YES
UPDATE/GENERATE THREAT REPORTS _1414_
RETURN
_Fig. 14_

DETECTING SOCIAL ENGINEERING THREATS

TECHNICAL FIELD

The present invention relates generally to network monitoring, and more particularly, but not exclusively, to detecting social engineering threats.

BACKGROUND

In most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

Increasingly, organizations may be subject to social engineering threats that rely on deceiving or confusing trusts users using a variety of communication methods, open source information, or general deception. There are many different types of social engineering threats that may be attempted by sophisticated bad actors across multiple attack vectors. Accordingly, conventional threat detection methods may be disadvantageous for detecting social engineering threats. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 14 illustrates a flowchart of a process for detecting social engineering threats in accordance with one or more of the various embodiments.

DETAILED DESCRIPTION OF VARIOUS EMBODIMENTS

Figure 1:
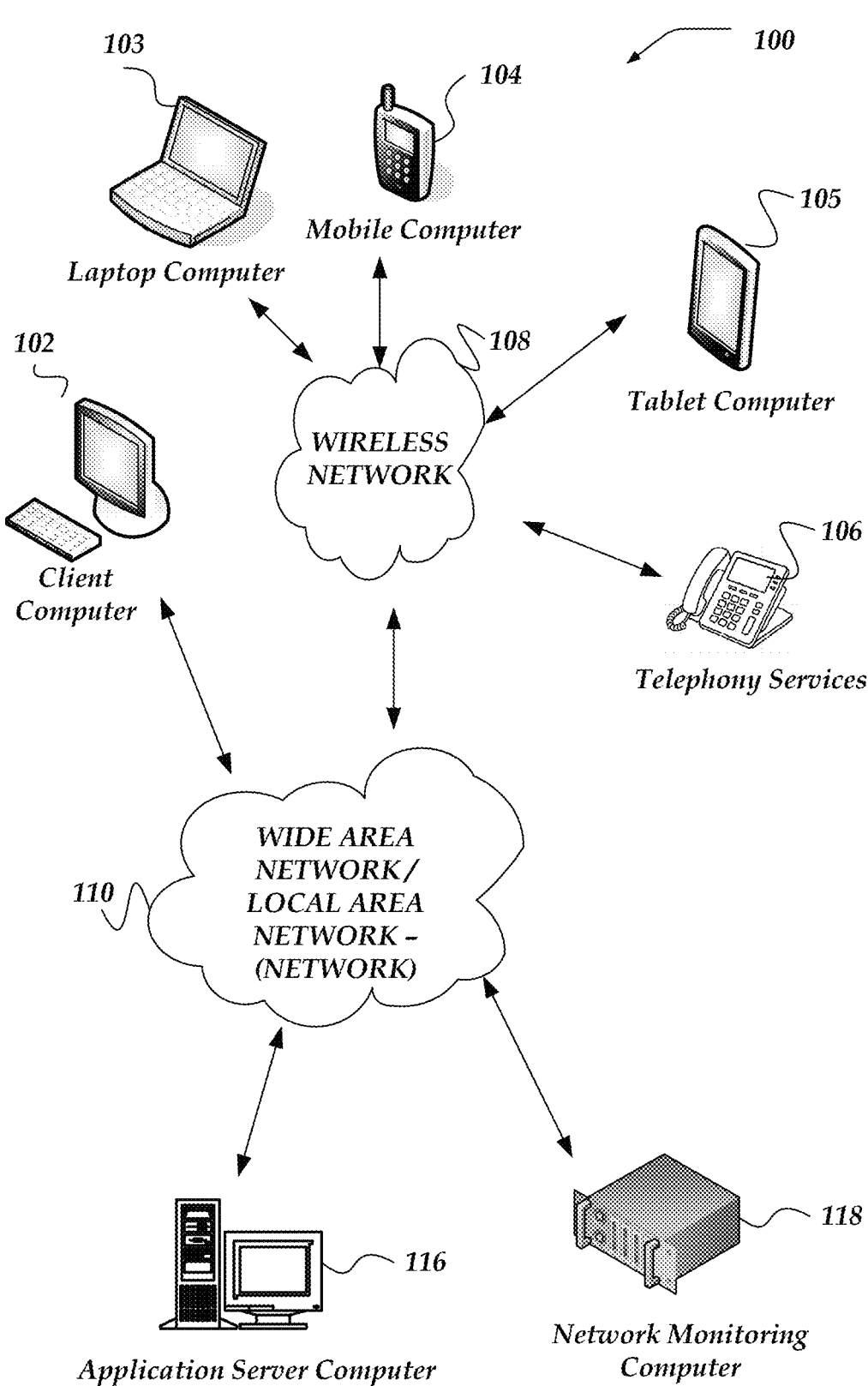
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, Python, R, *Julia*, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated with the same user, application, client computer, source, destination, or the like.

As used herein, the terms "network monitor", "network monitoring computer", or "NMC" refer to an application (software, hardware, or some combination) that is arranged to monitor and record flows of packets in communicated between at least two endpoints over at least one network. NMCs may provide information for assessing different aspects of these monitored flows. In one or more embodiments, NMCs may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, regulatory compliance, or the like. NMCs may receive network communication for monitoring through a variety of means including network taps, wireless receivers, port mirrors or directed tunnels from network switches, clients or servers that include the endpoints themselves, or other infrastructure devices. In at least some of the various embodiments, NMCs may receive a copy of each packet on particular network segments or virtual local area networks (VLANs). Also, for at least some of the various embodiments, NMCs may receive these packet copies through port mirrors on managed Ethernet switches, e.g., Switched Port Analyzers (SPANs) port, Roving Analysis Ports (RAPs), or the like, or combination thereof. Port mirroring may enable analysis and debugging of network communications. Port mirroring may be performed for inbound or outbound traffic (or both) on single or multiple interfaces.

NMCs may track network connections from and to end points such as a client or a server. NMCs may also extract information from network packets including protocol information at various layers of communication protocol stacks. NMCs may reassemble or reconstruct the stream of data exchanged between the endpoints. In some cases, NMCs may perform decryption of the payload at various layers of the protocol stack. NMCs may passively monitor the network traffic, or it may participate in the protocols as a proxy. NMCs may attempt to classify the network traffic based on the communication protocols that are used.

NMCs may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, NMCs may use adaptive protocol classification techniques where information used to classify the protocols may be accumulated or applied over time to further classify the observed protocols. In some embodiments, NMCs may be arranged to employ stateful analysis. Accordingly, for each supported protocol, NMCs may use network packet payload data to drive a state machine that mimics the protocol state changes in the client/server flows being monitored. NMCs may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "capture flow" refers to a network flow as observed or captured by an NMC. NMCs may capture network traffic from observed network flows. Accordingly, capture flows correspond to observed network flows. The distinction between network flows and capture flows is that NMCs do not directly participate in the connection or session associated with the network traffic of network flows. Rather, capture flows represent network traffic captured or observed from one or more network flows.

As used herein, the term "telephony activity" refers to communications or interactions using one or more telephony services. Telephony activity may include communications that may be exchanged between one or more endpoints over one or more networks, including Voice over Internet Protocol (VoIP) traffic, conventional telephony communications, or other voice-based communications that may be monitored by network monitoring computers. Also, telephony services may include video conference call, video calls, AR/VR (augmented reality/virtual reality) communication systems, or the like. Telephony activity may include incoming and outgoing telephone calls, voice dialogue, call metadata, caller identification information, call duration metrics, call frequency patterns, voicemail recordings, video calls, AR/VR sessions, or conversation transcripts. In some embodiments, telephony activity may be monitored through observation ports, network taps, port mirrors, or other monitoring mechanisms that enable NMCs to passively capture and analyze voice communications without participating in the communication protocols. Telephony activity may be associated with various communication protocols including Session Initiation Protocol (SIP), Real-time Transport Protocol (RTP), or other protocols used for voice communications over networks.

As used herein, the term "messaging activity" refers to text-based or multimedia communications that are exchanged between one or more endpoints over one or more networks, including email communications, instant messaging traffic, text messaging exchanges, chat communications, social media interactions, social media communication, or other message-based communications. Messaging activity may include message headers, message content (e.g., text, video, images, or the like), sender information, recipient information, timestamps, message volumes, attachment metadata, or communication frequency patterns. In some embodiments, messaging activity may be monitored by network monitoring computers through observation of network traffic that traverses organizational networks or messaging infrastructure systems. Messaging activity may be associated with various communication protocols and applications including HTTP, SMTP, IMAP, messaging platform APIs, or other protocols used for text-based communications over networks.

As used herein, the term "user communication activity" refers to user activity that may be related to communications or threat analysis but separate from telephony activity or messaging activity. Such activity may include activities (or associated metrics) that pertain to user interactions with other internal or external services or systems such as financial services/systems, file systems, administrative systems, authorization systems, or the like.

As used herein, the terms "generative artificial intelligence," "generative AI," refer to data structures, models, programs, services, or the like that may be trained or designed to perform a variety of data analysis tasks. Typically, generative AI systems may generate responses in response to provided prompts. Often, generative AI may be considered to include neural networks or transformers that have been trained or tuned on large collections of source documents. Accordingly, in some cases, generative AI may be trained to generate predictive responses based on provided prompts. Generative AI prompts may include context information, examples, or the like, that may enable generative AIs to generate responses directed to specific queries or particular problems that go beyond conventional machine learning or other conventional techniques. In some cases, generative AI may include or be referred to as large language models (LLMs). Note, innovation herein should not be considered to be limited to using particular generative AI modeling techniques as these may change or evolve over-time.

As used herein, the term "prompt" refers to one or more data structures that contain or represent prompt information that may be provided to generative AI, LLMs, or the like.

As used herein, the term "non-agentic analysis" refers to conventional analysis techniques that may include natural language processing algorithms, pattern matching filters, statistical analysis methods, rule-based detection systems, signature matching, heuristics, or other computational meth-ods used to identify potential social engineering indicators or threats in monitored network traffic. Non-agentic analysis methods may be configured to detect suspicious keywords or phrases, analyze communication frequency patterns, evalu-ate sender reputation scores, perform validation checks on communication sources, or assess other characteristics com-monly associated with social engineering attempts without employing generative artificial intelligence or machine learning agents. Non-agentic analysis may provide prelimi-nary threat assessments that may be used to determine if additional analysis using generative AI methods is war-ranted.

As used herein, the term "agentic analysis" refers to analysis techniques that employ generative artificial intelli-gence agents, large language models, natural language understanding capabilities, or machine learning systems specifically trained to identify sophisticated social engineer-ing tactics, manipulation strategies, or attack methodologies that may not be detected by conventional analysis methods. Agentic analysis may include the use of AI agents config-ured to analyze semantic content of communications, iden-tify rapport-building techniques, detect authority imperson-ation attempts, recognize escalation sequences, evaluate cross-channel coordination patterns, or the like. In some embodiments, agentic analysis may be performed by pro-viding structured prompts that include relevant context information to generative AI systems that can perform contextual analysis, behavioral pattern recognition, or semantic evaluation of communications to identify subtle social engineering indicators that may escape other detection systems. In some cases, AI agents may include non-agentic preprocessing or postprocessing, such as filters, heuristics, or other non-agentic methods described herein.

As used herein, the term "social engineering" refers to the manipulation of individuals through psychological tactics to trick them into revealing sensitive information, such as passwords or confidential data, or performing actions that compromise security, such as granting unauthorized access or executing malicious instructions, or the attempt thereof. Social engineering may employ various methods including telephone calls, email messages, text messages, social media communications, face-to-face meetings, postal mail, or other communication channels to gain the trust or otherwise manipulate trusted users in an organization. Social engineer-ing attacks may include rapport-building techniques, author-ity impersonation attempts, escalation-based manipulation tactics, multi-vector coordination strategies, or other psy-chological manipulation methods designed to exploit human psychology rather than technical vulnerabilities. In some embodiments, social engineering may involve the use of personal information gathered from public sources or recon-naissance activities to create targeted attack packages that increase the likelihood of successful manipulation of target individuals.

As used herein, the term, "configuration information" refers to information that may include rule based policies, pattern matching, scripts (e.g., computer readable instruc-tions), or the like, that may be provided from various sources, including, configuration files, databases, user input, built-in defaults, or the like, or combination thereof. In some cases, configuration information may include or reference information stored in other systems or services, such as, configuration management databases, Lightweight Direc-tory Access Protocol (LDAP) servers, name services, public key infrastructure services, or the like.

The following briefly describes embodiments of the inno-vations disclosed herein to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to detecting social engineering threats. In one or more of the various embodiments, one or more candidate threats may be obtained based on a non-agentic threat evaluation of tele-phony activity information and messaging activity informa-tion.

In one or more of the various embodiments, an agentic threat evaluation of the one or more candidate threats may be obtained based on one or more prompts that include one or more of the telephony activity information or the mes-saging activity information such that the one or more prompts may be used with one or more agents to evaluate the one or more candidate threats.

In one or more of the various embodiments, one or more social engineering threats may be collected from the agentic threat evaluation such that each social engineering threat may be associated with one or more deceptive tactics to manipulate one or more behaviors of one or more users and such that the one or more social engineering threats may be included in a report.

In one or more of the various embodiments, a user interface may be obtained that includes one or more display panels for content that includes the report and other infor-mation associated with the one or more social engineering threats such that the content may be dynamically trans-formed and arranged for display to a user based on one or more of user interaction telemetry, user feedback or telem-etry metrics.

In one or more of the various embodiments, one or more baseline communication patterns for the one or more users may be collected based on one or more of previous tele-phony activity or previous messaging activity over one or more time periods. In some embodiments, one or more deviation metrics may be obtained based on current com-munication behavior and the one or more baseline commu-nication patterns. And, in some embodiments, one or more anomaly indicators may be obtained associated with the one or more deviation metrics that exceed one or more threshold values.

In one or more of the various embodiments, one or more correlations may be obtained based on one or more time-stamps between one or more suspicious telephony activities and one or more suspicious messaging activities over time.

In some embodiments, one or more multi-vector threat assessments may be obtained based on the one or more correlations.

In one or more of the various embodiments, the non-agentic threat evaluation may include using one or more of a natural language processing algorithm, a pattern matching filter, a statistical analysis method, a rule-based detection system, a keyword detection operation, a validation of caller identification, a communication frequency analysis, or a signature matching technique to collect one or more social engineering indicators. In some embodiments, one or more preliminary threat confidence scores may be obtained based on the one or more social engineering indicators.

In one or more of the various embodiments, the telephony activity information may include one or more of a call history record, a voice conversation transcript, a caller identification result, a call duration measurement, or a communication frequency pattern associated with the one or more users.

In one or more of the various embodiments, the messaging activity information may include one or more of an email message header, an instant message content record, a sender reputation score, a message authentication result, or a communication timing pattern associated with messaging exchanges.

In one or more of the various embodiments, the one or more prompts may be modified to include one or more of a conversation transcript, a call metadata record with validation results, a caller identification, a target user identification, a message content analysis summary, a historical communication baseline comparison, a sender reputation score, a message authentication result, an email, an email header, an instant message, or a threat intelligence context element.

In one or more of the various embodiments, one or more communications may be collected that demonstrate one or more of a personal knowledge reference, a false claim of organizational authority, a systematic trust-building attempt, or a coordinated manipulation strategy across multiple communication channels.

In one or more of the various embodiments, one or more validation checks may be obtained that cross-reference telephone numbers against one or more of a database of known fraudulent sources, a disposable communication service, or a previous social engineering threat.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, telephony services 106, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Telephony services 106 may represent various telephony systems that may be in use in organizations. Telephony services 106 may include conventional POTS, digital telephony systems, Voice-Over-Internet Protocol (VOIP) telephony services, or the like.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
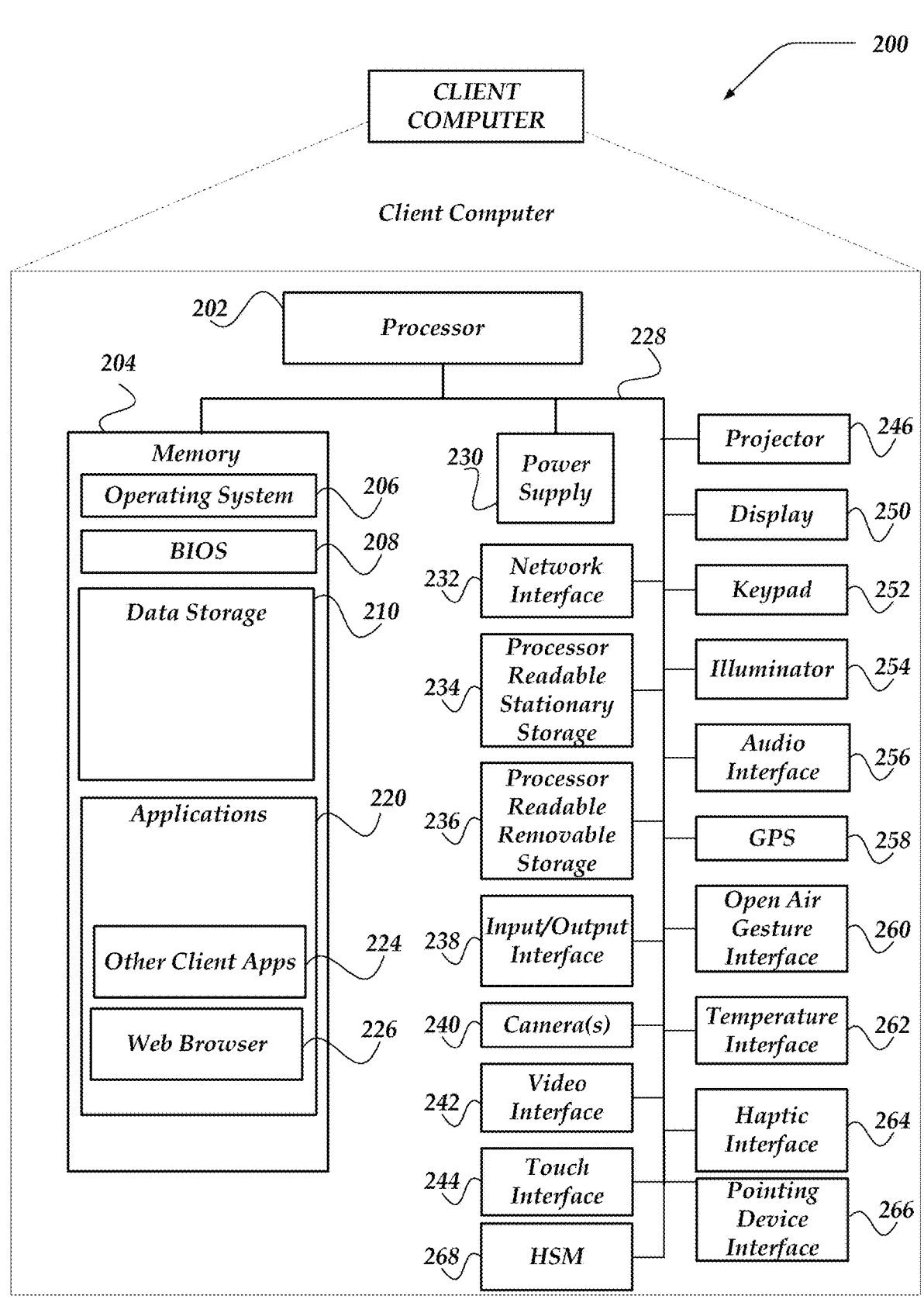
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, threat analysis engine 324, telemetry engine 326, web services 329, or the like, may be arranged to employ geo-location information to select one or more localization features, such as, time zones, languages, currencies, calendar formatting, or the like. Also, localization features may be used when interpreting network traffic, monitoring application protocols, user-interfaces, generating reports, monitoring networks in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, protocol information 316, or the like. Protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, threat analysis engine 324, telemetry engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, threat analysis engine 324, telemetry engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, threat analysis engine 324, telemetry engine 326, web services 329, or the like, may be provisioned and de-commissioned automatically.

Also, in one or more of the various embodiments, network monitoring engine 322, threat analysis engine 324, telemetry engine 326, web services 329, or the like, may be located in virtual servers running in a cloud-based computing environment rather than being tied to one or more specific physical network computers. Likewise, in some embodiments, one or more of network monitoring engine 322, threat analysis engine 324, telemetry engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like.

like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
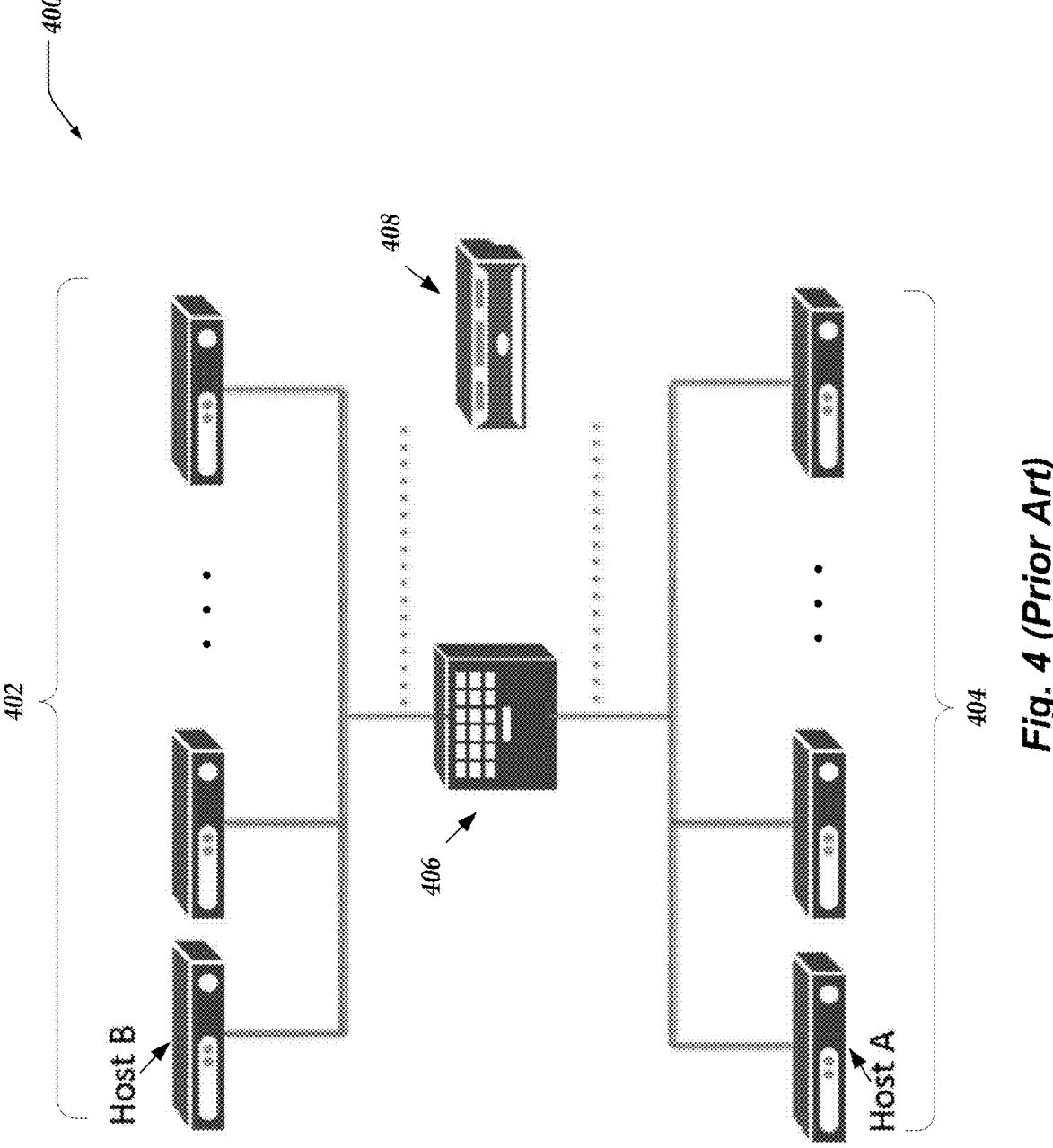
FIG. 4 illustrates a logical architecture of a system for detecting social engineering threats in accordance with one or more of the various embodiments.

FIG. 4 illustrates a logical architecture of system 400 for detecting social engineering threats in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate or collect various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

Figure 5:
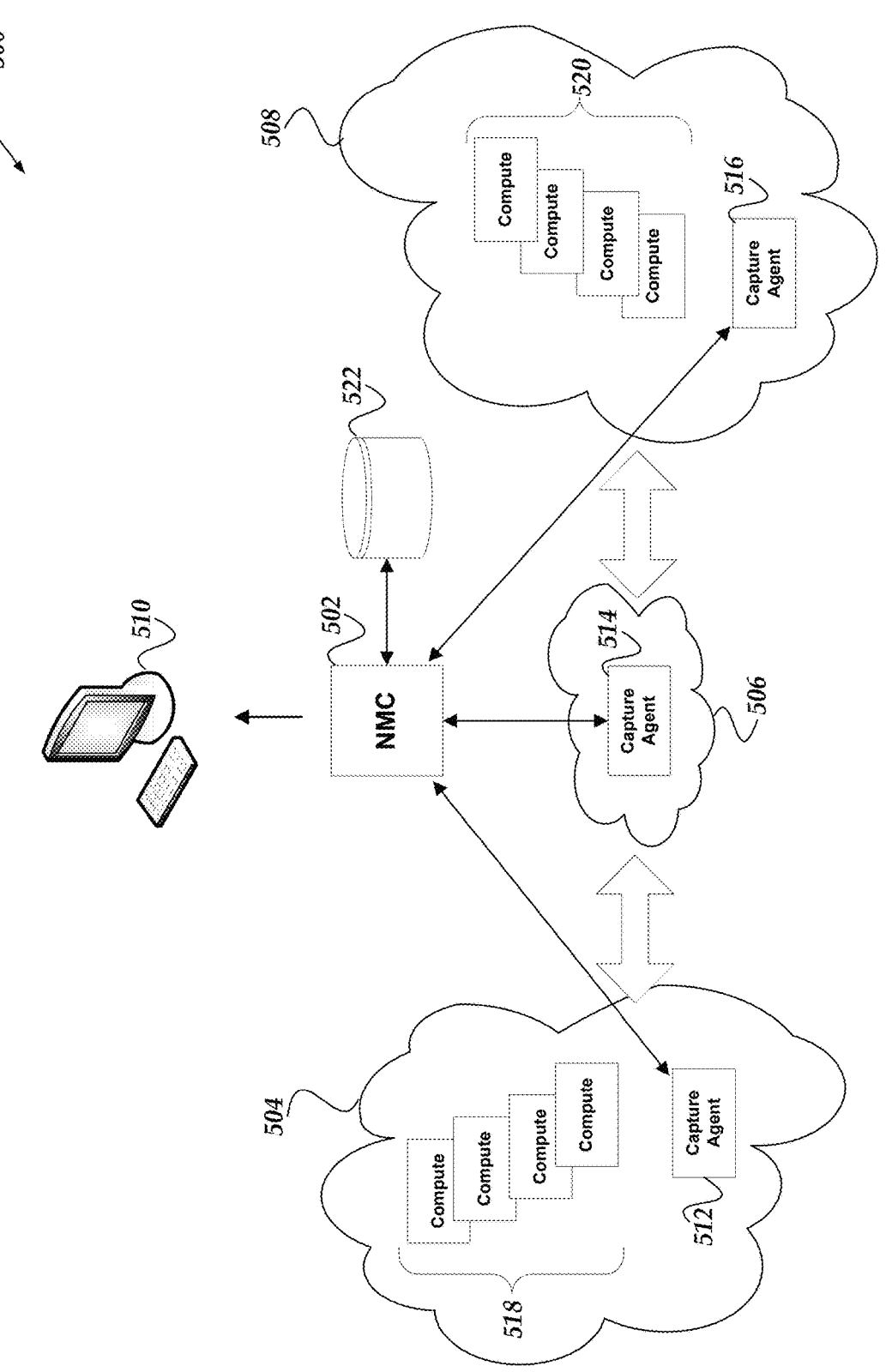
FIG. 5 illustrates a logical schematic of a system for detecting social engineering threats in accordance with one or more of the various embodiments.

FIG. 5 illustrates a logical schematic of system 500 for detecting social engineering threats in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 516. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be to arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Further, in one or more of the various embodiments, one or more capture agents may be installed or hosted locally on one or more entities (not shown) rather than being installed or operated separately from the entities. Also, in some embodiments, one or more capture agents or portions thereof may be built-in to one or more entities such that the entity itself may be configured to capture network traffic or monitor network activity. Likewise, in some embodiments, NMC or portions thereof may be installed or hosted on entities. For example, a computer or compute instance may host a network monitoring engine rather than requiring a separate NMC.

Figure 6:
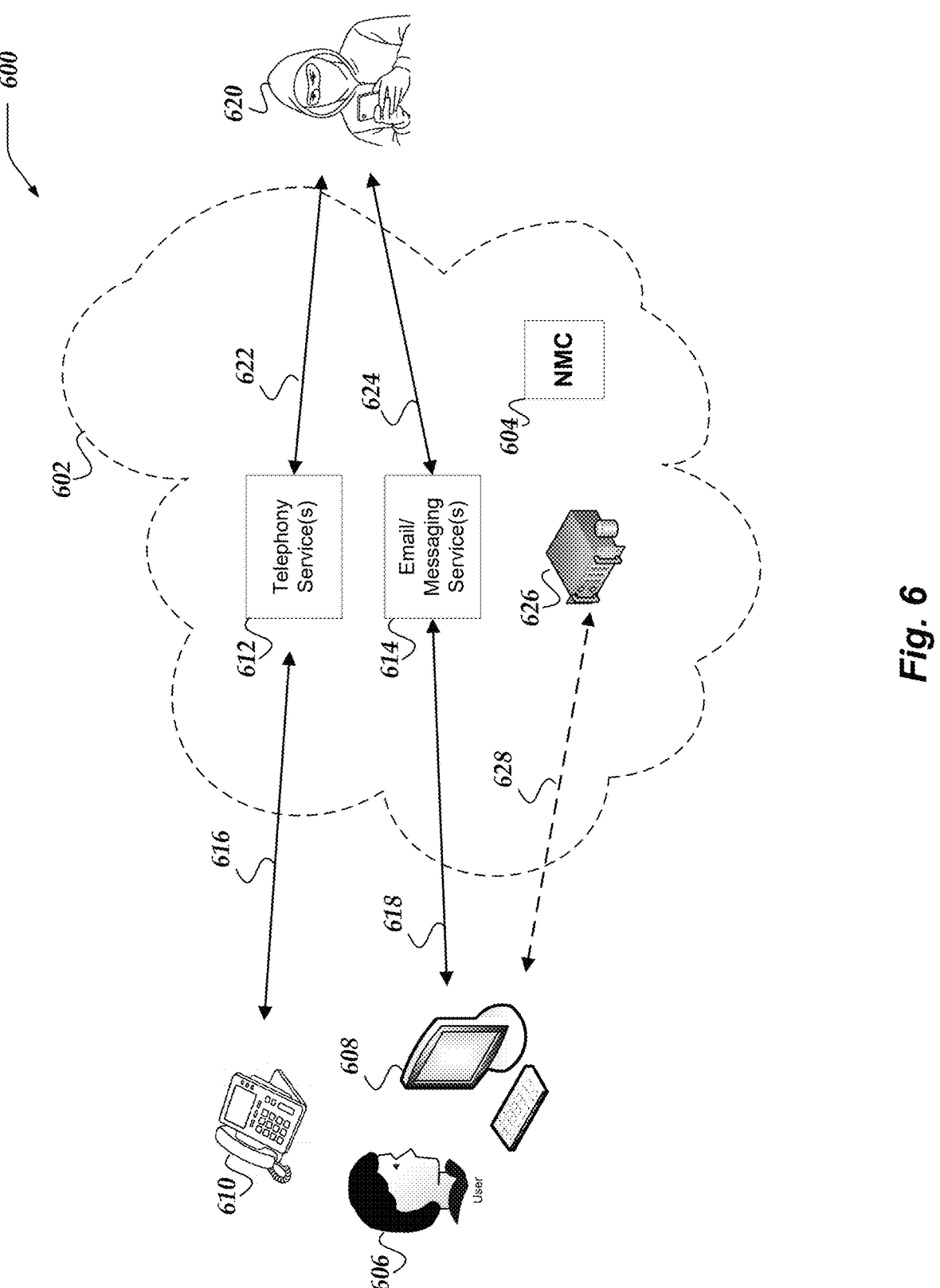
FIG. 6 illustrates a logical schematic of a system for detecting social engineering threats in accordance with one or more of the various embodiments.

FIG. 6 illustrates a logical schematic of system 600 for detecting social engineering threats in accordance with one or more of the various embodiments.

In this example, for some embodiments, system 600 may represent a networking environment that may be monitored by one or more NMCs. Accordingly, in some embodiments, system 600 may include one or more networks or network environments, such as network 602. In some embodiments, network 602 may be considered to be one or more of LANs, WANs, networks, sub-networks, or the like used to network various devices, computers, services, or other entities. For example, network 602 may be considered to be one or more of network 110, network 108, or the like, or combination thereof. One of ordinary skill in the art will appreciate that actual enterprise or production networks may include more or fewer entities than shown here. Further, in this example, for at least brevity and clarity networking components, such as routers, switches, firewalls, bridges, interfaces, or the like are omitted from the figure.

In some embodiments, networks, such as network 602 may include one or more NMCs, such as NMC 604. In some embodiments, NMC 604 may be arranged to monitor network traffic or associated activity the may occur in network 602 as described above.

In this example, for some embodiments, user 606 may be considered to represent a user of the organization that may be authorized to access one or more resources or services withing the network environment. Accordingly, in some embodiments, user 606 may employ client computer 608 to interact with one or more resources or services in network 602. In some embodiments, users may be authorized to interact with particular applications or services in the network. In some embodiments, user 606 may be enabled to use computer 608 to interact with various email or messaging services, such as email/messaging services 614. Likewise, in some embodiments, users, such as user 606 may be authorized to use the telephones, such as telephone 610 that enable access to telephony services, such as telephony services 612.

In some embodiments, telephony services 612 may represent internal or external services used to provide telephony services for an organization. In some embodiments, organizations may use telephony services for a variety of functions associated with internal or external communication.

In some embodiments, such services may enable seamless internal and external communication through voice calls, video calls, video conferences, AR/VR sessions, or the like that may support collaboration among employees, clients, customers, or partners. In some embodiments, telephony systems may be used for customer support, sales and marketing efforts, supporting remote work through VoIP solutions, ensuring connectivity for distributed teams. Also, in some embodiments, telephony services may include applications such as Interactive Voice Response (IVR) systems, video conferencing applications, voice mail applications, video call services, AR/VR services, or the like. Also, in some embodiments, telephony services may provide one or more APIs or interfaces that enable other automated services to integrate with one or more telephony applications.

Also, in some embodiments, telephony services may be configured to collect various metrics associated with telephony activity, such as call times, call duration, user status, or the like. In some embodiments, telephony services may be configured to enable NMCs or other system to obtain access to some or all of the metrics.

In some embodiments, some or all telephony services or associated communications may be considered digital services such that the communications may be digitized and communicated within network 602 using one or more communication protocols or application protocols, such as TCP/IP, SIP (Session Initiation Protocol), RTP (Real-time Transport Protocol), RTMP/RTMPS (Real-time Messaging Protocol), ISDN (Integrated Services Digital Network), SS7 (Signaling System No. 7), or the like. Further, in some cases, telephony services may support or integrate with POTS (Plain Old Telephone Service) networks.

Accordingly, in some embodiments, NMCs, such as NMC 604 may be configured to monitor some or all of the network traffic associated with telephony services. In some embodiments, this may include monitoring or inspecting (e.g., packet inspections) communication contents. Further, in some embodiments, NMCs may be configured obtain one or more metrics associated with telephony communications, including caller identity, receiver/target identity, call times, call duration, or the like. Further, in some embodiments, NMCs may be configured to use one or more external services to gather additional information about callers or others involved in telephone conversations. For example, in some embodiments, NMCs may be configured employ internal or external caller ID databases that enable additional information to be collected based on telephone numbers, email addresses, or the like.

Further, in some embodiments, NMCs may be arranged to be adaptable to supporting new or additional telephony services or communication protocols. Accordingly, ins. Accordingly, in some embodiments, NMCs may be arranged to use instructions, plug-ins, libraries, parsers, or the like provided via configuration information to support particular telephony services or communication protocols to account for advances in technology, local requirements, or local circumstances.

In some embodiments, NMCs may be arranged to monitor messaging activity associated with other methods of communication. Accordingly, in some embodiments, NMCs may be arranged to monitor network traffic associated with other activity associated with other communication services, such as email, messaging, social media, team/group chat services, chat bots, or the like. In this example, email/messaging services 624 represents the various applications, services, message repositories, or the like that may be associated with email/messaging in the organization. Note, for brevity or clarity communication services such as email, messaging, social media interactions, team/group chats, chat bot interactions, calendars, or the like may be referred to as messaging, messaging content, messaging services, or the like.

In some embodiments, NMCs may be arranged to employ configuration information to determine telephony monitoring parameters or messaging activity monitoring parameters, including call duration thresholds, message/attachment size thresholds, message rate thresholds, suspicious number databases, allowed/barred communication sources, voice pattern analysis sensitivity levels, caller validation criteria, or the like to account for organizational telephony infrastructure requirements or local regulatory compliance needs.

Further, in some cases, organizations may use external or internal services to collect and process conventional postal mail (snail mail). Typically, such services may receive physical mail and then scan or OCR the received mail to enable the mail items to be electronically forwarded to its ultimate addressee. Accordingly, in some embodiments, NMCs may be configured integrate with such services to collect meta-data associated with conventional mail, such as addressee information, sender information, postmarks, originating postal station (e.g., via postal markings), or the like. Further, in some embodiments, NMCs may be configured capture or monitor the scanned electronic copies of the processed postal mail. Accordingly, in some embodiments, NMCs may be arranged to monitor the content of some or all of such mail. Note, in some embodiments, NMCs may be configured to execute OCR, NLP, machine learning, generative AI systems, or the like to analyze the contents of conventional mail communications.

In this example, for some embodiments, traffic 616 may be considered to represent user telephony activities or communications associated with telephony services 612. Similarly, for some embodiments, traffic 618 may represent user activity associated with some or all messaging services, such as messaging services 614.

A rising threat to organizations may include social engineering threats that may target employees. In this context, social engineering may be considered to be the manipulation of individuals through psychological tactics to trick them into revealing sensitive information, such as passwords or confidential data, or performing actions that compromise security, such as granting unauthorized access or executing malicious instructions, or the attempt thereof. Accordingly, in some embodiments, malicious actors, such as malicious actor 620 may employ various methods may include using telephone calls, email messages, text messages, social media communications, face-to-face meetings, postal mail, or the like to gain the trust or otherwise manipulate trusted users in an organization.

In some cases, malicious actors may target particular employees based on prior knowledge of the role or position of the employee in the organization. In other cases, malicious actors may participate in broad-based attacks (e.g., mass phishing messages, scam calls, or the like) to identify vulnerable users such as those that may respond to fraudulent communications, interact with fake websites, or the like.

In some cases, malicious actors may target a particular individual by developing an attack package that include information that may be collected from various public or open sources, such as news articles, press releases, social media, court filings, real estate records, or the like. In some cases, malicious actors may use commercial services (e.g., people finder services), marketing list providers, or the like to gather information that may be used to design targeted social engineering attacks. For example, in some embodiments, malicious actors may generate call scripts or message content that includes or references personal information about the target that may increase the likelihood of a successful social engineering attack. For example, malicious actors pretending to know a target user may include information such as pet names, children's birthdays, recent vacation trips, or the like in communications directed to the target user.

In some embodiments, the different methods of introducing malicious communication to targeted users may be referred to as attack vectors. Accordingly, in some embodiments, malicious actors may employ more than one attack vector in a social engineering attempt. For example, in some embodiments, malicious actors may use a combination or emails, telephone calls, messaging, or the like to build a social engineering attack against their targets.

In this example, for some embodiments, traffic 622 may be considered to represent communication/activities conducted by malicious actors, such as malicious actor 620 associated with telephony services, such as telephone calls. Likewise, in this example, traffic 624 may be considered to represent communication/activities conducted by malicious actors, such as malicious actor 620 associated with messaging services, such as email or messaging services.

In some cases, the goal of malicious actors such as malicious actor 620 may be gain the trust of the targeted user such that they release sensitive information, such as passwords, pass keys, or the like to enable further attacks on the organization. In some cases, the goal of the social engineering attack may be to cause the user to perform one or more actions that may be harmful to the organizations, such as installing malicious software, degrading network security, exfiltrating data or documents, or the like.

Also, in some cases, social engineering attacks may be directed to exfiltrating sensitive business intelligence, trade secrets, or the like. Also, in some embodiments, some social engineering attacks may be directed to sabotaging or disruption of business operations using so-called ransomware attacks, or the like.

Accordingly, in this example, for some embodiments, traffic 628 represents network traffic or activity associated with actions user 606 may perform on behalf of or because of a social engineering attack. Note, traffic 628 is represent using a dashed line because in some cases engineering attacks may be identified or mitigated before the user has been manipulating into performing harmful or substantive actions that may harm the organization.

In some embodiments, NMCs may be arranged to perform a variety of operations to detect social engineering threats. In some embodiments, NMCs may be arranged to track incoming telephone calls such that calls from suspicious telephone numbers may be identified or monitored. Likewise, in some embodiments, NMCs may be arranged to monitor email or other messaging traffic to identify potential social engineering attacks.

In some embodiments, NMCs may be arranged to correlated telephony activity with messaging as part of evaluating the threat potential of user communications. Accordingly, in some embodiments, NMCs may be configured to evaluate if one or more suspicious telephone calls may be associated with one or more suspicious email or messaging interactions. For example, malicious actors may use telephone calls or telephone messages to impersonate legitimate users/persons and "vouch" for an email that includes malicious context. For example, a caller may leave deceptive voice mail that asks if the targeted user has received their email or to "look out" for their email and so on. Similarly, in some embodiments, NMCs may be configured to detect if a user makes calls to telephone numbers that were included in suspicious emails.

Also, in some embodiments, NMCs may be arranged to employ generative AI to evaluate the contents of suspicious emails or other messages. Further, in some embodiments, NMCs may be arranged to submit portions of suspicious telephone calls (or automatically generated transcripts thereof) to generative AI to evaluate the threat level of a call.

Further, in some embodiments, if monitored or evaluated communications reveal that there may be a probability of an attack directed to particular resources, NMCs may be configured automatically monitor those resources for unusual activity.

In some embodiments, NMC 604 may be arranged to establish baseline communication patterns for user 606 by analyzing historical telephony traffic 616, messaging traffic 618, or other communication activities over predetermined time periods. For example, daily, weekly, monthly, quarterly, annually, or the like. Accordingly, in some embodiments, the baseline patterns may include typical call frequencies, common contact lists, usual communication times, message volume patterns, or the like that may be associated with legitimate business communications. In some embodiments, NMC 604 may be configured to detect deviations from established baseline patterns that may indicate potential social engineering attempts. Thus, in some embodiments, if malicious actor 620 initiates communications that fall outside normal patterns, such as calls from unknown numbers during unusual hours or messages with suspicious content characteristics, NMC 604 may flag such activities for further analysis or investigation. Accordingly, in some embodiments, NMCs may be arranged to dynamically employ rules, pattern matching algorithms, statistical analysis methods, baseline deviation thresholds, or the like provided via configuration information to establish user-specific communication baselines that account for local business practices or organizational communication policies.

In some embodiments, NMC 604 may be arranged to correlate telephony activities represented by traffic 622 with messaging activities represented by traffic 624 to identify coordinated social engineering campaigns. Accordingly, in some embodiments, the correlation analysis may include comparing timestamps, phone numbers, email addresses, message content themes, or conversation topics across different communication channels to detect relationships between suspicious communications. In some embody, if a suspicious telephone call from malicious actor 620 occurs within a predetermined time window of a suspicious email or message, NMC 604 may increase the threat assessment score for both communications. In some embodiments, such temporal correlation may enable detection of multi-vector attacks that might otherwise appear benign if analyzed in isolation.

In some embodiments, NMC 604 may be configured to employ generative artificial intelligence models, natural language processing techniques, machine learning algorithms, or other automated analysis methods to evaluate the semantic content of communications for social engineering indicators. Accordingly, in some embodiments, the analysis may include identifying rapport-building language patterns, urgency indicators, authority impersonation attempts, information solicitation requests, or other linguistic markers commonly associated with social engineering tactics. In some embodiments, NMC 604 may maintain libraries of known social engineering scripts, conversation templates, attack methodologies, or behavioral patterns that may be used to train analysis models or refine detection algorithms. In some embodiments, the libraries may be updated dynamically based on newly discovered attack methods, organizational-specific threats, or industry threat intelligence feeds.

In some embodiments, if NMC 604 determines that user 606 may be subject to a social engineering attack, the NMC may be arranged to implement graduated response measures that may include alerting security personnel, notifying user supervisors, restricting network access privileges, monitoring subsequent user activities more closely, or implementing additional authentication requirements. Accordingly, in some embodiments, the response measures may be configured based on threat severity levels, user roles within the organization, potential impact assessments, or predefined security policies. Thus, in some embodiments, traffic 628 representing actions that user 606 might perform as a result of social engineering manipulation may be prevented, monitored, or mitigated before organizational security may be compromised.

In general, one of ordinary skill in the art will appreciate that the goals or methods of social engineering attacks may vary widely and may constantly changing or evolving. Accordingly, in some embodiments, NMCs may be arranged to dynamically employ rules, libraries, instructions, configuration parameters, or the like for detecting social engineering threats via configuration information to account for local circumstances or local requirements.

Figure 7:
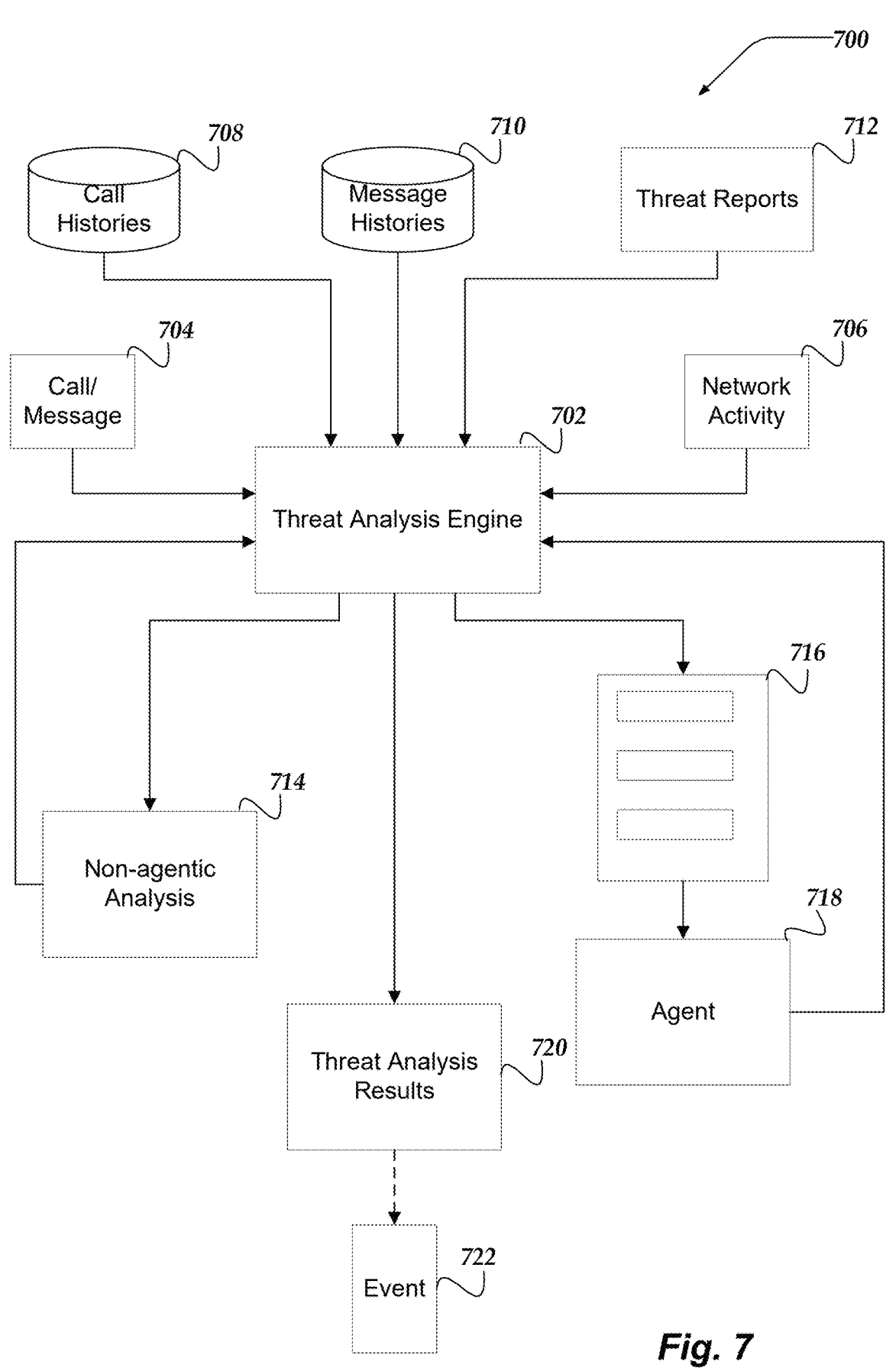
FIG. 7 illustrates a logical architecture of a system for detecting social engineering threats in accordance with one or more of the various embodiments.

FIG. 7 illustrates a logical architecture of system 700 for detecting social engineering threats in accordance with one or more of the various embodiments. In some embodiments, system 700 may represent the internal architecture or workflow employed by NMCs to analyze potential social engineering attacks using both conventional analysis techniques or generative artificial intelligence methods.

In some embodiments, threat analysis engine 702 may be arranged to serve as the central processing component that coordinates the evaluation of suspicious communications or activities for potential social engineering threats. Accordingly, in some embodiments, threat analysis engine 702 may be configured to receive input from various sources, including call/message 704 representing incoming telephone calls, text messages, emails, or archived communications that require evaluation for threat indicators. In some embodiments, threat analysis engine 702 may also be arranged to monitor network activity 706 that may be associated with social engineering attack attempts, such as unusual login patterns, suspicious file access requests, unauthorized system modifications, or other activities that may indicate a user has been compromised by social engineering tactics.

In some embodiments, threat analysis engines may be arranged to employ configuration information to determine threat severity scoring criteria, confidence threshold values, escalation trigger parameters, investigation priority rankings, or the like to account for local risk tolerance levels or organizational security policies.

Note, one of ordinary skill in the art will appreciate that in some embodiments threat analysis engines may be an internal components or built-in feature of network monitoring engines rather than being required to be a separate component as shown here. In some embodiments, network monitoring engines may perform some or all of the actions attributed to threat analysis engines. Also, in some embodiments, threat analysis engines may be separate processes or engines that may run in one or more computing instances (or computers) that may be separate from computing instances or hosts running network monitoring engines. Likewise, in some cases, network monitoring engines or threat analysis engines may be configured to run on the same computing instances or hosts. However, for brevity or clarity threat analysis engines may be disclosed here separately or alongside network monitoring engines.

In some embodiments, threat analysis engine 702 may be arranged to access historical information stored in call histories 708 or message histories 710 to establish baseline communication patterns or identify recurring suspicious contacts. Accordingly, in some embodiments, call histories 708 may include databases of telephony records, call duration information, caller identification data, call frequency patterns, or the like that enable the threat analysis engine to compare current communications against established normal behavior patterns. In some embodiments, message histories 710 may include repositories of text messages, email communications, chat logs, instant messaging records, or the like that provide context for evaluating the legitimacy of current messaging activities. In some embodiments, threat analysis engine 702 may also be configured to integrate information from threat reports 712, which may represent internal security bulletins, external threat intelligence feeds, industry security advisories, attack pattern databases, or the like that provide current information about known social engineering methodologies or emerging attack vectors.

In some embodiments, threat analysis engine 702 may be arranged to perform non-agentic analysis 714 using actions that may be considered conventional analysis techniques that may include natural language processing algorithms, pattern matching filters, statistical analysis methods, rule-based detection systems, or the like to identify potential social engineering indicators. Accordingly, in some embodiments, non-agentic analysis 714 may be configured to detect suspicious keywords, analyze communication frequency patterns, evaluate sender reputation scores, identify urgency indicators, or assess other characteristics commonly associated with social engineering attempts. In some embodiments, the results of non-agentic analysis 714 may be used to determine if further investigation using generative artificial intelligence methods may be warranted or if the communications can be classified as legitimate business activities.

In some embodiments, if the initial analysis suggests potential social engineering activity, threat analysis engine 702 may be arranged to generate prompt 716 that includes relevant context information, suspicious communication content, historical pattern data, threat intelligence information, or other details that may be necessary for comprehensive evaluation by generative AI systems. Accordingly, in some embodiments, prompt 716 may be configured to provide structured input to agent 718, which may represent a generative artificial intelligence agent specifically trained to identify social engineering tactics, rapport-building techniques, manipulation strategies, information solicitation attempts, or other sophisticated attack methodologies that may not be detected by conventional analysis methods. In some embodiments, agent 718 may be arranged to employ large language models, natural language understanding techniques, contextual analysis capabilities, or behavioral pattern recognition to evaluate the semantic content of communications or identify subtle social engineering indicators that may escape traditional detection systems.

In some embodiments, threat analysis engine 702 may be arranged to generate threat analysis results 720 that include threat severity assessments, confidence scores, attack methodology classifications, recommended response actions, or detailed analysis reports that summarize the findings of the generative AI evaluation process. Accordingly, in some embodiments, threat analysis results 720 may provide security personnel with actionable intelligence about potential social engineering attacks, including information about targeted users, attack vectors, suspected malicious actors, or recommended mitigation strategies. Thus, in some embodiments, if threat analysis results 720 indicate a significant threat level, threat analysis engine 702 may be arranged to generate event 722, which may represent security alerts, incident reports, automated response triggers, notification messages, or other events that initiate appropriate organizational security responses to address the identified social engineering threat.

In some embodiments, threat analysis results 720 may include information or contents obtained as a result of non-agentic analysis, agentic analysis, or combination thereof. In some cases, in some embodiments, a potential social engineering attack may be determined to be non-threatening or otherwise harmless based on non-agentic analysis such that the potential attack may be dismissed absent using generative AI which may reduce operational costs or improve latency.

In some embodiments, agent 718 may be specifically configured to identify rapport-building techniques commonly employed in social engineering attacks by analyzing conversation patterns that attempt to establish personal connections or shared interests between callers or message senders. Accordingly, in some embodiments, the generative AI agent may be trained to recognize linguistic patterns that indicate attempts to build trust through references to family activities, such as discussions about children playing little league baseball at specific venues, hobby interests such as wine preferences for particular Burgundy regions, recreational activities like skiing or hunting, or other personal information that may have been gathered from social media profiles or public records. In some embodiments, agent 718 may be arranged to detect if callers inappropriately demonstrate knowledge of targeted users' personal lives, such as referencing specific restaurants the user frequents, vacation destinations they have visited, or detailed information about their family members that would not typically be known by legitimate business contacts. In some embodiments, threat analysis engine 702 may be configured to flag communications if the level of personal detail discussed exceeds what would be appropriate for the claimed business relationship or if the personal information appears to have been researched rather than naturally known through genuine professional interactions.

Also, in some embodiments, threat analysis engine 702 may be arranged to identify escalation patterns characteristic of social engineering campaigns by tracking the progression of requests or favors across multiple communications that gradually increase in risk level or potential organizational impact. Accordingly, in some embodiments, the analysis may include detecting sequences that begin with seemingly harmless requests, such as asking users to delete emails with unusual subject lines, verify basic account information, or confirm receipt of messages, that gradually escalate to more dangerous actions, such as reconfiguring VPN settings, installing unauthorized software, or providing administrative credentials. In some embodiments, non-agentic analysis 714 may be configured to flag communication sequences if the requests show increasing levels of technical complexity, administrative privilege requirements, or security policy violations, such as progressing from simple email deletion to network configuration changes that could compromise organizational security. In some embodiments, agent 718 may be arranged to evaluate the temporal spacing between escalating requests to identify patterns consistent with trust-building methodologies, such as allowing sufficient time between requests for targets to become comfortable with previous actions before introducing requests that require higher levels of system access or could cause greater organizational harm.

Also, in some embodiments, non-agentic analysis 714 may be configured to perform comprehensive validation checks on incoming telephone numbers to identify suspicious communication sources that may indicate social engineering attempts or fraudulent activities. Accordingly, in some embodiments, the validation processes may include reverse lookup operations to identify disposable VoIP services, prepaid communication providers, "rent by the hour" telephone number services, or other anonymizing communication platforms commonly used by malicious actors to obscure their true identities or locations. In some embodiments, threat analysis engine 702 may be arranged to cross-reference telephone numbers against databases of known fraudulent numbers, previously reported scam operations, or numbers associated with confirmed social engineering attacks to identify recurring threats or coordinated campaign activities. In some embodiments, if reverse lookup operations may be unable to trace telephone numbers to legitimate business entities, return invalid location information such as mailbox services, non-existent addresses, or are associated with services designed for anonymity rather than legitimate business communication, threat analysis results 720 may include elevated threat scores or recommendations for additional verification procedures before users comply with requests from such sources. In some embodiments, non-agentic analysis methods may be arranged to employ configuration information to customize keyword detection libraries, pattern matching algorithms, statistical analysis parameters, rule-based filtering criteria, or the like to account for local language requirements or organization-specific threat intelligence.

Further, in some embodiments, threat analysis engine 702 may be configured to monitor call histories 708 to identify repeated contact attempts from the same telephone numbers that may indicate social engineering campaigns designed to build trust or familiarity with targeted users over time. Accordingly, in some embodiments, the analysis may include tracking call frequency patterns, call duration trends, conversation topic evolution, or other behavioral indicators that suggest systematic relationship-building activities rather than legitimate business communications. In some embodiments, non-agentic analysis 714 may be arranged to flag telephone numbers if they initiate contact attempts that exceed normal business communication patterns, such as multiple calls within short time periods, calls at unusual hours, or persistent contact attempts that continue despite lack of response from targeted users. In some embodiments, agent 718 may be configured to evaluate if repeated calls from the same source demonstrate escalating familiarity or personal knowledge that would be unusual for legitimate business relationships, such as callers who increasingly reference personal details or demonstrate knowledge of organizational information that should not be accessible to external parties. Thus, in some embodiments, if call pattern analysis reveals systematic contact attempts that appear designed to establish trust or familiarity rather than conduct legitimate business, threat analysis results 720 may recommend increased scrutiny of subsequent communications from such sources.

Also, in some embodiments, threat analysis engine 702 may be configured to detect social engineering campaigns that may coordinate multiple communication channels by correlating telephony activities with messaging activities that may identify relationships between one or more suspicious communications across one or more different platforms. Accordingly, in some embodiments, correlation analysis may include identifying scenarios if one or more telephone calls from one or more suspicious numbers precede one or more email messages that may reference the telephone conversations, if callers warn targets to "look out for" specific emails that subsequently arrive, or if message senders claim to have spoken with targets previously without corresponding call records in call histories 708. In some embodiments, prompt 716 may be configured to include information that may be used to correlate or otherwise identify if suspicious telephone calls occur within predetermined time windows of suspicious email messages, instant messages, or text messages that purport to validate information discussed during the calls or reference shared conversation topics. In some embodiments, agent 718 may be arranged to evaluate if telephone callers inappropriately "vouch for" incoming emails by providing advance warning about specific subject lines or content characteristics, if message senders demonstrate knowledge of telephone conversations that were not recorded in legitimate business systems, or if communication timing patterns suggest coordinated campaign activities rather than coincidental business interactions.

Also, in some embodiments, non-agentic analysis 714 may be configured to identify deviations from established baseline communication patterns by analyzing call timing, frequency, duration, or source characteristics that may indicate potential social engineering attempts targeting organizational users. Accordingly, in some embodiments, the analysis may include detecting telephone calls that occur during non-business hours from unknown or unverified numbers, calls with unusually long durations for the type of claimed business purpose, or calls from geographic locations that do not align with claimed organizational affiliations or business relationships. In some embodiments, threat analysis engine 702 may be arranged to establish baseline communication profiles for individual users based on historical data in call histories 708, including typical contact lists, usual communication time periods, average call durations, or frequency patterns associated with legitimate business activities. In some embodiments, agent 718 may be configured to evaluate if incoming communications deviate significantly from established baseline patterns, such as calls from completely unknown numbers that claim existing business relationships, calls that occur at times inconsistent with claimed geographic locations, or calls that demonstrate knowledge of organizational information that should not be accessible to the claimed external parties. In some embodiments, if call pattern analysis reveals significant deviations from normal business communication behaviors, threat analysis results 720 may include recommendations for additional identity verification procedures or increased monitoring of subsequent interactions with the suspicious communication sources.

Accordingly, in some embodiments, non-agentic analysis methods may be arranged to employ configuration information to customize keyword detection libraries, pattern matching algorithms, statistical analysis parameters, rule-based filtering criteria, or the like to account for local language requirements or organization-specific threat intelligence.

Moreover, in some embodiments, agent 718 may be configured to identify authority impersonation attempts commonly employed in social engineering attacks by analyzing communication content for false claims of organizational affiliation, technical expertise, or administrative authority that may be used to manipulate targeted users into compliance. Accordingly, in some embodiments, the generative AI agent may be trained to recognize linguistic patterns that indicate impersonation of IT personnel, management staff, external service providers, or other authority figures, such as callers who claim to be "Todd from IT" or message senders who purport to represent legitimate business partners or vendors. In some embodiments, threat analysis engine 702 may be configured to cross-reference claimed identities against internal employee directories, approved vendor contact databases, or other authorized communication sources to detect inconsistencies between claimed organizational roles or business relationships. In some embodiments, non-agentic analysis 714 may be arranged to flag communications if callers or message senders demonstrate inappropriate knowledge of internal systems, reference technical procedures that would not typically be discussed with external parties, or request actions that exceed the authority level that would be associated with their claimed organizational position. Thus, in some embodiments, if validation checks reveal inconsistencies between claimed identities, stated organizational roles, or demonstrated system knowledge, threat analysis results 720 may include elevated threat scores or recommendations for additional verification procedures before users comply with requests from sources claiming authority positions within or external to the organization.

Further, in some embodiments, threat analysis engines may be arranged to collect information or metrics from one or more other sources, such as financial systems, identity systems, threat intelligence feeds, or other services that may not be directly related to telephony services or messaging services. Accordingly, in some embodiments, threat analysis engines may employ this additional information to identify correlations, or the like that may contribute a threat analysis.

Further, in some embodiments, threat analysis results may include results that trigger or execute one or more automated mitigation actions along with the other result information. For example, for some embodiments, NMCs may be configured to execute one or more mitigation actions, such as rewriting firewall rules, alerting users, blocking or quarantining potential threat activity, escalating authorization levels (e.g., requiring or initiating multi-factor authorization), initiating one or more custom response workflows, or the like in response to detection one or more particular threats. Accordingly, in some embodiments, for such threats, if an analysis engine detects such threats, NMCs may be configured to execute one or more immediate actions in addition to generating event 722.

In some embodiments, non-agentic analysis or agentic analysis may not be strictly separated. In some cases, for some embodiments, NMCs may be configured to support hybrid analysis that may mix or share one or more actions, detection methods, analysis methods, or the like that may be otherwise considered non-agentic or agentic. For example, in some embodiments, agents may be configured to include filters, formatters, heuristics, or the like that may be employed along with generative AI, machine learning, or other AI approaches. Accordingly, in some embodiments, non-agentic analysis may be considered to use detection/ analysis methods that may be simpler, more performant, or lower cost than employing generative AI. Likewise, for some embodiments, agentic analysis may include generative AI or other AI approaches to analysis or detections along with additional convention methods for pre-processing inputs to various AI systems or post-processing outputs of various AI systems.

Figure 8:
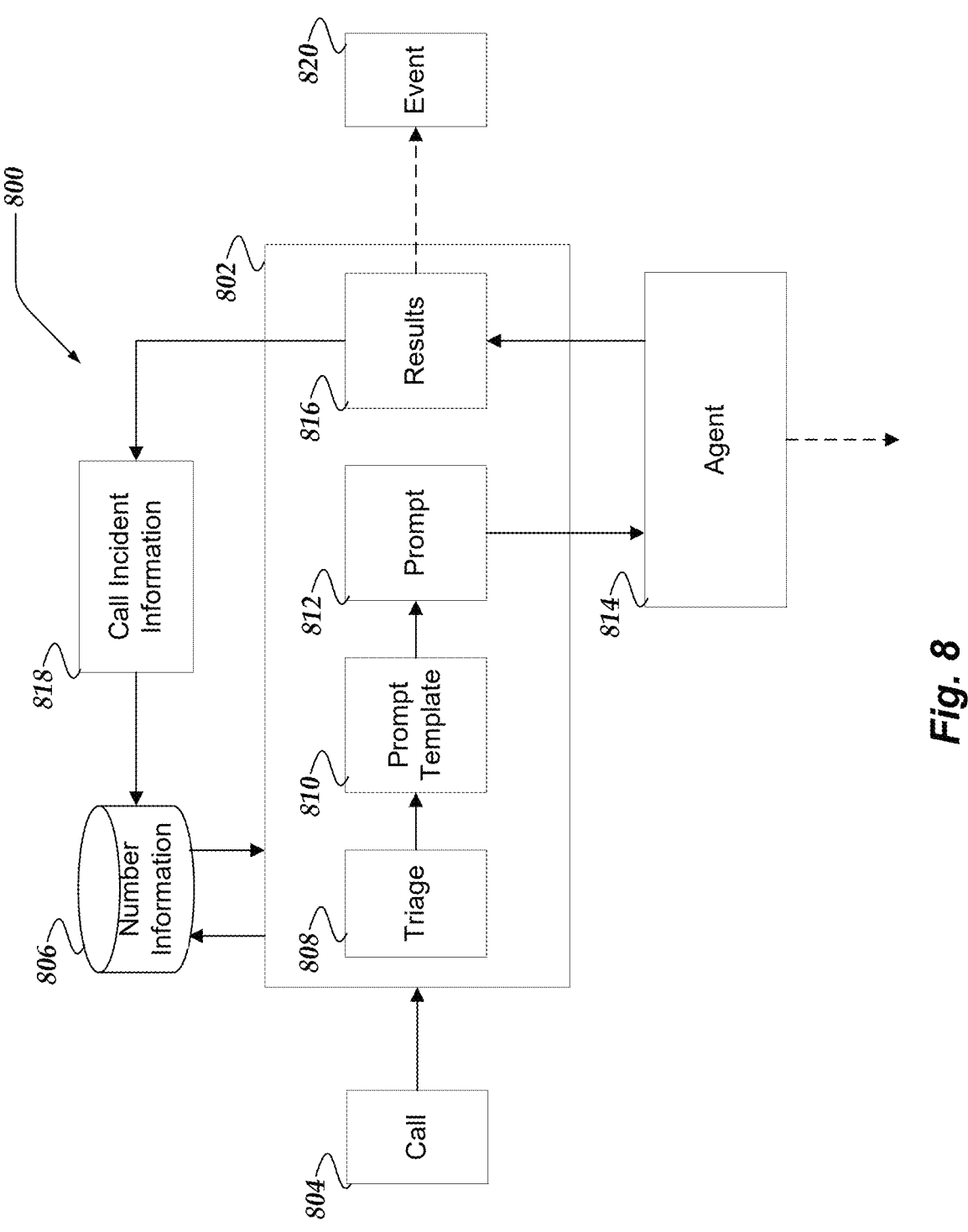
FIG. 8 illustrates a logical architecture of a system for detecting social engineering threats in accordance with one or more of the various embodiments.

FIG. 8 illustrates a logical architecture of system 800 for detecting social engineering threats in accordance with one or more of the various embodiments. In some embodiments, system 800 may represent a workflow employed by NMCs to evaluate individual communications using both conventional screening techniques or generative AI analysis methods to identify potential social engineering attacks targeting organizational personnel.

In some embodiments, threat analysis engine 802 may be arranged to serve as the central coordination component that manages the evaluation of suspicious communications through multiple analysis stages to detect sophisticated manipulation tactics. Accordingly, in some embodiments, threat analysis engine 802 may be provided or obtain call 804, which may represent an incoming telephone call from an unknown external number, an archived communication retrieved from historical databases for post-incident analysis, a voicemail message left by suspicious callers, or other telephony communications that require evaluation for potential social engineering indicators such as authority impersonation or rapport-building attempts. In some embodiments, threat analysis engine 802 may also be arranged to access number information 806, which may include databases of call histories showing repeated contact attempts from the same sources, caller identification records that enable validation of claimed identities, telephone number validation data that identifies disposable VoIP services or "rent by the hour" communication platforms, communication frequency patterns that reveal systematic relationship-building activities, or other contextual information that provides background details necessary for comprehensive threat assessment of coordinated social engineering campaigns.

In some embodiments, threat analysis engine 802 may be configured to employ triage 808 as an initial screening component that performs preliminary evaluation of call 804 using conventional analysis techniques to determine if the communication exhibits characteristics commonly associated with social engineering attempts. Accordingly, in some embodiments, triage 808 may be arranged to apply pattern matching algorithms that identify suspicious keywords related to authority claims such as "I'm calling from IT" or urgency indicators such as "this needs to be done immediately," caller identification verification processes that cross-reference claimed identities against internal employee directories or approved vendor contact databases, call frequency analysis that detects repeated contact attempts designed to build familiarity or trust with targeted users, time-based pattern matching that identifies calls occurring during unusual hours or from geographic locations inconsistent with claimed business relationships, or other rule-based filtering methods that flag communications for potential manipulation tactics. In some embodiments, triage 808 may be configured to classify calls as legitimate business communications that require no additional analysis if they originate from verified organizational contacts or approved external partners, potentially suspicious communications that warrant further investigation if they exhibit one or more risk indicators such as unknown caller numbers or inappropriate personal knowledge, or high-priority threats that require immediate generative AI evaluation if they demonstrate multiple social engineering indicators such as authority impersonation combined with urgent requests for sensitive information or system modifications.

In some embodiments, if triage 808 may identify call 804 as potentially suspicious based on detected risk indicators, threat analysis engine 802 may be arranged to select prompt template 810 from a library of specialized analysis frameworks designed to evaluate specific categories of social engineering attacks or manipulation methodologies. Accordingly, in some embodiments, prompt template 810 may represent structured frameworks tailored for authority impersonation attempts that evaluate if callers falsely claim to be IT personnel, management staff, or external service providers, rapport-building campaigns that analyze conversation patterns for inappropriate personal knowledge such as references to family members, hobby interests, or recreational activities, escalation-based manipulation tactics that track progression from harmless initial requests to increasingly dangerous actions such as system configuration changes, multi-vector coordination attacks that correlate telephone communications with suspicious email messages or text messages, or other attack methodologies that may require particular analysis approaches based on known social engineering playbooks or emerging threat intelligence. In some embodiments, threat analysis engine 802 may be configured to populate the selected prompt template with relevant information extracted from call 804 such as conversation transcripts, claimed caller identity, or stated business purpose, contextual data from number information 806 such as historical contact patterns or caller validation results, or triage analysis results such as detected risk indicators or preliminary threat classifications to generate prompt 812, which may represent a fully formed input structure that includes comprehensive communication content, historical context information, specific analysis objectives focused on identified threat categories, or formatting requirements that ensure consistent evaluation results from the generative AI system.

In some embodiments, threat analysis engines may be arranged to employ configuration information to customize prompt template libraries, investigation framework parameters, generative AI model selection criteria, or analysis objective specifications to account for local threat landscape characteristics or organizational investigation requirements.

In some embodiments, threat analysis engine 802 may be arranged to provide prompt 812 to agent 814, which may represent a generative artificial intelligence system specifically trained on libraries of known social engineering scripts, conversation templates, attack methodologies, or behavioral patterns to identify sophisticated manipulation tactics that may escape conventional detection methods. Accordingly, in some embodiments, agent 814 may be configured to employ general purpose large language models or large language models trained on datasets of confirmed social engineering attacks to recognize linguistic patterns associated with trust-building techniques, natural language understanding capabilities that identify semantic indicators of deception or manipulation such as false claims of shared experiences or inappropriate familiarity, contextual analysis techniques that evaluate if personal information referenced by callers appears to have been researched rather than naturally known through legitimate business relationships, or behavioral pattern recognition that detects systematic progression of requests designed to gradually increase user compliance with increasingly harmful actions. In some embodiments, agent 814 may be arranged to evaluate conversation content for rapport-building language such as discussions about children's sports activities at specific venues, hobby interests, or other personal interests that may have been gathered from social media reconnaissance, escalation indicators such as progression from simple requests like email deletion to complex technical actions like VPN reconfiguration, authority manipulation tactics such as false claims of IT affiliation combined with urgent requests for system access, or cross-channel coordination patterns such as telephone calls that inappropriately reference or vouch for suspicious incoming email messages.

In some embodiments, agent 814 may be configured to generate results 816 that may include comprehensive threat severity assessments that may range from low-risk legitimate communications to high-priority social engineering attacks requiring immediate response, one or more confidence scores that may indicate the reliability of the threat classification based on the strength of detected indicators, attack classification categories that identify the specific type of social engineering methodology such as authority impersonation, rapport-building, or escalation-based manipulation, evidence summaries that highlight the specific conversation elements or behavioral patterns that support the threat assessment, or detailed analysis reports that provide security personnel with actionable intelligence about the suspected attack methodology, targeted users, or recommended mitigation strategies. Accordingly, in some embodiments, results 816 may conform to formatting rules or content guidelines specified in prompt 812 to ensure consistent report structures that enable automated processing or integration with organizational security systems. In some embodiments, reports may include scores based on one or more risk scoring frameworks that may enable response actions or mitigation action to be prioritized based on threat severity or potential organizational impact. Also, in some embodiments, reports may include or provide recommended response procedures such as additional identity verification requirements, increased monitoring of the targeted user's subsequent activities, immediate notification of security personnel, or the like.

In some embodiments, threat analysis engine 802 may be arranged to process results 816 to generate call incident information 818, which may represent a structured data record that includes comprehensive documentation of the entire evaluation process for future reference or threat intelligence purposes. Accordingly, in some embodiments, call incident information 818 may include detailed metadata about call 804 such as caller identification information, call duration, timestamps, or conversation topics, information about the targeted user such as organizational role, system access privileges, or previous social engineering exposure, analysis findings such as detected attack indicators, threat classification results, confidence scores, or the like. Also, in some embodiments, incident information may include contextual information such as correlations with other suspicious communications, patterns suggesting coordinated campaign activities, relationships to known threat actors, response actions taken such as security notifications generated, monitoring procedures implemented, mitigation strategies deployed, or the like. Thus, in some embodiments, if results 816 may indicate that call 804 may be associated with a significant social engineering threat based on detected manipulation tactics, authority impersonation attempts, or escalation patterns, threat analysis engine 802 may be arranged to generate event 820, which may represent security alerts that may be used notify incident response teams, automated response triggers that implement protective measures such as temporary access restrictions or enhanced authentication requirements, detailed incident reports that document the attack methodology for threat intelligence purposes, or notification messages that warn targeted users or their supervisors about the identified social engineering attempt.

Figure 9:
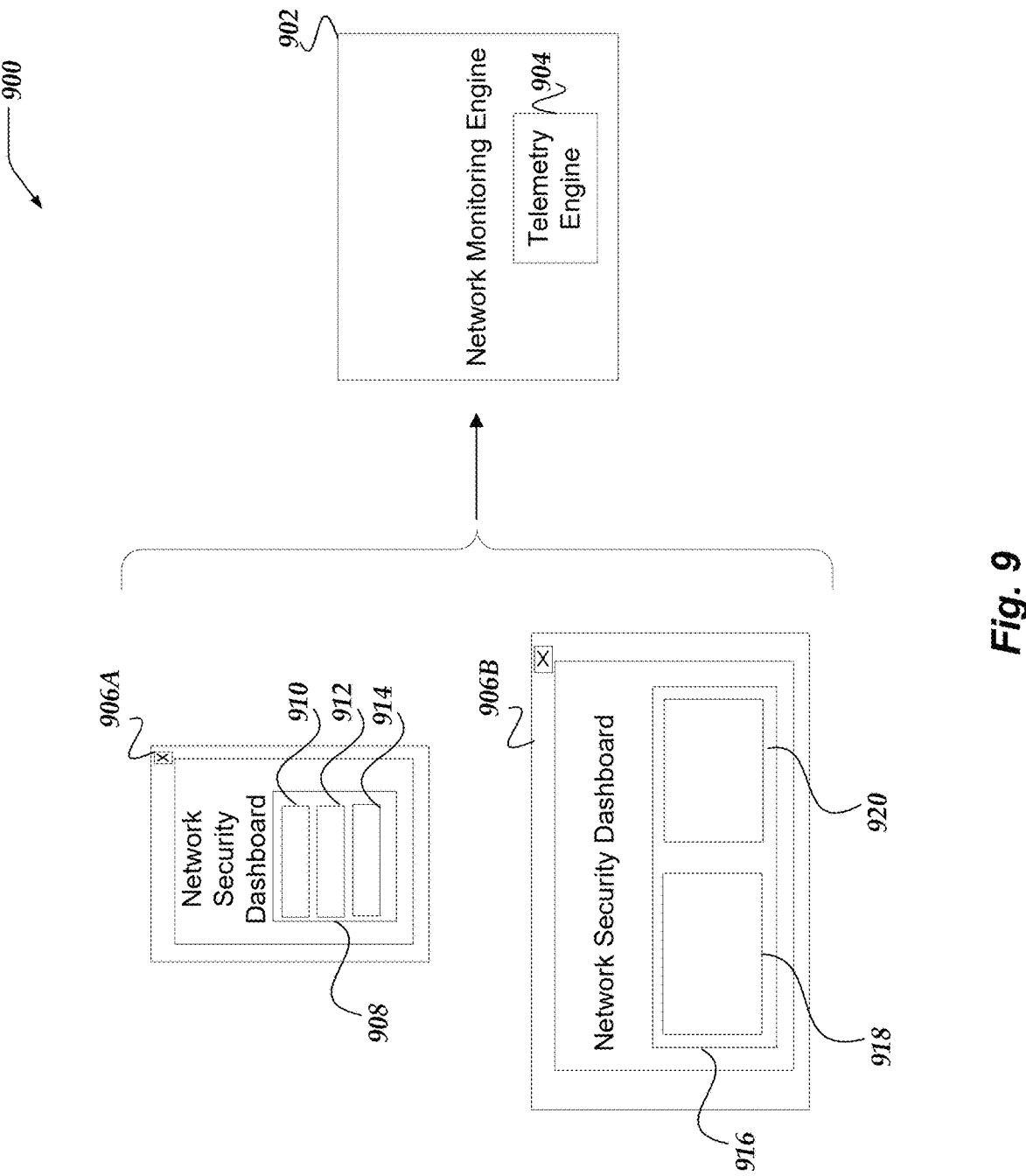
FIG. 9 illustrates a logical schematic of a system for collecting and applying telemetry information and telemetry metrics for social engineering threat detection management in accordance with one or more of the various embodiments.

FIG. 9 illustrates a logical schematic of system 900 for collecting and applying telemetry information and telemetry metrics for social engineering threat detection management in accordance with one or more of the various embodiments. System 900 may comprise various constituents, including: network monitoring engine 902; telemetry engine 904; one or more client user interfaces, such as user interface 906A or user interface 906B; or the like.

In some embodiments, network monitoring engines, such as network monitoring engine 902 may be arranged to perform actions to support the operation, organization, or management of social engineering threat detection in monitored networks.

In some embodiments, systems, such as system 900 may include one or more telemetry engines, such as telemetry engine 904. In some embodiments, telemetry engines may be arranged to monitor or evaluate interactions with applications or user interfaces such as user interface 906A, user interface 906B, or the like. In some embodiments, this may include monitoring how users or other applications may interact with user interfaces, interactive reports, various applications, or one or more system features. In some embodiments, user interface 906A may represent the presentation or display of a user interface in a first adapted arrangement while user interface 906B may represent the presentation or display of the same user interface having a second adapted arrangement. In some embodiments, user interface 906A may be the user interface displayed in portrait mode while the user interface 906B may be considered to be the user interface in landscape mode after a hardware display has been rotated.

In some embodiments, user interfaces, such as user interface 906A or user interface 906B may include various windows, controls, or other user interface features. In some embodiments, user interfaces may include various user interface panels, such as panel 908, panel 916, or the like. In some embodiments, panel 908, or the like may represent a user interface that enables users, such as security administrators, to review social engineering threat detection information or perform threat analysis administration displayed in a portrait (vertical) orientation while user interface 906B may represent social engineering threat detection information displayed in a landscape (horizontal) orientation. In some embodiments, element 910, element 912, element 914, element 918, element 920, or the like may be considered to represent various user interface elements, controls, buttons, list items, report features, user interface components, displayed content, formatted content, or the like that may be included in user interfaces.

In some embodiments, user interface 906A or 906B may be considered a user interface that enables administrative users to work with social engineering threat detection, threat analysis configurations, or the like. In some embodiments, panel 908 may be used to select, generate, or modify threat detection rules, threat analysis results, change logs, detection parameters, or the like. In some embodiments, display panel 908 may be used to display quality or effectiveness rankings for one or more threat detection methods sorted based on inferred importance, value, or the like. In some embodiments, panels such as panel 908 may be used to display threat information, candidate threat indicators, display reports regarding social engineering attack detection records and their relevance to threat analysis or social engineering threat prevention, or the like.

In some embodiments, network monitoring engines, such as network monitoring engine 902 (as well as threat analysis engines, telemetry engines, or the like) may be arranged to generate or display user interfaces, such as user interface 906A or user interface 906B to users using one or more of video interface 242, projector 246, display 250, or the like, of a client computer, such as client computer 200. In some embodiments, network monitoring engine 902, threat analysis engines, or the like may be arranged to generate or display user interface 906A, user interface 906B, or the like to users using a one or more of input/output interface 338, display 350, audio interface 356, or the like, of a network computer, such as network computer 300.

In some embodiments, network monitoring engines, such as network monitoring engine 902 (as well as threat analysis engines, telemetry engines, or the like) may be arranged to collect various telemetry or other metrics associated with user interactions with user interfaces. In some embodiments, telemetry may include tracking or monitoring if users may be in agreement with threat detection results, social engineering threat classifications, report arrangement/organization, or the like. In some embodiments, network monitoring engines, or the like may be enabled to employ telemetry information or telemetry metrics collected or determined by telemetry engines, such as telemetry engine 904. In some embodiments, telemetry engines may be separate from threat analysis engines, network monitoring engines, or the like as shown in FIG. 9. In some embodiments, telemetry engines may be part of or otherwise embedded in threat analysis engines, network monitoring engines, or the like.

In one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, threat analysis engines, network monitoring engines, or the like may be arranged to monitor telemetry information associated with one or more users.

Accordingly, in some embodiments, threat analysis engines, network monitoring engines, or the like may be arranged to provide one or more user interface facilities to collect direct feedback from one or more of the users that may interact with information displayed in the one or more user interfaces. In some embodiments, user interfaces may include controls that enable authorized users to grade one or more threat detection reports, candidate threat classifications, social engineering attack profiles, threat assessment results, or the like.

In some embodiments, grades or scores may be binary (e.g., like/dislike), discrete (e.g., one-four stars, letter grades), continuous values, or the like.

In one or more of the various embodiments, threat analysis engines, network monitoring engines, or the like may be arranged to provide user interfaces that monitor how users interact with social engineering threat detection results, threat analysis configuration recommendations, or the like. In some embodiments, telemetry information employed to monitor user preferences may be based on monitoring user interactions as well as direct feedback. Accordingly, in some embodiments, social engineering threat detection recommendations, or the like, that may appear valid or reasonable but are ignored or discarded by users may be inferred to be poorly received. In some embodiments, if the top ranked results provided in response to user actions, user queries, threat detection results, or the like, are ignored or lower ranked results are favored by users, it may be inferred that there may be a problem with the data or the display of the data.

In some embodiments, network monitoring engines, or the like may be arranged to receive telemetry information from other services or applications. Accordingly, in one or more of the various embodiments, network monitoring engines, or the like may not be required to directly monitor activity associated with the social engineering threats, social engineering threat detection, threat reports, or the like. In some embodiments, user interfaces, such as user interface 906A or user interface 906B may be displayed to users via desktop computer applications, mobile applications, web-based applications, or the like. In some embodiments, such applications may collect the telemetry information and provide some or all it to threat analysis engines, network monitoring engines, or the like rather than requiring the threat analysis engines, network monitoring engines, or the like to include monitoring facilities on user-facing applications.

Accordingly, in some embodiments, network monitoring engine 902, or the like may be arranged to collect metrics or telemetry associated with user interactions with user interface 906A or user interface 906B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. In some embodiments, network monitoring engine 902, or the like may be arranged to collect metrics or telemetry associated with user interactions with user interface 906A, or user interface 906B using a one or more of input/output interface 338, GPS 340, keyboard 352, audio interface 356, pointing device interface 358, or the like, of a network computer, such as network computer 300.

In some embodiments, network monitoring engines, or the like may be arranged to track mouse movement, eye movement, keystrokes, or the like, to determine how users may interact with information (e.g., threat detection results, threat analysis configurations, threat information management, threat indicators, threat detection recommendations, or the like) displayed in user interfaces. Accordingly, in some embodiments, network monitoring engines, or the like may be arranged to evaluate at least the quality of various threat detection recommendations, threat classification, detection report characteristics, or the like based on how users interact with them via the user interfaces. In some embodiments, if users consistently select or otherwise favor interacting with displayed items, detection results, or threat detection recommendations ranked or listed lower than others, it may indicate that one or more systems performing the ranking or threat detection reporting may be experiencing diminished or diminishing effectiveness. In some embodiments, users may reject or ignore report results, threat detection conclusions, or the like which may indicate that one or more associated systems may be experiencing diminished or diminishing effectiveness.

In some embodiments, network monitoring engines, or the like may be arranged to associate a performance score with user interfaces used in the system based on the user interaction metrics or telemetry. Accordingly, in some embodiments, if the performance score associated with a user interface or user interface element falls below a defined threshold value, network monitoring engines, or the like may be arranged to suspend those user interfaces (or portions thereof) from operation. In some embodiments, network monitoring engines, or the like may be arranged to automatically modify the deficient user interfaces.

In some embodiments, telemetry engines may be arranged to collect or determine telemetry information that includes user telemetry, user feedback, or telemetry metrics that may be used to dynamically transform user interfaces, display panels, and the like. In some embodiments, the dynamic transformation may include arrangement, re-arrangement, elimination, addition, or adaptation of content and visual elements in user interfaces and display panels based on at least the collected telemetry information.

In some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, threat analysis engines, network monitoring engines, or the like may dynamically change the visual appearance of the user interfaces to improve the efficiency and effectiveness of the system or its user interfaces for the user.

In some embodiments, threat analysis engines, network monitoring engines, or the like may be arranged to dynamically select, position, size, shape, remove, hide, inactivate, disable, highlight, or style one or more visual user interface components such as display panels, controls, elements or content based on one or more of user telemetry metrics and user feedback. In some embodiments, if user interactions with the user interface are tracked focusing on or navigating to particular user interface views, components or user interface panels, system components, such as threat analysis engines, network monitoring engines, or the like may be arranged to dynamically highlight or size the preferred user interface elements and/or display panels. In some embodiments, if users are determined to rarely interact with a user interface element, such as element 914, network monitoring engines, or the like may be arranged to dynamically reduce the size, diminish the shape, disable its controls, or re-position element 914 by displaying a smaller sized greyed out version of element 914 in its display panel.

In some embodiments, network monitoring engines, or the like may be arranged to adapt user interfaces based on the size/type of display, input methods, user status, or the like. In some embodiments, if a user is determined to be operating using a mobile device, one or more user interface elements may be dynamically positioned differently. In some cases, depending on the display type or display size, one or more user interface elements may be hidden from view. In some embodiments, a network monitoring engine may be arranged to dynamically modify or re-arrange user interface 906A to obtain user interface 906B based on telemetry associated with the display or associated user interactions. Accordingly, in this example, display panel 916 may be considered to be dynamically modified or rearranged to accommodate the modified physical orientation of the display. In this example, user interface 906B now may be considered to display two elements (element 918 and element 920) rather than three elements as were displayed in user interface 906A. Thus, in this example, network monitoring engine 902 may display two elements for the landscape (horizontal) orientation instead of the three elements displayed in the portrait (vertical) orientation based on one or more telemetry metrics.

Thus, in some embodiments, network monitoring engines, or the like may be arranged to tangibly modify user interfaces, display panels, interactive reports, input collection, input selection, input data representation, threat indicators, social engineering threats, threat profiles, or the like, based on the efficient and effective performance of processes and/or activities associated with various types input information, social engineering threats, threat detection results, or the like as determined by telemetry information, or the like.

Generalized Operations

FIGS. 10-15 represent generalized operations for detecting social engineering threats in accordance with one or more of the various embodiments. In one or more of the various embodiments, processes 1000, 1100, 1200, 1300, 1400, and 1500 described in conjunction with FIGS. 10-15 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-15 may be used for detecting social engineering threats in accordance with at least one of the various embodiments or architectures such as those described in conjunction with FIGS. 4-9. Further, in one or more of the various embodiments, some or all of the actions performed by processes 1000, 1100, 1200, 1300, 1400, and 1500 may be executed in part by network monitoring engine 322, threat analysis engine, telemetry engine 326, or the like, running on one or more processors of one or more network computers.

Figure 10:
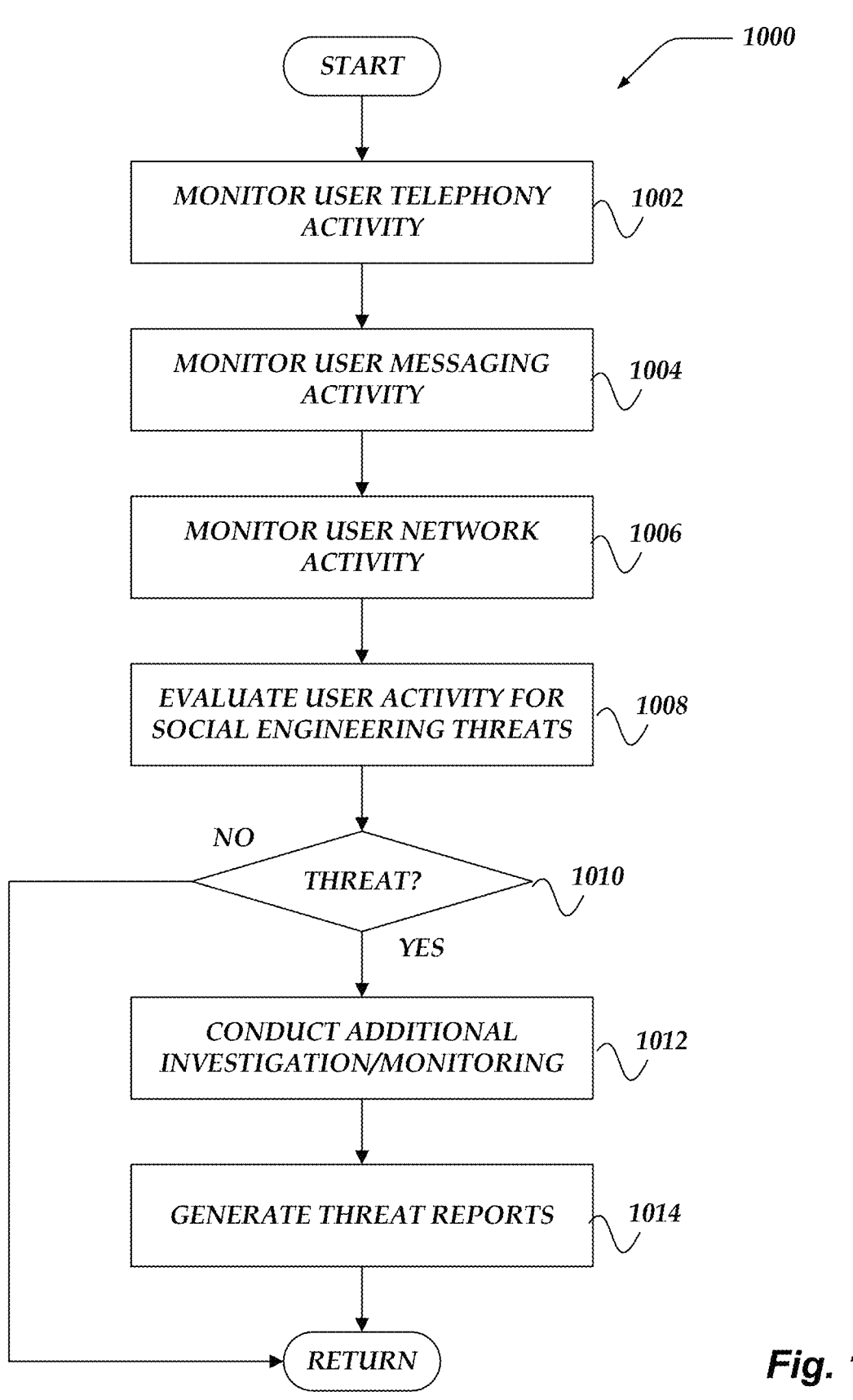
FIG. 10 illustrates an overview flowchart of a process for detecting social engineering threats in accordance with one or more of the various embodiments.

FIG. 10 illustrates an overview flowchart of process 1000 for detecting social engineering threats in accordance with one or more of the various embodiments. After a start block, at block 1002, in one or more of the various embodiments, network monitoring engines may be arranged to monitor telephony activity associated with one or more users.

In some embodiments, network monitoring engines may be arranged to capture or monitor VoIP traffic, or the like that may be exchanged between one or more internal users or external parties. Accordingly, in some embodiments, network monitoring engines may be configured to decode VoIP protocols to extract voice dialogue or call metadata from monitored network flows. In some embodiments, this may include determining caller identities, call durations, call frequencies, telephone numbers, or the like. In some embodiments, network monitoring engines may be arranged to employ observation ports, network taps, port mirrors, or the like, to passively monitor telephony communications without participating in the communication protocols. Accordingly, in some embodiments, network monitoring engines may be configured to track social graphs that represent communication patterns between one or more users or external contacts based on the monitored telephony activity. For example, in some embodiments, network monitoring engines may examine incoming telephone calls and flag calls from known suspicious telephone numbers, such as disposable VoIP services or numbers associated with previous social engineering campaigns.

At block 1004, in one or more of the various embodiments, network monitoring engines may be arranged to monitor messaging activity associated with one or more users.

In some embodiments, network monitoring engines may be arranged to monitor email traffic, instant messaging, text messaging, or other communication services that may be accessible via monitored networks. Accordingly, in some embodiments, network monitoring engines may be configured to capture message content, sender information, recipient information, timestamps, message volumes, or the like, from monitored messaging traffic. In some embodiments, this may include monitoring internal messaging systems, external email services, or messaging applications that communicate over monitored network infrastructure. In some embodiments, network monitoring engines may be arranged to correlate messaging activity with telephony activity to identify coordinated communication patterns that may be associated with social engineering campaigns. For example, in some embodiments, network monitoring engines may scan email headers for spoofed sender domains and analyze message content for urgent language patterns commonly used in phishing attempts, such as "immediate action required" or "account will be suspended."

At block 1006, in one or more of the various embodiments, network monitoring engines may be arranged to monitor network activity associated with one or more users.

In some embodiments, network monitoring engines may be arranged to monitor general network traffic patterns, login activities, file access behaviors, application usage, or other network-based activities that may be performed by one or more users. Accordingly, in some embodiments, this may include tracking network connections, monitoring data transfers, observing authentication events, or evaluating access patterns to network resources or services. In some embodiments, network monitoring engines may be configured to establish baseline behavioral profiles for individual users based on historical network activity patterns. In some embodiments, network monitoring engines may be arranged to detect deviations from established baseline patterns that may indicate potential compromise or manipulation by social engineering attacks. For example, in some embodiments, network monitoring engines may track unusual login patterns, such as multiple failed authentication attempts followed by successful access from unfamiliar geographic locations, or abnormal file access behaviors that deviate from established user baseline patterns.

At block 1008, in one or more of the various embodiments, network monitoring engines or threat analysis engines may be arranged to evaluate user activity for one or more social engineering threats.

In some embodiments, threat analysis engines may be arranged to analyze the monitored telephony activity, messaging activity, or network activity using both conventional analysis methods, generative artificial intelligence techniques, or combination thereof. Accordingly, in some embodiments, threat analysis engines may be configured to identify suspicious communication patterns, rapport-building language, authority impersonation attempts, escalation sequences, or other indicators commonly associated with social engineering attacks. In some embodiments, this evaluation may include correlating activities across multiple communication channels to detect coordinated attack campaigns. In some embodiments, threat analysis engines may be arranged to employ machine learning models, pattern matching algorithms, natural language processing techniques, or rule-based detection systems to assess the likelihood that observed activities may be associated with social engineering threats. Thus, in some embodiments, threat analysis engines may be configured to generate threat confidence scores based on the comprehensive analysis of user communication or network behaviors.

In some embodiments, threat analysis engines may be arranged to employ configuration information to determine social engineering threat evaluation criteria, including rapport-building detection sensitivity, authority impersonation indicators, escalation pattern thresholds, or multi-vector correlation parameters to account for local attack methodology prevalence or organizational vulnerability assessments.

At decision block 1010, in one or more of the various embodiments, if a threat may be detected, control may flow to block 1012; otherwise, control may be returned to a calling process.

In some embodiments, threat analysis engines may be arranged to compare threat confidence scores against predefined threshold values to determine if detected activities constitute actionable social engineering threats. Accordingly, in some embodiments, if the threat confidence score exceeds the configured threshold, the system may determine that a social engineering threat has been detected or requires further investigation. In some embodiments, the threshold values may be configured based on organizational risk tolerance, user roles, system criticality, or historical threat patterns. In some embodiments, if no threat may be detected, the system may continue monitoring activities or return control to the calling process to await additional user activity for evaluation. For example, in some embodiments, the system may determine a threat exists if a user receives calls from unverified numbers claiming IT authority combined with emails requesting password changes within the same time window.

At block 1012, in one or more of the various embodiments, network monitoring engines may be arranged to conduct additional investigation or monitoring.

In some embodiments, network monitoring engines may be arranged to initiate enhanced monitoring procedures for one or more users, entities, or communication channels that may be associated with detected social engineering threats. Accordingly, in some embodiments, this may include deploying additional investigative agents, increasing the frequency of activity monitoring, correlating related network flows, or expanding the scope of surveillance to include related users or systems. In some embodiments, network monitoring engines may be configured to gather additional evidence, validate threat indicators, or collect forensic information that may be used for incident response or threat mitigation activities. For example, in some embodiments, network monitoring engines may deploy keystroke monitoring on targeted workstations, increase surveillance of network file transfers, or correlate the user's communication patterns with known social engineering attack timelines.

In some embodiments, network monitoring engines may be arranged to employ configuration information to determine additional investigation procedures, including enhanced monitoring scope parameters, investigative agent deployment criteria, forensic evidence collection requirements, or correlation analysis depth specifications to account for local incident response procedures or organizational security investigation policies.

At block 1014, in one or more of the various embodiments, network monitoring engines may be arranged to generate threat reports.

In some embodiments, network monitoring engines may be arranged to compile comprehensive threat reports that include detected social engineering indicators, affected users, attack methodologies, confidence assessments, or recommended remediation actions. Accordingly, in some embodiments, threat reports may be formatted for delivery to security personnel, incident response teams, management stakeholders, or automated security systems. In some embodiments, the reports may include detailed timelines of suspicious activities, correlation analysis across multiple communication channels, risk assessments, or actionable intelligence for threat mitigation. Thus, in some embodiments, network monitoring engines may be configured to distribute threat reports through established notification channels, security information systems, or alerting mechanisms to enable rapid response to identified social engineering threats.

Next, in one or more of the various embodiments, control may be returned to a calling process.

Figure 11:
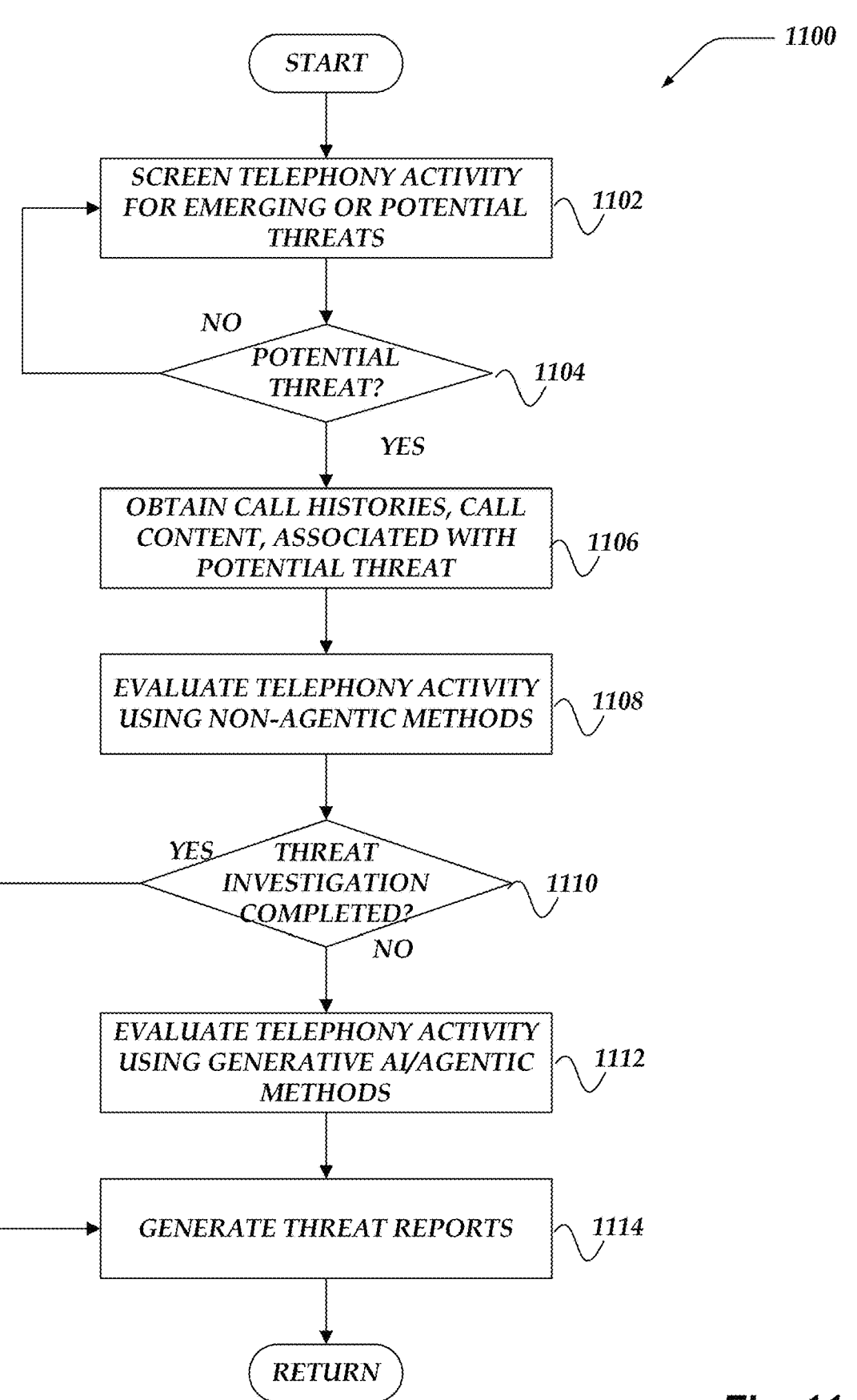
FIG. 11 illustrates a flowchart of a process for detecting social engineering threats in accordance with one or more of the various embodiments.

FIG. 11 illustrates a flowchart of process 1100 for detecting social engineering threats in accordance with one or more of the various embodiments. After a start block, at block 1102, in one or more of the various embodiments, threat analysis engines may be arranged to screen telephony activity for one or more emerging threats or potential threats.

In some embodiments, threat analysis engines may be arranged to monitor incoming Voice over Internet Protocol (VoIP) traffic, conventional telephony communications, or other voice-based communications that may be exchanged between one or more internal users or external parties. Accordingly, in some embodiments, threat analysis engines may be configured to decode VoIP protocols to extract voice dialogue, call metadata, caller identification information, call duration metrics, call frequency patterns, or the like from monitored network flows. In some embodiments, threat analysis engines may be arranged to employ observation ports, network taps, port mirrors, or the like to passively monitor telephony communications without participating in the communication protocols.

In some embodiments, threat analysis engines may be arranged to establish baseline communication patterns for individual users by analyzing historical telephony activity over predetermined time periods, such as daily, weekly, monthly, or the like. Accordingly, in some embodiments, the baseline patterns may include typical call frequencies, common contact lists, usual communication times, average call durations, or geographic patterns associated with legitimate business communications. In some embodiments, threat analysis engines may be configured to detect deviations from established baseline patterns that may indicate potential social engineering attempts, such as calls from unknown numbers during unusual hours, calls with abnormally long durations for claimed business purposes, or calls from geographic locations that do not align with claimed organizational affiliations.

For example, in some embodiments, threat analysis engines may identify calls with abnormally long duration from external numbers claiming to be internal IT personnel, or calls occurring during non-business hours that request sensitive system information.

At decision block 1104, in one or more of the various embodiments, if there may be a potential threat, control may flow to block 1106; otherwise, control may loop back to block 1102.

In some embodiments, threat analysis engines may be arranged to evaluate the screened telephony activity against one or more threat detection criteria to determine if the communications exhibit characteristics commonly associated with social engineering attempts. Accordingly, in some embodiments, the evaluation criteria may include pattern matching algorithms that identify suspicious keywords related to authority claims, urgency indicators, rapport-building language, information solicitation requests, or other linguistic markers commonly used in manipulation tactics. In some embodiments, threat analysis engines may be configured to assess call frequency patterns that may suggest systematic relationship-building activities, caller identification validation results that may reveal discrepancies between claimed identities or actual caller sources, or communication timing patterns that deviate significantly from normal business interaction schedules. For example, in some embodiments, a potential threat may be identified if callers demonstrate inappropriate knowledge of internal company structure, reference personal employee information not publicly available, or use authority impersonation language patterns such as "I'm calling from the security department."

In some embodiments, threat analysis engines may be arranged to generate preliminary threat confidence scores based on the number of detected risk indicators, the severity of identified suspicious characteristics, or the deviation magnitude from established baseline communication patterns. Accordingly, in some embodiments, if the preliminary threat confidence score may exceed a configured threshold value, the system may determine that the telephony activity constitutes a potential threat requiring further investigation. In some embodiments, if no potential threat may be detected based on the screening criteria, the system may continue monitoring additional telephony activity or return control to block 1102 to await new communications for evaluation.

In some embodiments, threat analysis engines may be arranged to employ configuration information to determine telephony threat detection criteria, including suspicious caller identification parameters, call frequency analysis thresholds, conversation content evaluation rules, or rapport-building indicator sensitivity levels to account for local telephony infrastructure characteristics or organizational communication security requirements.

At block 1106, in one or more of the various embodiments, threat analysis engines may be arranged to obtain one or more call histories, content of one or more calls, or the like, that may be associated with the potential threat. In some embodiments, threat analysis engines may be arranged to retrieve comprehensive telephony records from call history databases, including detailed caller identification information, call duration metrics, conversation timestamps, call frequency patterns, or the like that may provide contextual background for evaluating the suspicious communications. Accordingly, in some embodiments, threat analysis engines may be configured to access archived voice recordings, automatically generated conversation transcripts, call metadata repositories, voicemail recordings, or the like that may contain evidence of social engineering tactics or manipulation attempts. For example, in some embodiments, threat analysis engines may retrieve complete conversation transcripts showing escalating trust-building attempts, call frequency data revealing systematic contact patterns, and caller ID validation results that expose anonymized communication services.

In some embodiments, threat analysis engines may be arranged to correlate the suspicious telephony activity with related communications from the same caller sources, such as multiple calls from identical telephone numbers, calls that demonstrate escalating familiarity with targeted users, or calls that reference previous conversations in ways that suggest systematic relationship-building campaigns. Accordingly, in some embodiments, threat analysis engines may be configured to gather additional context information, such as reverse lookup results for suspicious telephone numbers, validation data that may identify disposable VoIP services or anonymizing communication platforms, or cross-references against databases of known fraudulent numbers or previously reported social engineering campaigns.

At block 1108, in one or more of the various embodiments, threat analysis engines may be arranged to evaluate the telephony activity using one or more non-agentic methods. In some embodiments, threat analysis engines may be arranged to employ conventional analysis techniques that may include natural language processing algorithms, pattern matching filters, statistical analysis methods, rule-based detection systems, or the like to identify potential social engineering indicators in the gathered telephony information. Accordingly, in some embodiments, non-agentic analysis methods may be configured to detect suspicious keywords or phrases that may indicate authority impersonation attempts, urgency manipulation tactics, inappropriate personal knowledge references, information solicitation requests commonly associated with social engineering attacks, or the like.

In some embodiments, threat analysis engines may be arranged to perform comprehensive validation checks on telephone numbers associated with the suspicious communications to identify potentially fraudulent communication sources. Accordingly, in some embodiments, the validation processes may include reverse lookup operations to identify disposable VoIP services, prepaid communication providers, "rent by the hour" telephone number services, or other anonymizing communication platforms commonly used by malicious actors to obscure their true identities. In some embodiments, threat analysis engines may be configured to cross-reference telephone numbers against databases of known fraudulent numbers, previously reported scam operations, numbers associated with confirmed social engineering attacks to identify recurring threats or coordinated campaign activities, or the like.

For example, in some embodiments, non-agentic methods may flag conversations containing keywords like "urgent security update," "verify your credentials," or inappropriate personal references such as family member names or recreational activities that suggest prior reconnaissance.

In some embodiments, threat analysis engines may be arranged to analyze call frequency patterns, call duration trends, conversation topic evolution, or other behavioral indicators that suggest systematic relationship-building activities rather than legitimate business communications. Accordingly, in some embodiments, non-agentic analysis methods may be configured to flag telephone numbers if they initiate contact attempts that may exceed normal business communication patterns, such as multiple calls within short time periods, calls at unusual hours, or persistent contact attempts that may continue despite lack of response from targeted users. Thus, in some embodiments, if the non-agentic analysis methods identify sufficient evidence of social engineering indicators based on conventional detection techniques, the threat investigation may be considered complete without requiring additional generative AI evaluation.

At decision block 1110, in one or more of the various embodiments, if the threat investigation may be complete, control may flow to block 1114; otherwise, control may flow to block 1112.

In some embodiments, threat analysis engines may be arranged to evaluate the results of the non-agentic analysis to determine if sufficient evidence has been gathered to conclusively classify the telephony activity as either legitimate business communication or confirmed social engineering threat. Accordingly, in some embodiments, the completion assessment may be based on confidence scores generated by the non-agentic analysis methods, the number of detected threat indicators, the severity of identified suspicious characteristics, or predefined investigation criteria that may specify if additional analysis using generative artificial intelligence methods may be warranted.

In some embodiments, threat analysis engines may be configured to consider the threat investigation complete if the non-agentic analysis results provide conclusive evidence that the telephony activity represents legitimate business communications with no detected social engineering indicators. Accordingly, in some embodiments, the investigation may also be considered complete if the non-agentic analysis identifies clear evidence of social engineering tactics with high confidence scores that exceed configured threshold values for automated threat classification. In some embodiments, if the non-agentic analysis results may be inconclusive, contain conflicting indicators, or suggest sophisticated manipulation tactics that may require more advanced evaluation techniques, the threat analysis engines may determine that additional investigation using generative AI methods may be necessary to reach a definitive threat assessment. For example, in some embodiments, investigation may be considered complete if non-agentic analysis clearly identifies authority impersonation combined with high-confidence caller source validation failures, eliminating the need for generative AI evaluation.

At block 1112, in one or more of the various embodiments, threat analysis engines may be arranged to evaluate the telephony activity using one or more generative AI or agentic methods. In some embodiments, threat analysis engines may be arranged to generate structured prompts that include relevant context information from the non-agentic analysis results, suspicious communication content such as conversation transcripts or call metadata, historical pattern data from call histories, threat intelligence information, or other details necessary for comprehensive evaluation by generative artificial intelligence systems. Accordingly, in some embodiments, the structured prompts may be configured to provide specific analysis objectives focused on identified threat categories, such as authority impersonation detection, rapport-building pattern recognition, escalation sequence identification, or cross-channel coordination analysis.

In some embodiments, threat analysis engines may be arranged to employ generative artificial intelligence agents specifically trained on libraries of known social engineering scripts, conversation templates, attack methodologies, or behavioral patterns to identify sophisticated manipulation tactics that may not be detected by conventional analysis methods. Accordingly, in some embodiments, the generative AI agents may be configured to employ large language models, natural language understanding techniques, contextual analysis capabilities, or behavioral pattern recognition to evaluate the semantic content of telephony communications for subtle social engineering indicators that may escape traditional detection systems.

In some embodiments, the generative AI agents may be configured identify rapport-building techniques commonly employed in social engineering attacks by analyzing conversation patterns that attempt to establish personal connections through references to family activities, hobby interests, recreational activities, or other personal information that may have been gathered from social media reconnaissance or public records. Accordingly, in some embodiments, the generative AI evaluation may be configured to detect if callers inappropriately demonstrate knowledge of targeted users' personal lives, such as referencing specific details about family members, vacation destinations, or recreational interests that would not typically be known by legitimate business contacts. Thus, in some embodiments, the generative AI analysis may provide comprehensive threat severity assessments, confidence scores, attack methodology classifications, evidence summaries, or detailed analysis reports that enable definitive threat classification decisions.

For example, in some embodiments, generative AI agents may analyze subtle rapport-building language patterns, such as references to specific company events or personal interests, to detect sophisticated manipulation tactics that conventional keyword filtering cannot identify.

At block 1114, in one or more of the various embodiments, threat analysis engines may be arranged to generate one or more threat reports associated with the investigation or the results of the investigations. In some embodiments, threat analysis engines may be arranged to compile comprehensive threat reports that include detected social engineering indicators from both non-agentic analysis results or generative AI evaluation findings, affected users or targeted personnel, attack methodologies or manipulation tactics identified during the investigation, confidence assessments based on the strength of detected evidence, or recommended remediation actions for addressing the identified threats. Accordingly, in some embodiments, threat reports may be formatted for delivery to security personnel, incident response teams, management stakeholders, or automated security systems through established notification channels, security information systems, or alerting mechanisms.

In some embodiments, threat analysis engines may be arranged to include detailed timelines of suspicious telephony activities, correlation analysis results that identify relationships with other communication channels, risk assessments that evaluate potential organizational impact, or actionable intelligence that enables rapid response to identified social engineering threats. Accordingly, in some embodiments, the threat reports may contain specific evidence summaries that highlight conversation elements or behavioral patterns supporting the threat assessment, attack classification categories that identify the type of social engineering methodology employed, or forensic information that may be useful for incident response activities or threat mitigation procedures. In some embodiments, threat analysis engines may be configured to distribute threat reports automatically based on threat severity levels, user roles within the organization, potential impact assessments, or predefined security policies that specify appropriate notification procedures for different categories of social engineering threats.

For example, in some embodiments, threat reports may include confidence scores for detected manipulation techniques, specific conversation excerpts demonstrating social engineering tactics, and correlation data linking telephone activities to suspicious network behaviors.

Next, in one or more of the various embodiments, control may be returned to a calling process.

Figure 12:
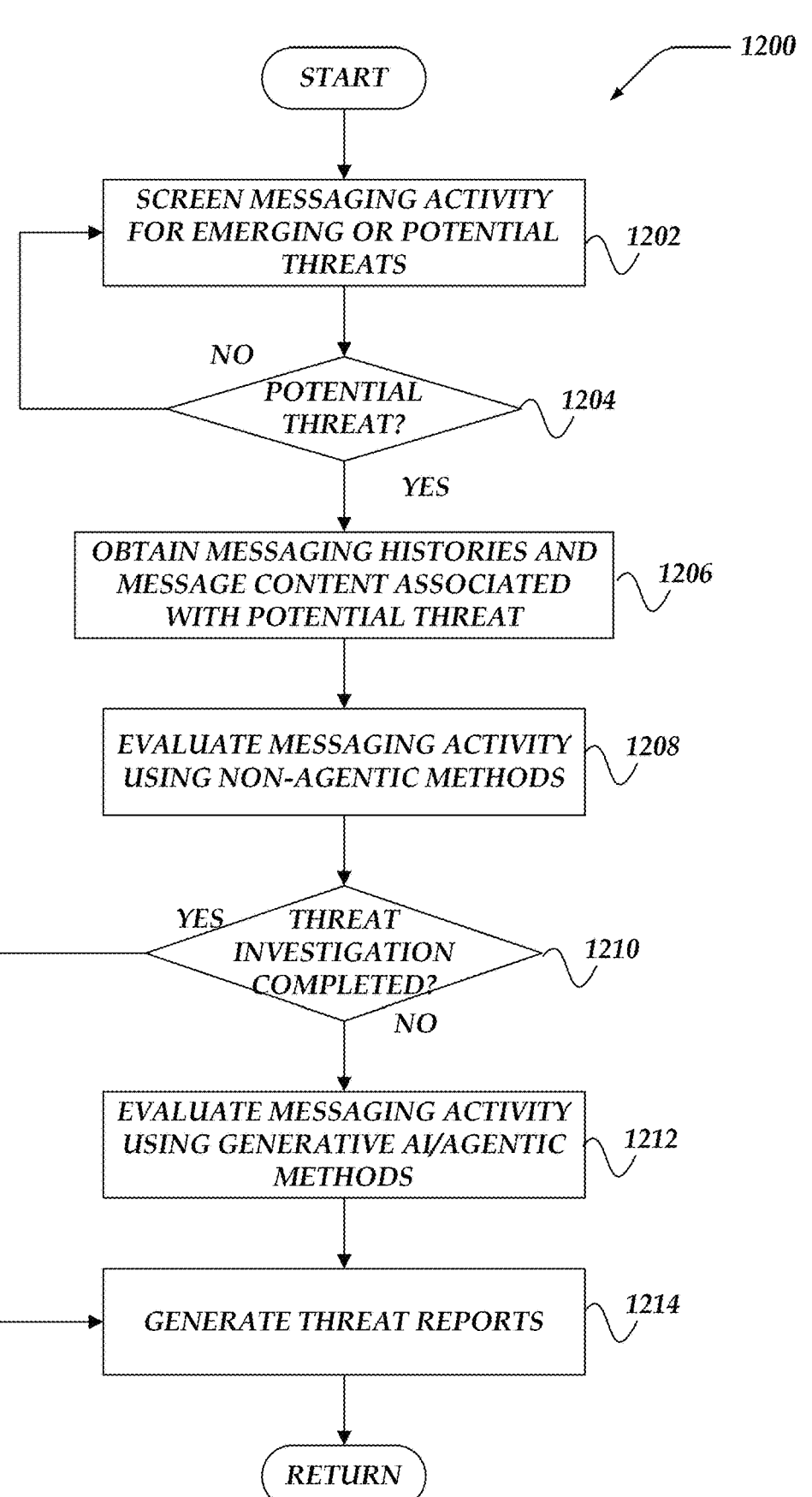
FIG. 12 illustrates a flowchart of a process for detecting social engineering threats in accordance with one or more of the various embodiments.

FIG. 12 illustrates a flowchart of process 1200 for detecting social engineering threats in accordance with one or more of the various embodiments. After a start block, at block 1202, in one or more of the various embodiments, network monitoring engines or threat analysis engines may be arranged to screen messaging activity for emerging or potential threats. In some embodiments, threat analysis engines may be arranged to monitor incoming email communications, instant messaging traffic, text messaging exchanges, or other message-based communications that may be exchanged between one or more internal users or external parties. Accordingly, in some embodiments, threat analysis engines may be configured to capture message headers, message content, sender information, recipient information, timestamps, message volumes, or the like from monitored messaging traffic that may traverse organizational networks or email infrastructure systems.

In some embodiments, threat analysis engines may be arranged to establish baseline messaging patterns for individual users by analyzing historical email activity, messaging frequency patterns, typical contact lists, or communication timing behaviors over predetermined time periods. Accordingly, in some embodiments, the baseline patterns may include normal message volumes, common sender domains, usual business communication topics, standard message formatting characteristics, or approved external contact relationships that may be associated with legitimate organizational communications. In some embodiments, threat analysis engines may be configured to detect deviations from established baseline messaging patterns that may indicate potential social engineering attempts, such as messages from unknown external domains, communications with unusual urgency indicators, or messages that may contain inappropriate personal references or authority impersonation claims.

For example, in some embodiments, threat analysis engines may identify emails with forged sender authentication, messages containing urgent financial requests from spoofed executive addresses, or text messages with shortened URLs leading to credential harvesting sites.

At decision block 1204, in one or more of the various embodiments, if there may be a potential threat, control may flow to block 1206; otherwise, control may loop back to block 1202. In some embodiments, threat analysis engines may be arranged to evaluate the screened messaging activity against one or more threat detection criteria to determine if the communications exhibit characteristics commonly associated with social engineering messaging attacks. Accordingly, in some embodiments, the evaluation criteria may include content analysis algorithms that may identify suspicious keywords related to urgent requests for sensitive information, authority impersonation language patterns, rapport-building attempts through personal information references, or message timing patterns that may suggest coordinated multi-channel attack campaigns.

In some embodiments, threat analysis engines may be configured to assess sender reputation scores based on domain validation results, message authentication protocol verification, or cross-references against databases of known malicious email addresses or compromised messaging accounts. Accordingly, in some embodiments, threat analysis engines may be arranged to generate preliminary threat confidence scores based on the number of detected suspicious messaging characteristics, the severity of identified manipulation indicators, or the deviation magnitude from established baseline communication behaviors. In some embodiments, if the preliminary threat confidence score may exceed a configured threshold value, the system may determine that the messaging activity constitutes a potential threat requiring further investigation. In some embodiments, if no potential threat may be detected based on the screening criteria, the system may continue monitoring additional messaging activity or return control to block 1202 to await new communications for evaluation.

For example, in some embodiments, a potential threat may be identified if messages contain urgent language combined with requests to bypass normal security procedures, or if senders demonstrate knowledge of internal projects not publicly disclosed.

At block 1206, in one or more of the various embodiments, threat analysis engines may be arranged to obtain one or more messaging histories, message content, or the like, that may be associated with the potential threat. In some embodiments, threat analysis engines may be arranged to retrieve messaging records from email servers, instant messaging logs, text message repositories, or archived communication databases that may include detailed sender identification information, message threading relationships, attachment metadata, or communication frequency patterns that may provide contextual background for evaluating the suspicious messaging activity. Accordingly, in some embodiments, threat analysis engines may be configured to access complete message content, email headers, message authentication results, or related communications from the same sender sources that may contain evidence of social engineering tactics or systematic manipulation attempts.

In some embodiments, threat analysis engines may be arranged to correlate the suspicious messaging activity with related communications across multiple messaging platforms, such as email messages that may reference telephone conversations, instant messages that may validate information discussed in previous emails, or text messages that may provide advance warning about incoming suspicious communications. Accordingly, in some embodiments, threat analysis engines may be configured to gather additional context information, such as sender domain validation results, message routing analysis that may identify spoofed or anonymized communication sources, or cross-references against threat intelligence databases that may contain known social engineering message templates or attack methodologies.

For example, in some embodiments, threat analysis engines may collect complete email threads showing escalating manipulation attempts, message routing data revealing compromised accounts, and sender domain validation results exposing fraudulent business email compromise campaigns.

At block 1208, in one or more of the various embodiments, threat analysis engines may be arranged to evaluate the messaging activity using one or more non-agentic methods. In some embodiments, threat analysis engines may be arranged to employ conventional analysis techniques that may include natural language processing algorithms, content filtering systems, statistical analysis methods, rule-based detection frameworks, or the like to identify potential social engineering indicators in the gathered messaging information. Accordingly, in some embodiments, non-agentic analysis methods may be configured to detect suspicious message characteristics such as urgent language patterns that may indicate manipulation tactics, authority impersonation claims that may reference internal personnel or external service providers, inappropriate personal information references that may suggest reconnaissance activities, message formatting anomalies that may indicate automated or scripted attack campaigns, or the like.

In some embodiments, threat analysis engines may be arranged to perform comprehensive validation checks on sender domains, email authentication protocols, or message routing information associated with the suspicious communications to identify potentially fraudulent messaging sources. Accordingly, in some embodiments, the validation processes may include Domain-based Message Authentication Reporting or Conformance (DMARC) verification, Sender Policy Framework (SPF) validation, DomainKeys Identified Mail (DKIM) signature checking, or reverse DNS lookup operations that may identify disposable email services, compromised messaging accounts, or anonymizing communication platforms commonly used by malicious actors to obscure their true identities.

In some embodiments, threat analysis engines may be arranged to analyze message timing patterns, communication frequency trends, content similarity scores, or other behavioral indicators that may suggest systematic relationship-building activities rather than legitimate business communications. Accordingly, in some embodiments, non-agentic analysis methods may be configured to flag messaging sources if they initiate contact attempts that may exceed normal business communication patterns, such as multiple messages within short time periods, communications that may demonstrate escalating familiarity with targeted users, or persistent messaging attempts that may continue despite lack of response from recipients. Thus, in some embodiments, if the non-agentic analysis methods identify sufficient evidence of social engineering indicators based on conventional detection techniques, the threat investigation may be considered complete without requiring additional generative AI evaluation.

For example, in some embodiments, non-agentic methods may detect DMARC authentication failures, identify messages with suspicious attachment types, or flag content containing social engineering keywords such as "wire transfer," "urgent payment," or "confidential invoice."

At decision block 1210, in one or more of the various embodiments, if the threat investigation may be complete, control may flow to block 1214; otherwise, control may flow to block 1212. In some embodiments, threat analysis engines may be arranged to evaluate the results of the non-agentic analysis to determine if sufficient evidence has been gathered to conclusively classify the messaging activity as either legitimate business communication or confirmed social engineering threat. Accordingly, in some embodiments, the completion assessment may be based on confidence scores generated by the non-agentic analysis methods, the number of detected threat indicators, the severity of identified suspicious messaging characteristics, or predefined investigation criteria that may specify if additional analysis using generative artificial intelligence methods may be warranted.

In some embodiments, threat analysis engines may be configured to consider the threat investigation complete if the non-agentic analysis results provide conclusive evidence that the messaging activity represents legitimate business communications with no detected social engineering indicators. Accordingly, in some embodiments, the investigation may also be considered complete if the non-agentic analysis identifies clear evidence of social engineering tactics with high confidence scores that may exceed configured threshold values for automated threat classification. In some embodiments, if the non-agentic analysis results may be inconclusive, contain conflicting indicators, or suggest sophisticated manipulation tactics that may require more advanced semantic evaluation techniques, the threat analysis engines may determine that additional investigation using generative AI methods may be necessary to reach a definitive threat assessment.

For example, in some embodiments, investigation may be considered complete if non-agentic analysis clearly identifies business email compromise indicators with failed sender authentication, providing sufficient evidence without requiring generative AI analysis.

At block 1212, in one or more of the various embodiments, threat analysis engines may be arranged to evaluate the messaging activity using one or more generative AI or agentic methods. In some embodiments, threat analysis engines may be arranged to generate structured prompts that may include relevant context information from the non-agentic analysis results, suspicious message content such as email bodies or instant message transcripts, historical messaging pattern data, threat intelligence information, or other details necessary for comprehensive evaluation by generative artificial intelligence systems. Accordingly, in some embodiments, the structured prompts may be configured to provide specific analysis objectives focused on identified threat categories, such as phishing attempt detection, business email compromise identification, rapport-building pattern recognition, or cross-channel coordination analysis that may involve correlation with telephony communications.

In some embodiments, threat analysis engines may be arranged to employ generative artificial intelligence agents specifically trained on libraries of known social engineering message templates, phishing email content, business email compromise scenarios, or messaging-based attack methodologies to identify sophisticated manipulation tactics that may not be detected by conventional content filtering methods. Accordingly, in some embodiments, the generative AI agents may be configured to employ large language models, natural language understanding techniques, contextual analysis capabilities, or semantic pattern recognition to evaluate the messaging content for subtle social engineering indicators that may escape traditional email security systems.

In some embodiments, the generative AI agents may be arranged to identify spear-phishing techniques commonly employed in messaging-based social engineering attacks by analyzing message content for personalized information that may indicate targeted reconnaissance activities, such as references to specific organizational projects, individual employee responsibilities, recent company events, or personal details that may have been gathered from social media or public records. Accordingly, in some embodiments, the generative AI evaluation may be configured to detect if message senders inappropriately demonstrate knowledge of internal organizational information, reference business relationships that may not exist in official contact databases, or employ psychological manipulation techniques designed to create urgency or authority pressure that may compel recipients to comply with malicious requests. Thus, in some embodiments, the generative AI analysis may provide comprehensive threat severity assessments, confidence scores, attack methodology classifications, evidence summaries, or detailed analysis reports that may enable definitive threat classification decisions for messaging-based social engineering attempts.

For example, in some embodiments, generative AI agents may analyze personalized spear-phishing content that references specific organizational roles, recent company announcements, or industry events to identify sophisticated targeting that conventional content filters may miss.

At block 1214, in one or more of the various embodiments, threat analysis engines may be arranged to generate one or more threat reports associated with the investigation or the results of the investigations. In some embodiments, threat analysis engines may be arranged to compile comprehensive threat reports that may include detected social engineering indicators from both non-agentic analysis results or generative AI evaluation findings, affected users or targeted personnel, messaging-based attack methodologies or manipulation tactics identified during the investigation, confidence assessments based on the strength of detected evidence, or recommended remediation actions for addressing the identified messaging threats. Accordingly, in some embodiments, threat reports may be formatted for delivery to security personnel, incident response teams, management stakeholders, or automated security systems through established notification channels, security information systems, or email security platforms.

In some embodiments, threat analysis engines may be arranged to include detailed timelines of suspicious messaging activities, correlation analysis results that may identify relationships with telephony communications or other attack vectors, risk assessments that may evaluate potential organizational impact from successful messaging-based social engineering attacks, or actionable intelligence that may enable rapid response to identified threats. Accordingly, in some embodiments, the threat reports may contain specific evidence summaries that may highlight message content elements or sender behavioral patterns supporting the threat assessment, attack classification categories that may identify the type of messaging-based social engineering methodology employed, or forensic information that may be useful for incident response activities or email security policy updates. In some embodiments, threat analysis engines may be configured to distribute threat reports automatically based on threat severity levels, targeted user roles within the organization, potential impact assessments, or predefined security policies that may specify appropriate notification procedures for different categories of messaging-based social engineering threats.

For example, in some embodiments, threat reports may include message authentication analysis results, identified impersonation targets within the organization, and recommended email security policy updates to prevent similar business email compromise attempts.

Next, in one or more of the various embodiments, control may be returned to a calling process.

Figure 13:
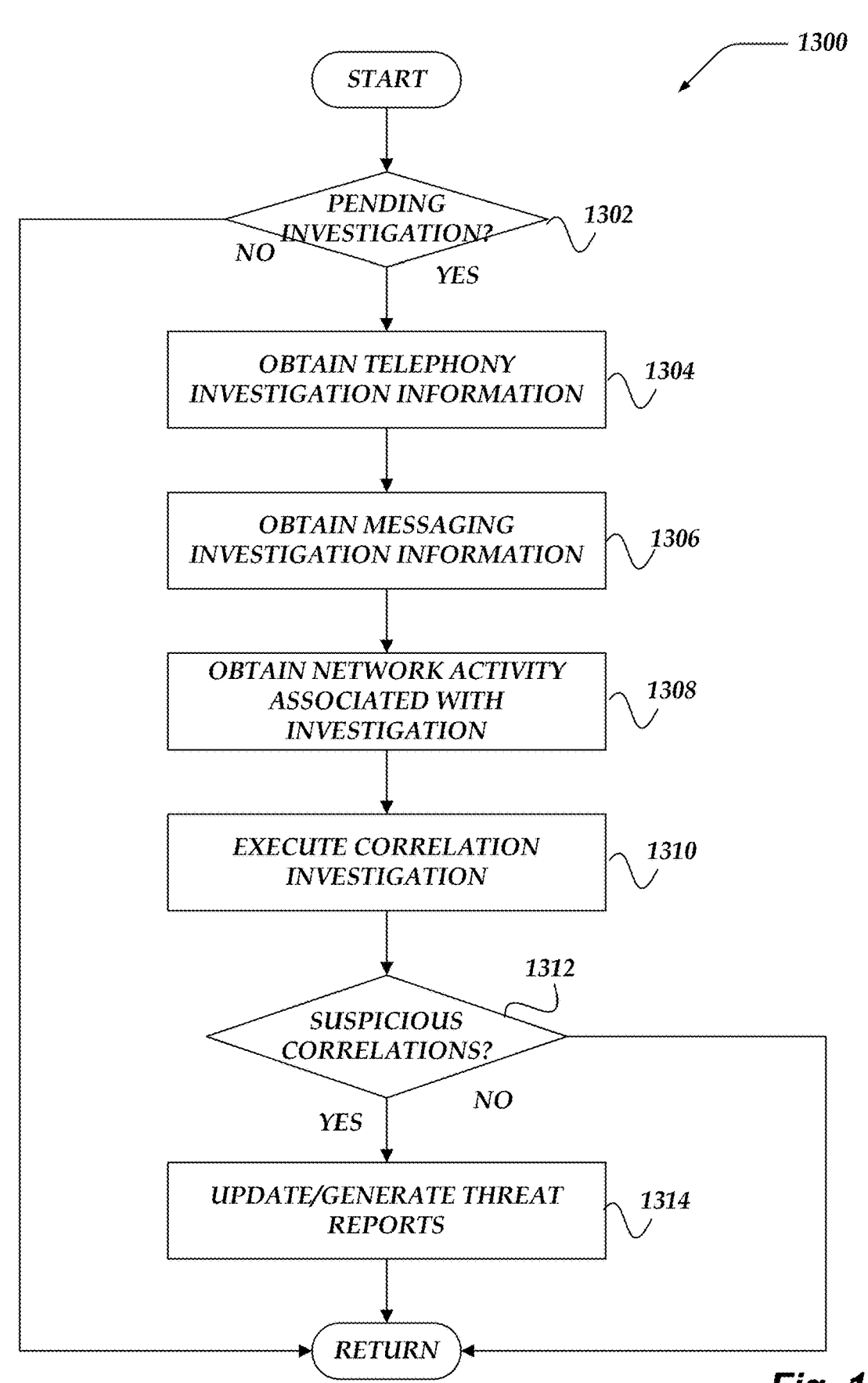
FIG. 13 illustrates a flowchart of a process for detecting social engineering threats in accordance with one or more of the various embodiments.

FIG. 13 illustrates a flowchart of process 1300 for detecting social engineering threats in accordance with one or more of the various embodiments. At decision block 1302, in one or more of the various embodiments, if there may be a pending social engineering threat investigation, control may flow to block 1304; otherwise, control may loop back to decision block 1302. In some embodiments, threat analysis engines may be arranged to monitor one or more investigation queues, incident management systems, or threat detection pipelines to identify social engineering threat investigations that may require correlation analysis across multiple communication channels. Accordingly, in some embodiments, threat analysis engines may be configured to evaluate investigation priorities based on threat severity levels, affected user criticality, potential organizational impact assessments, or time-sensitive indicators that may suggest active social engineering campaigns targeting organizational personnel.

In some embodiments, threat analysis engines may be arranged to determine if pending investigations may involve multi-vector social engineering attacks that may span telephony communications, messaging activities, network behaviors, or the like that may require correlation analysis to establish attack relationships or coordination patterns. Accordingly, in some embodiments, the determination process may include evaluating investigation metadata that may indicate cross-channel attack indicators, temporal correlations between suspicious activities across different communication platforms, or threat intelligence information that may suggest coordinated campaign activities targeting the organization.

For example, in some embodiments, pending investigations may include coordinated attacks involving telephone calls that reference suspicious emails, or messaging campaigns that validate fraudulent telephone conversations claiming IT authority.

At block 1304, in one or more of the various embodiments, threat analysis engines may be arranged to obtain the telephony activity investigation information. In some embodiments, threat analysis engines may be arranged to retrieve comprehensive telephony investigation data from call analysis systems, voice communication monitoring platforms, or telephony threat detection databases that may include detailed caller identification records, conversation transcripts, call frequency analysis results, or rapport-building detection findings from previous telephony-focused investigations. Accordingly, in some embodiments, threat analysis engines may be configured to employ telephony service APIs, Session Initiation Protocol (SIP) interfaces, or VoIP management protocols to access call metadata repositories, voice pattern analysis results, caller validation information, or social engineering technique classifications that may have been identified during telephony-specific threat evaluations. Further, in some embodiments, NMCs may be arranged to passively monitor telephony activity such that the telephony investigation information may include captured call content collected by passive or active network monitoring.

In some embodiments, threat analysis engines may be arranged to correlate telephony investigation information with user profile data, organizational contact directories, or historical communication patterns to establish baseline comparisons that may enable identification of anomalous calling behaviors or systematic relationship-building attempts. Accordingly, in some embodiments, the telephony investigation information may include threat confidence scores generated by non-agentic analysis methods, generative AI evaluation results, caller source validation data, or evidence summaries that may highlight specific conversation elements or behavioral patterns supporting social engineering threat assessments.

For example, in some embodiments, telephony investigation information may include voice pattern analysis results, caller geographic location data that conflicts with claimed business relationships, and conversation content showing systematic trust-building attempts across multiple calls.

At block 1306, in one or more of the various embodiments, threat analysis engines may be arranged to obtain the messaging activity investigation information. In some embodiments, threat analysis engines may be arranged to retrieve messaging investigation data from email security systems, instant messaging monitoring platforms, or communication content analysis databases that may include detailed sender identification records, message content analysis results, phishing detection findings, business email, or the like that may compromise indicators from previous messaging-focused investigations. Accordingly, in some embodiments, threat analysis engines may be configured to employ email service APIs, graph interfaces, workspace APIs, IMAP/SMTP protocols, or the like to access message header analysis results, content filtering outcomes, sender reputation assessments, domain validation information, or the like that may have been gathered during messaging-specific threat evaluations.

In some embodiments, threat analysis engines may be arranged to correlate messaging investigation information with email authentication protocol results, message routing analysis data, or cross-platform communication patterns to identify potential coordination between messaging attacks or persistent contact attempts across multiple messaging services. Accordingly, in some embodiments, threat analysis engines may be configured to integrate with messaging platform APIs, such as chat service APIs, groupware/team interfaces, or enterprise messaging system protocols to gather comprehensive communication data. In some embodiments, the messaging investigation information may include threat severity classifications, manipulation technique identifications, sender behavioral analysis results, or forensic evidence that may support comprehensive threat assessment activities across multiple communication channels.

For example, in some embodiments, messaging investigation information may include email header analysis revealing spoofed sender domains, message content demonstrating knowledge of telephony conversations, and timing data showing coordinated delivery with suspicious telephone activities.

At block 1308, in one or more of the various embodiments, threat analysis engines may be arranged to obtain network activity information associated with the investigation. In some embodiments, threat analysis engines may be arranged to retrieve network monitoring data, user behavior analytics, access pattern information, or system interaction logs that may be associated with one or more users, entities, or time periods that may be relevant to the social engineering threat investigation. Accordingly, in some embodiments, threat analysis engines may be configured to employ network monitoring APIs, STEM system interfaces, security information event management protocols, or log aggregation service APIs to access login activity records, file access behaviors, application usage patterns, network connection data, or the like that may indicate if targeted users may have performed unusual actions that may be consistent with social engineering manipulation or compromise.

In some embodiments, threat analysis engines may be arranged to correlate network activity information with baseline user behavior profiles, organizational access policies, or normal business operation patterns to identify deviations that may suggest successful social engineering attacks or ongoing manipulation attempts. Accordingly, in some embodiments, threat analysis engines may be configured to integrate with identity management systems through LDAP interfaces, Active Directory APIs, or single sign-on service protocols to correlate user authentication events with communication activities. In some embodiments, the network activity information may include authentication event logs, resource access anomalies, data transfer patterns, or system configuration changes that may provide evidence of actions performed by users who may have been influenced by social engineering tactics identified in telephony or messaging investigations.

For example, in some embodiments, network activity information may include login attempts from geographic locations matching suspicious caller origins, file access patterns consistent with social engineering requests, and authentication events correlating with communication timelines.

At block 1310, in one or more of the various embodiments, threat analysis engines may be arranged to execute an investigation to identify possible correlations among the telephony activity, the messaging activity, or the network activity. In some embodiments, threat analysis engines may be arranged to employ correlation analysis algorithms, temporal pattern matching techniques, or cross-channel relationship identification methods to detect connections between suspicious telephony communications, messaging activities, network behaviors, or the like that may indicate coordinated social engineering campaigns. Accordingly, in some embodiments, threat analysis engines may be configured to analyze timestamp relationships, user identity correlations, content theme similarities, attack methodology consistencies, or the like across different communication channels or activity types.

In some embodiments, threat analysis engines may be arranged to identify multi-vector attack patterns by correlating telephony calls that may reference or validate suspicious email messages, messaging activities that may provide advance warning about telephone communications, or network activities that may be consistent with actions requested during telephony or messaging interactions. Accordingly, in some embodiments, the correlation investigation may include evaluating if telephone callers inappropriately vouch for incoming emails, if message senders demonstrate knowledge of telephone conversations that were not recorded in legitimate business systems, or if network access patterns align with social engineering requests identified in communication monitoring activities. Thus, in some embodiments, threat analysis engines may be configured to generate correlation confidence scores based on the strength of identified relationships, the temporal proximity of suspicious activities, or the consistency of attack methodologies across different communication vectors.

For example, in some embodiments, correlation investigation may identify telephone calls that inappropriately vouch for incoming phishing emails, messaging activities that reference private telephone conversations, or network access attempts that align with social engineering manipulation requests.

Further, in some embodiments, threat analysis engines may be arranged to collect information or metrics from one or more other sources, such as financial systems, identity systems, threat intelligence feeds, or other services that may not be directly related to telephony services or messaging services. Accordingly, in some embodiments, threat analysis engines may employ this additional information to identify correlations, or the like that may contribute a threat analysis.

In some embodiments, threat analysis engines may be arranged to employ configuration information to determine correlation investigation parameters, including cross-channel relationship detection criteria, temporal correlation window specifications, attack coordination indicators, or multi-vector threat assessment rules to account for local attack campaign characteristics or organizational multi-channel communication monitoring capabilities.

At decision block 1312, in one or more of the various embodiments, if there may be one or more suspicious correlations, control may flow to block 1314; otherwise, control may be returned to a calling process.

In some embodiments, threat analysis engines may be arranged to evaluate the results of the correlation investigation to determine if sufficient evidence has been identified to confirm coordinated social engineering attack activities across multiple communication channels or activity types. Accordingly, in some embodiments, the suspicious correlation assessment may be based on correlation confidence scores that may exceed predefined threshold values, the number of detected cross-channel relationships, the temporal alignment of suspicious activities, or the consistency of attack methodologies identified across different investigation information sources.

In some embodiments, threat analysis engines may be configured to classify correlations as suspicious if they may indicate systematic relationship-building activities that span multiple communication platforms, coordinated manipulation attempts that may involve telephony calls validating suspicious messages, or network activities that may be consistent with actions requested during social engineering interactions. Accordingly, in some embodiments, if no suspicious correlations may be detected based on the investigation criteria, the system may determine that the activities may represent isolated incidents or legitimate business communications that may not require additional threat response actions.

For example, in some embodiments, suspicious correlations may include telephone calls occurring within minutes of phishing email delivery, callers demonstrating knowledge of email content before recipients could have read messages, or network activities matching actions requested during social engineering calls.

At block 1314, in one or more of the various embodiments, threat analysis engines may be arranged to update or generate one or more threat reports based on the correlation investigation findings. In some embodiments, threat analysis engines may be arranged to compile comprehensive correlation analysis reports that may include detected cross-channel relationships, coordinated attack evidence, multi-vector threat assessments, affected user identifications, or recommended response actions based on the confirmed social engineering campaign activities. Accordingly, in some embodiments, threat analysis engines may be configured to employ security information management APIs, incident response system interfaces, or threat intelligence platform protocols to update existing threat reports with correlation findings, generate new comprehensive threat assessments that may encompass the full scope of identified attack activities, or create incident response documentation that may enable security personnel to address coordinated social engineering threats effectively.

In some embodiments, threat analysis engines may be arranged to include detailed correlation analysis results, evidence summaries that may highlight specific relationships between telephony, messaging, or network activities, attack timeline reconstructions, or threat actor behavior profiles that may be derived from the cross-channel investigation findings. Accordingly, in some embodiments, the updated or generated threat reports may contain actionable intelligence for incident response teams, forensic evidence for security investigations, recommended mitigation strategies for preventing similar coordinated attacks, or organizational security policy updates that may address identified vulnerabilities. Thus, in some embodiments, threat analysis engines may be configured to distribute correlation-based threat reports through established security notification channels, incident management system APIs, or automated response platform interfaces that may enable rapid organizational response to confirmed multi-vector social engineering threats.

For example, in some embodiments, updated threat reports may include multi-vector attack timelines, evidence of coordinated campaign activities across communication channels, and comprehensive mitigation strategies addressing telephony, messaging, and network security vulnerabilities simultaneously.

Next, in one or more of the various embodiments, control may be returned to a calling process.

FIG. 14 illustrates a flowchart of process 1400 for detecting social engineering threats in accordance with one or more of the various embodiments. After a start block, at block 1402, in one or more of the various embodiments, threat analysis engines may be arranged to classify the social engineering threat. In some embodiments, threat analysis engines may be arranged to evaluate detected social engineering indicators, attack methodologies, communication patterns, or behavioral characteristics to determine the specific type or category of social engineering threat that may be associated with monitored telephony activities, messaging communications, or network behaviors. Accordingly, in some embodiments, threat analysis engines may be configured to employ pattern matching algorithms, rule-based classification systems, machine learning models, or threat intelligence databases to categorize social engineering attempts based on attack vectors such as authority impersonation, rapport-building campaigns, escalation-based manipulation, or multi-channel coordination strategies.

In some embodiments, threat analysis engines may be arranged to assess threat classification factors including the communication channels involved, the manipulation techniques employed, the targeted user roles or organizational positions, the sophistication level of the attack methodology, or the potential organizational impact that may result from successful social engineering compromise. Accordingly, in some embodiments, the threat classification process may include determining if the social engineering attempt represents phishing attacks, business email compromise, vishing campaigns, smishing operations, or hybrid multi-vector manipulation strategies that may require specialized investigation approaches.

For example, in some embodiments, threat classification may categorize attacks as authority impersonation campaigns targeting IT credentials, rapport-building operations focused on financial manipulation, or escalation-based attacks progressing from harmless requests to dangerous system modifications.

At block 1404, in one or more of the various embodiments, threat analysis engines may be arranged to obtain one or more prompt templates or investigation playbooks based on the type of social engineering threat. In some embodiments, threat analysis engines may be arranged to access libraries of specialized prompt templates, investigation frameworks, analysis methodologies, or the like that may be directed to evaluating different categories of social engineering attacks based on the threat classification results from block 1402. Accordingly, in some embodiments, threat analysis engines may be configured to select prompt templates tailored for authority impersonation detection, rapport-building pattern analysis, escalation sequence identification, cross-channel coordination evaluation, or other attack-specific investigation approaches.

In some embodiments, threat analysis engines may be arranged to retrieve investigation playbooks that may include structured analysis objectives, evidence collection guidelines, correlation requirements, or evaluation criteria that may be optimized for the identified threat type. Accordingly, in some embodiments, the prompt templates or investigation playbooks may contain specialized instructions for analyzing telephony conversation patterns, messaging content characteristics, network activity correlations, or behavioral indicators that may be associated with specific social engineering methodologies.

For example, in some embodiments, prompt templates for authority impersonation may include specific analysis frameworks for detecting false IT claims, while rapport-building playbooks may contain instructions for evaluating inappropriate personal knowledge references.

At block 1406, in one or more of the various embodiments, threat analysis engines may be arranged to include the context information associated with social engineering threat being investigated in a prompt or other input information based on the prompt template or investigation playbook. In some embodiments, threat analysis engines may be arranged to populate the selected prompt template with relevant contextual information that may include threat classification details, affected user profiles, organizational role information, historical communication patterns, baseline behavioral data, or the like that may provide necessary background for generative AI evaluation. Accordingly, in some embodiments, threat analysis engines may be configured to incorporate threat intelligence information, attack timeline data, communication frequency patterns, organizational security policies that may be relevant to the particular social engineering threat type, or the like.

In some embodiments, threat analysis engines may be arranged to format contextual information according to directives or instructions included in the selected investigation playbook to guide generative AI analysis. Accordingly, in some embodiments, the context information may include user demographic data, organizational hierarchy information, business relationship mappings, communication baseline metrics, or the like that may enable generative AI agents to evaluate the appropriateness or legitimacy of social engineering tactics identified during monitoring activities.

For example, in some embodiments, threat context information may include the targeted user's organizational role and system privileges, baseline communication patterns for comparison, and relevant organizational security policies that attackers may be attempting to circumvent.

At block 1408, in one or more of the various embodiments, threat analysis engines may be arranged to include the information associated with the investigation into the prompt or input information. In some embodiments, threat analysis engines may be arranged to incorporate investigation data collected from telephony monitoring activities, messaging analysis results, network behavior observations, or correlation findings into the structured prompt format required by the generative AI investigation system. Accordingly, in some embodiments, this information may include call transcripts, conversation metadata, message content analysis, sender validation results, network access patterns, cross-channel activity correlations, or the like that may provide evidence for generative AI evaluation.

In some embodiments, threat analysis engines may be arranged to format investigation information according to the specific requirements of the generative AI models or analysis frameworks that may be employed for social engineering threat assessment. Accordingly, in some embodiments, the investigation information may include conversation excerpts, communication timing data, behavioral pattern descriptions, attack indicator summaries, or the like that may enable generative AI agents to identify manipulation tactics or coordination strategies that may not be detected through conventional analysis methods.

For example, in some embodiments, investigation information may include complete conversation transcripts with highlighted manipulation attempts, caller validation results showing anonymized communication services, and correlation data linking activities across multiple communication channels.

At block 1410, in one or more of the various embodiments, threat analysis engines may be arranged to activate one or more investigation agents using the prompt or other input information. In some embodiments, threat analysis engines may be arranged to employ generative AI service APIs, large language model interfaces, or specialized investigation agent protocols to submit the formatted prompts to generative artificial intelligence systems that may be specifically trained for social engineering threat analysis. Accordingly, in some embodiments, threat analysis engines may be configured to utilize one or more generative AI provider APIs, cloud computing service interfaces, or enterprise AI service endpoints to activate investigation agents that may employ natural language processing, LLMs, contextual analysis, or behavioral pattern recognition to evaluate the social engineering threat evidence.

In some embodiments, threat analysis engines may be arranged to monitor investigation agent execution status, response generation progress, or analysis completion indicators through AI service monitoring interfaces or agent management protocols. Accordingly, in some embodiments, threat analysis engines may be configured to employ REST APIs, WebSocket connections, streaming protocols, or the like to maintain communication with investigation agents during the analysis process or to receive real-time updates on investigation progress.

For example, in some embodiments, investigation agents may be activated through secure API connections to specialized generative AI services trained on social engineering attack databases, with prompts formatted according to specific threat classification requirements.

At decision block 1412, in one or more of the various embodiments, if the one or more investigations may be completed, control may flow to block 1414; otherwise, control may loop back to block 1410. In some embodiments, threat analysis engines may be arranged to evaluate investigation completion criteria by monitoring generative AI agent response status, analysis result availability, or investigation timeline constraints to determine if sufficient analysis has been performed to reach definitive social engineering threat assessment conclusions. Accordingly, in some embodiments, threat analysis engines may be configured to assess completion indicators such as confidence scores that may exceed predefined threshold values, evidence strength assessments that may support threat classification decisions, investigation depth metrics, or the like that may indicate adequate analysis coverage.

In some embodiments, threat analysis engines may be arranged to determine if additional investigation iterations may be required based on inconclusive analysis results, conflicting evidence indicators, insufficient confidence levels in the generative AI evaluation outcomes, or the like. Accordingly, in some embodiments, if investigation completion criteria may not be satisfied, threat analysis engines may be configured to modify prompt parameters, select alternative prompt templates or investigation playbooks, adjust investigation objectives, or activate additional specialized investigation agents to gather more evidence or perform deeper analysis of the social engineering threat indicators.

For example, in some embodiments, investigation may be considered complete if generative AI agents provide high-confidence threat assessments exceeding predetermined threshold values, or when analysis identifies definitive social engineering indicators with sufficient evidence for response actions.

At block 1414, in one or more of the various embodiments, threat analysis engines may be arranged to update or generate one or more threat reports based on the results of the one or more investigations. In some embodiments, threat analysis engines may be arranged to compile investigation findings from generative AI analysis results that may include threat severity assessments, attack methodology classifications, evidence summaries, confidence evaluations, or recommended response actions based on the social engineering investigation outcomes. Accordingly, in some embodiments, threat analysis engines may be configured to employ security information management APIs, incident response system interfaces, or threat intelligence platform protocols to format investigation results into actionable threat reports that may enable security personnel to respond appropriately to identified social engineering threats.

In some embodiments, threat analysis engines may be arranged to generate detailed analysis reports that may include generative AI evaluation findings, investigation evidence correlations, attack pattern identifications, or threat actor behavior profiles derived from the AI-assisted investigation process. Accordingly, in some embodiments, the updated or generated threat reports may contain specific recommendations for threat mitigation, user notification procedures, security policy adjustments, or organizational training initiatives that may be based on the social engineering attack characteristics identified through generative AI analysis. Thus, in some embodiments, threat analysis engines may be configured to distribute AI-enhanced threat reports through established security notification channels, automated response systems, or incident management platforms to enable rapid organizational response to confirmed social engineering threats.

For example, in some embodiments, threat reports may include generative AI confidence scores for detected manipulation tactics, specific recommended response procedures such as user notification or account restrictions, and detailed attack methodology documentation for security awareness training updates.

Next, in one or more of the various embodiments, control may be returned to a calling process.

Figure 15:
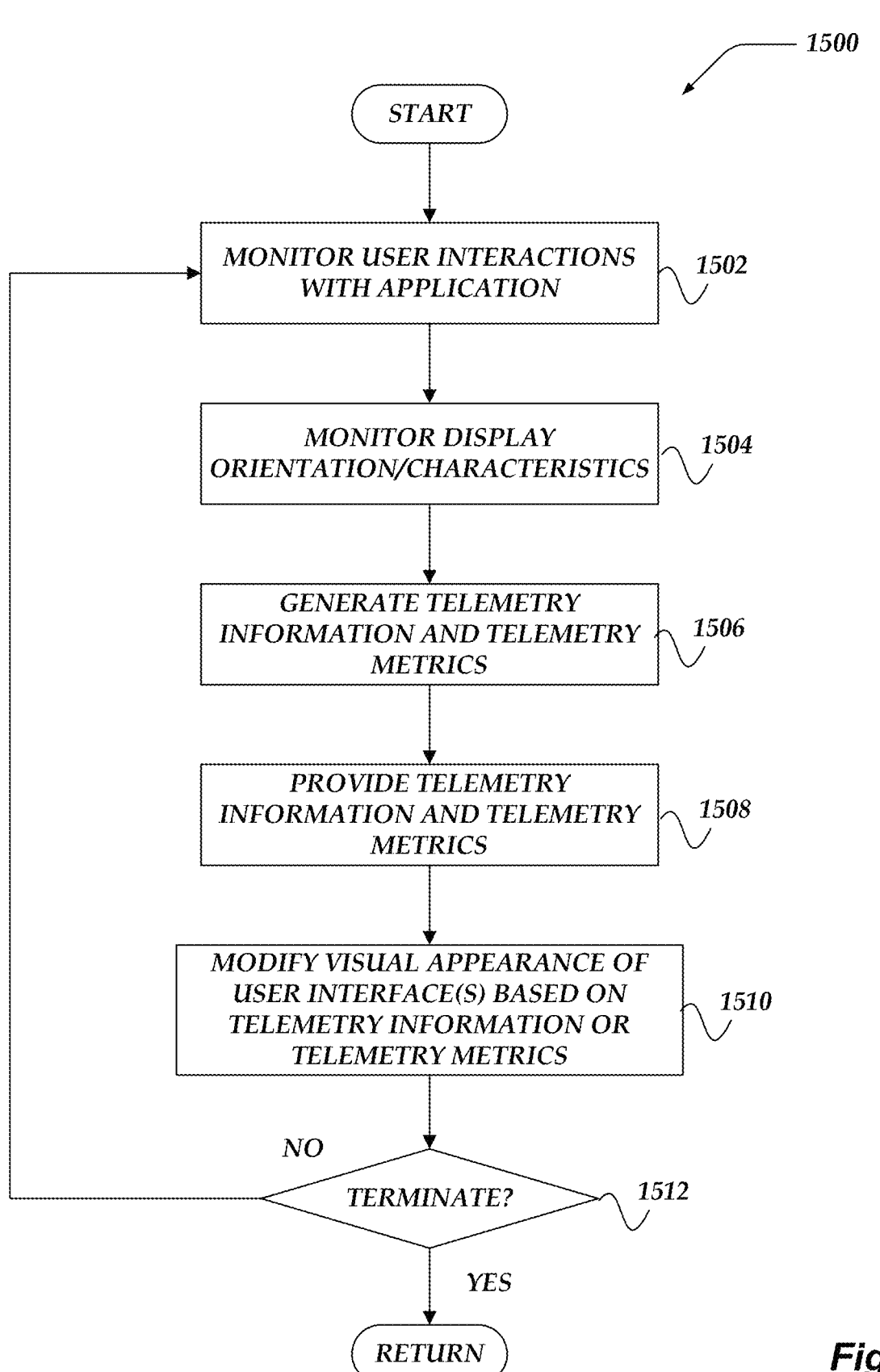
FIG. 15 illustrates a flowchart of a process for collecting and applying telemetry information and telemetry metrics for detecting social engineering threats in accordance with one or more of the various embodiments.

FIG. 15 illustrates a flowchart of process 1500 for collecting and applying telemetry information and telemetry metrics for detecting social engineering threats in accordance with one or more of the various embodiments. After a start block, at block 1502, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 9 for additional details.

At block 1504, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1506, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type of interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1508, in one or more of the various embodiments, telemetry engines may be arranged to provide the telemetry information and telemetry metrics to a runtime engine, such as network monitoring engines, threat analysis engines, or the like.

In some embodiments, telemetry engines may be arranged to provide one or more interfaces or APIs that enable other applications or services, such as network monitoring engines, threat analysis engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1510, in one or more of the various embodiments, network monitoring engines, threat analysis engines, or the like may be arranged to modify the visual appearance of one or more user interfaces based on the telemetry information or telemetry metrics.

Accordingly, in some embodiments, network monitoring engines, threat analysis engines, or the like may be arranged to dynamically change the visual appearance of the one or more user interfaces to improve the efficiency and effectiveness of the user interfaces based on some or all of the telemetry information or telemetry metrics. For example, network monitoring engines, threat analysis engines, or the like may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, network monitoring engines, threat analysis engines, or the like may be arranged to highlight or size the preferred user interface elements or display panels. For example, if users are determined to rarely interact with a particular display panel, network monitoring engines, threat analysis engines, or the like may be arranged to reduce the size, diminish the shape, disable its controls, and re-position that display panel to improve the efficiency of display screen usage. See, also FIG. 9 and its description.

In some embodiments, network monitoring engines or telemetry engines may be arranged to employ configuration information to determine user interface adaptation criteria, including display optimization parameters, interaction pattern analysis thresholds, visual element prioritization rules, or dynamic layout modification specifications to account for local user interface preferences or organizational usability requirements.

At decision block 1512, in one or more of the various embodiments, if the telemetry engine, network monitoring engines, threat analysis engines, or the like may be terminated, control may be returned to a calling process; otherwise, control may loop back to block 1502. In some embodiments, telemetry engines may be arranged to continuously or periodically provide updated/current telemetry information or telemetry metrics to enable network monitoring engines, threat analysis engines, or the like to dynamically change the visual appearance of the one or more user interfaces. Accordingly, in some embodiments, process 1500 may continue operation until it may be explicitly terminated or the operation of the associated network monitoring engines, threat analysis engines, or the like may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic for threats to network security in a computing environment using one or more network monitoring computers having one or more processors to execute instructions that are configured to cause the one or more networking computers to perform actions, comprising:

obtaining one or more candidate threats based on a non-agentic preliminary threat evaluation of one or more of telephony activity information, messaging activity information, or other user communication activity that is monitored in the network traffic, wherein the non-agentic preliminary threat evaluation employs a criteria including one or more of an urgent request for information, an authority impersonation language pattern, a personal information reference, a timing pattern for communication activity with multiple users, a request to bypass security procedure, knowledge of a non-public project, or a correlation between the telephone activity information and the messaging activity information;

obtaining an agentic threat evaluation of the one or more candidate threats based on one or more prompts that include one or more of the telephony activity information or the messaging activity information, wherein the one or more prompts are used with one or more agents to evaluate the one or more candidate threats and investigate the one or more correlations;

collecting one or more social engineering threats from the agentic threat evaluation, wherein each social engineering threat is associated with one or more deceptive tactics to manipulate one or more behaviors of one or more users, and wherein the one or more social engineering threats are included in a report; and obtaining a user interface that includes one or more display panels for content that includes the report, other information associated with the one or more social engineering threats and one or more portions of the monitored network traffic, wherein the content is dynamically transformed and arranged for display to a user based on one or more of user interaction telemetry, user feedback or telemetry metrics.

2. The method of claim 1, further comprising:

collecting one or more baseline communication patterns for the one or more users based on one or more of previous telephony activity, previous messaging activity, or user communication activity over one or more time periods;

obtaining one or more deviation metrics based on current communication behavior and the one or more baseline communication patterns; and obtaining one or more anomaly indicators associated with the one or more deviation metrics that exceed one or more threshold values.

3. The method of claim 1, further comprising:

obtaining one or more correlations based on one or more timestamps between one or more of a suspicious telephony activity, a suspicious messaging activity, or a suspicious user communication activity over time; and obtaining one or more multi-vector threat assessments based on the one or more correlations.

4. The method of claim 1, wherein the non-agentic threat evaluation further comprises:

using one or more of a natural language processing algorithm, a pattern matching filter, a statistical analysis method, a rule-based detection system, a keyword detection operation, a validation of caller identification, a communication frequency analysis, or a signature matching technique to collect one or more social engineering indicators; and obtaining one or more preliminary threat confidence scores based on the one or more social engineering indicators.

5. The method of claim 1, wherein the telephony activity information further comprises:

one or more of a call history record, a voice conversation transcript, a caller identification result, a call duration measurement, or a communication frequency pattern associated with the one or more users.

6. The method of claim 1, wherein the messaging activity information further comprises:

one or more of an email message header, an instant message content record, a sender reputation score, a message authentication result, a video conference metric, content from a video conference, a video call metric, content from a video call, an augmented reality or virtual reality session metric, content from an augmented reality or virtual reality session, or a communication timing pattern associated with messaging exchanges.

7. The method of claim 1, further comprising:

modifying the one or more prompts to include one or more of a conversation transcript, a call metadata record with validation results, a caller identification, a target user identification, a message content analysis summary, a historical communication baseline comparison, a sender reputation score, a message authentication result, an email, an email header, an instant message, or a threat intelligence context element.

8. The method of claim 1, further comprising:

collecting one or more communications that demonstrate one or more of a personal knowledge reference, a false claim of organizational authority, a systematic trust-building attempt, or a coordinated manipulation strategy across multiple communication channels.

9. The method of claim 1, further comprising:

obtaining one or more validation checks that cross-reference telephone numbers against one or more of a database of known fraudulent sources, a disposable communication service, or a previous social engineering threat.

10. A network monitoring computer (NMC) for monitoring network traffic for threats to network security in a computing environment, comprising:

a network component that communicates over the network;

a memory that stores at least instructions; and one or more processors that are configured to execute instructions to cause actions, including:

obtaining one or more candidate threats based on a non-agentic preliminary threat evaluation of one or more of telephony activity information, messaging activity information, or other user communication activity that is monitored in the network traffic, wherein the non-agentic preliminary threat evaluation employs a criteria including one or more of an urgent request for information, an authority impersonation language pattern, a personal information reference, a timing pattern for communication activity with multiple users, a request to bypass security procedure, knowledge of a non-public project, or a correlation between the telephone activity information and the messaging activity information;

obtaining an agentic threat evaluation of the one or more candidate threats based on one or more prompts that include one or more of the telephony activity information or the messaging activity information, wherein the one or more prompts are used with one or more agents to evaluate the one or more candidate threats and investigate the one or more correlations;

collecting one or more social engineering threats from the agentic threat evaluation, wherein each social engineering threat is associated with one or more deceptive tactics to manipulate one or more behaviors of one or more users, and wherein the one or more social engineering threats are included in a report; and obtaining a user interface that includes one or more display panels for content that includes the report, other information associated with the one or more social engineering threats and one or more portions of the monitored network traffic, wherein the content is dynamically transformed and arranged for display to a user based on one or more of user interaction telemetry, user feedback or telemetry metrics.

11. The NMC of claim 10, wherein the one or more processors are configured to execute instructions to cause actions, further comprising:

collecting one or more baseline communication patterns for the one or more users based on one or more of previous telephony activity, previous messaging activity, or user communication activity over one or more time periods;

obtaining one or more deviation metrics based on current communication behavior and the one or more baseline communication patterns; and obtaining one or more anomaly indicators associated with the one or more deviation metrics that exceed one or more threshold values.

12. The NMC of claim 10, wherein the one or more processors are configured to execute instructions to cause actions, further comprising:

obtaining one or more correlations based on one or more timestamps between one or more suspicious telephony activities and one or more suspicious messaging activities over time; and obtaining one or more multi-vector threat assessments based on the one or more correlations.

13. The NMC of claim 10, wherein the non-agentic threat evaluation further comprises:

using one or more of a natural language processing algorithm, a pattern matching filter, a statistical analysis method, a rule-based detection system, a keyword detection operation, a validation of caller identification, a communication frequency analysis, or a signature matching technique to collect one or more social engineering indicators; and obtaining one or more preliminary threat confidence scores based on the one or more social engineering indicators.

14. The NMC of claim 10, wherein the telephony activity information further comprises:

one or more of a call history record, a voice conversation transcript, a caller identification result, a call duration measurement, or a communication frequency pattern associated with the one or more users.

15. The NMC of claim 10, wherein the messaging activity information further comprises:

one or more of an email message header, an instant message content record, a sender reputation score, a message authentication result, or a communication timing pattern associated with messaging exchanges.

16. The NMC of claim 10, wherein the one or more processors are configured to execute instructions to cause actions, further comprising:

modifying the one or more prompts to include one or more of a conversation transcript, a call metadata record with validation results, a caller identification, a target user identification, a message content analysis summary, a historical communication baseline comparison, a sender reputation score, a message authentication result, an email, an email header, an instant message, or a threat intelligence context element.

17. The NMC of claim 10, wherein the one or more processors are configured to execute instructions to cause actions, further comprising:

collecting one or more communications that demonstrate one or more of a personal knowledge reference, a false claim of organizational authority, a systematic trust-building attempt, or a coordinated manipulation strategy across multiple communication channels.

18. The NMC of claim 10, wherein the one or more processors are configured to execute instructions to cause actions, further comprising:

obtaining one or more validation checks that cross-reference telephone numbers against one or more of a database of known fraudulent sources, a disposable communication service, or a previous social engineering threat.

19. A processor readable non-transitory storage media that includes instructions for monitoring network traffic for threats to network security using one or more network monitoring computers, wherein execution of the instructions by the one or more networking monitoring computers perform the method comprising:

obtaining one or more candidate threats based on a non-agentic preliminary threat evaluation of one or more of telephony activity information, messaging activity information, or other user communication activity that is monitored in the network traffic, wherein the non-agentic preliminary threat evaluation employs a criteria including one or more of an urgent request for information, an authority impersonation language pattern, a personal information reference, a timing pattern for communication activity with multiple users, a request to bypass security procedure, knowledge of a non-public project, or a correlation between the telephone activity information and the messaging activity information;

obtaining an agentic threat evaluation of the one or more candidate threats based on one or more prompts that include one or more of the telephony activity information or the messaging activity information, wherein the one or more prompts are used with one or more agents to evaluate the one or more candidate threats and investigate the one or more correlations;

collecting one or more social engineering threats from the agentic threat evaluation, wherein each social engineering threat is associated with one or more deceptive tactics to manipulate one or more behaviors of one or more users, and wherein the one or more social engineering threats are included in a report; and obtaining a user interface that includes one or more display panels for content that includes the report, other information associated with the one or more social engineering threats and one or more portions of the monitored network traffic, wherein the content is dynamically transformed and arranged for display to a user based on one or more of user interaction telemetry, user feedback or telemetry metrics.

20. The media of claim 19, further comprising:

obtaining one or more correlations based on one or more timestamps between one or more suspicious telephony activities and one or more suspicious messaging activities over time; and obtaining one or more multi-vector threat assessments based on the one or more correlations.

\* \* \* \* \*